United States Patent
Hao et al.

(10) Patent No.: US 9,900,446 B2
(45) Date of Patent: Feb. 20, 2018

(54) INFORMATION PROCESSING METHOD USING VIRTUAL SUBSCRIBER IDENTIFICATION CARD INFORMATION, ELECTRONIC APPARATUS AND SERVER

(71) Applicant: Lenovo (Beijing) Co., Ltd., Beijing (CN)

(72) Inventors: Zhuangzhuang Hao, Beijing (CN); Daliang Sun, Beijing (CN); Chenggui Wu, Beijing (CN); Ming Xiang, Beijing (CN); Meng Liu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 121 days.

(21) Appl. No.: 14/788,110

(22) Filed: Jun. 30, 2015

(65) Prior Publication Data

US 2016/0241722 A1  Aug. 18, 2016

(30) Foreign Application Priority Data

Feb. 15, 2015  (CN) .......................... 2015 1 0082832
Feb. 15, 2015  (CN) .......................... 2015 1 0083151
(Continued)

(51) Int. Cl.
*H04M 15/00* (2006.01)
*H04W 8/18* (2009.01)
(Continued)

(52) U.S. Cl.
CPC ..... *H04M 15/8038* (2013.01); *H04M 15/755* (2013.01); *H04W 8/183* (2013.01);
(Continued)

(58) Field of Classification Search
CPC ........... H04M 15/755; H04M 15/8038; H04M 2215/34; H04W 8/00; H04W 8/183;
(Continued)

(56) References Cited

U.S. PATENT DOCUMENTS

2010/0311402 A1* 12/2010 Srinivasan ............ H04W 8/183
455/418
2010/0311404 A1  12/2010 Shi et al.
(Continued)

FOREIGN PATENT DOCUMENTS

CN      101222723 A    7/2008
CN      101635909 A    1/2010
(Continued)

OTHER PUBLICATIONS

Office Action, and English language translation thereof, in corresponding Chinese Application No. 201510083151.2, dated Aug. 2, 2017, 18 pages.
(Continued)

*Primary Examiner* — Michael Mapa
(74) *Attorney, Agent, or Firm* — Brinks Gilson & Lione; G. Peter Nichols

(57) ABSTRACT

An information processing method, an electronic apparatus, and a server are described. The information processing method applied to the electronic apparatus includes sending a service request to a server through a first subscriber identification card channel, when the electronic apparatus itself is in a roaming state, the service request being used for requesting the server to allocate virtual subscriber identification card information to the electronic apparatus, and a virtual subscriber identification card being virtual and belonging to a current place where the electronic apparatus is located; receiving a service response sent by the server through the first subscriber identification card channel, the service response including the virtual subscriber identification card information; obtaining a target subscriber identification card channel; and executing data service transmission in a communication network under a roaming state by
(Continued)

using the virtual subscriber identification card information and the target subscriber identification card channel.

20 Claims, 23 Drawing Sheets

(30) Foreign Application Priority Data

Mar. 2, 2015 (CN) .......................... 2015 1 0092975
Mar. 2, 2015 (CN) .......................... 2015 1 0093029

(51) Int. Cl.
*H04W 12/04* (2009.01)
*H04W 8/12* (2009.01)
*H04W 8/20* (2009.01)
*H04W 12/06* (2009.01)

(52) U.S. Cl.
CPC ........ *H04W 12/04* (2013.01); *H04M 2215/34* (2013.01); *H04W 8/12* (2013.01); *H04W 8/205* (2013.01); *H04W 12/06* (2013.01)

(58) Field of Classification Search
CPC ..... H04W 12/04; H04W 12/06; H04W 36/14; H04W 8/12; H04W 8/205
USPC ........................ 455/432.1, 435.1, 456.1–457
See application file for complete search history.

(56) References Cited

U.S. PATENT DOCUMENTS

| 2013/0109436 | A1* | 5/2013 | Tat | ........................ | H04W 8/183 |
| | | | | | 455/558 |
| 2015/0304506 | A1* | 10/2015 | Zhu | ........................ | H04M 15/49 |
| | | | | | 455/406 |
| 2016/0142087 | A1* | 5/2016 | Inampudi | .............. | H04W 48/16 |
| | | | | | 455/558 |
| 2016/0309326 | A1 | 10/2016 | Lian | | |

FOREIGN PATENT DOCUMENTS

| CN | 102804821 A | 11/2012 |
| CN | 103686669 A | 3/2014 |
| CN | 103916844 A | 7/2014 |
| CN | 103987025 A | 8/2014 |
| WO | WO 2013/061275 A1 | 5/2013 |

OTHER PUBLICATIONS

Office Action and English language translation, from corresponding Chinese Application No. 201510082832.7, dated Sep. 4, 2017, 18 pages.

* cited by examiner

INFORMATION PROCESSING METHOD USING VIRTUAL SUBSCRIBER IDENTIFICATION CARD INFORMATION, ELECTRONIC APPARATUS AND SERVER

This application claims priority to Chinese Patent Application No. 201510083151.2 filed on Feb. 15, 2015; Chinese Patent Application No. 201510082832.7 filed on Feb. 15, 2015; Chinese Patent Application No. 201510092975.6 filed on Mar. 2, 2015; and Chinese Patent Application No. 201510093029.3 filed on Mar. 2, 2015; the entire contents of which are incorporated herein by reference.

The present disclosure relates to an electronic technology, and more particularly, to an information processing method, an electronic apparatus and a server.

BACKGROUND

A phone call is a very efficient way for quick interpersonal communication. When a subscriber goes out of a province, inter-provincial roaming requires extra charge. When the subscriber goes abroad, international roaming fee for a phone call will become very expensive. There are generally two solutions in a case that the subscriber wants to meet his/her demand for calling when roaming. A first solution is that the subscriber opens international roaming or inter-provincial roaming by an operator, and the subscriber can make a phone call when roaming, but a disadvantage of the first solution is relatively higher roaming fee for the phone call charged by the operator. A second solution is that the subscriber rents or purchases a mobile phone locally after going abroad, and makes a phone call by using a network provided by a local operator, but a disadvantage of the second solution is that the subscriber needs to overcome a language barrier so as to rent or purchase the mobile phone, besides, the whole process is time-consuming and toilsome, and especially for multi-country tourism, it is more bothersome and costly.

Therefore, it is expected to provide the subscriber with data transmission service of the operator at a roaming place conveniently, in order to save the roaming data service fee.

SUMMARY

In view of the above, embodiments of the present disclosure provide an information processing method, an electronic apparatus and a server. When roaming occurs to the electronic apparatus, a virtual subscriber identification card can be applied from the server to use a network provided by a local operator, so as to avoid expensive roaming fees.

Technical solutions of the embodiments of the present disclosure are implemented as below.

In a first aspect, an embodiment of the present disclosure provides an information processing method, applied to an electronic apparatus. The method may comprise: judging, by the electronic apparatus, whether the electronic apparatus itself is in a roaming state or not, to obtain a first judgment result; sending, by the electronic apparatus, a service request to a server through a first subscriber identification card channel, when the first judgment result indicates that the electronic apparatus itself is in the roaming state, the service request being used for requesting the server to allocate virtual subscriber identification card information to the electronic apparatus, and a virtual subscriber identification card being virtual and belonging to a current place where the electronic apparatus is located; receiving a service response sent by the server through the first subscriber identification card channel, the service response including the virtual subscriber identification card information; obtaining a target subscriber identification card channel; executing data service transmission in a communication network under the roaming state by using the virtual subscriber identification card information and the target subscriber identification card channel.

In a second aspect, an embodiment of the present disclosure provides an electronic apparatus. The electronic apparatus comprises a first judging unit, a first sending unit, a first receiving unit, a first obtaining unit, a data transmitting unit, and a first subscriber identification card channel. The first judging unit is used for judging whether the electronic apparatus itself is in a roaming state or not, to obtain a first judgment result. The first sending unit is used for sending a service request to a server through the first subscriber identification card channel, when the first judgment result indicates that the electronic apparatus itself is in the roaming state. The service request is used for requesting the server to allocate virtual subscriber identification card information to the electronic apparatus. A virtual subscriber identification card is virtual and belongs to a current place where the electronic apparatus is located. The first receiving unit is used for receiving a service response sent by the server through the first subscriber identification card channel, the service response including the virtual subscriber identification card information. The first obtaining unit obtains a target subscriber identification card channel. The data transmitting unit is used for executing data service transmission in a communication network under the roaming state by using the virtual subscriber identification card information and the target subscriber identification card channel.

In a third aspect, an embodiment of the present disclosure provides an information processing method applied to a server. The method may comprise: receiving, by the server, a service request sent by an electronic apparatus through a first subscriber identification card channel; determining, by the server, current location information of the electronic apparatus according to the service request; obtaining, by the server, virtual subscriber identification card information according to the current location information; carrying, by the server, the virtual subscriber identification card information in a service response, and sending the service response to the electronic apparatus.

In a fourth aspect, an embodiment of the present disclosure provides a server. The server may comprise a second receiving unit, a determining unit, a third obtaining unit and a second sending unit. The second receiving unit is used for receiving a service request sent by an electronic apparatus through a first subscriber identification card channel. The determining unit is used for determining current location information of the electronic apparatus according to the service request. The third obtaining unit is used for obtaining virtual subscriber identification card information according to the current location information. The second sending unit is used for carrying the virtual subscriber identification card information in a service response, and sending the service response to the electronic apparatus.

In the technical solutions provided by the embodiments of the present disclosure, the electronic apparatus sends the service request to the server through the first subscriber identification card channel, when the electronic apparatus itself is in the roaming state, so as to request the server to allocate the virtual subscriber identification card information to the electronic apparatus, the virtual subscriber identification card being virtual and belonging to the current place where the electronic apparatus is located; the electronic apparatus receives the virtual subscriber identification card information sent by the server through the first subscriber identification card channel, and obtains the target subscriber identification card channel; then, the electronic apparatus executes data service transmission with the communication network under the roaming state by using the virtual subscriber identification card information and the target subscriber identification card channel. Thus, the electronic apparatus, when roaming occurs, can apply for the virtual subscriber identification card via the server to use the network provided by the local operator, so as to avoid the expensive roaming fees.

BRIEF DESCRIPTION OF THE DRAWINGS

FIG. 2-1 is an implementation flow schematic diagram of step 105 according to Embodiment One of the present disclosure;

FIG. 2-2 is an implementation flow schematic diagram I of step 104 according to Embodiment One of the present disclosure;

FIG. 2-3 is an implementation flow schematic diagram II of step 104 according to Embodiment One of the present disclosure;

FIG. 2-4 is an implementation flow schematic diagram II of step 1044 according to Embodiment Two of the present disclosure;

FIG. 3 is an implementation flow schematic diagram of an information processing method according to Embodiment Three of the present disclosure;

FIG. 4-1 is a composition structural schematic diagram of an electronic apparatus according to Embodiment Four of the present disclosure;

FIG. 4-2 is a composition structural schematic diagram of a data transmitting unit according to Embodiment Four of the present disclosure;

FIG. 4-3 is a composition structural schematic diagram I of a first judging unit according to Embodiment Four of the present disclosure;

FIG. 4-4 is a composition structural schematic diagram II of a first judging unit according to Embodiment Four of the present disclosure;

FIG. 11-1 is a composition schematic diagram I of an information processing system according to Embodiment Eleven of the present disclosure;

FIG. 11-2 is a composition schematic diagram II of the information processing system according to Embodiment Eleven of the present disclosure;

FIG. 11-3 is a composition schematic diagram III of the information processing system according to Embodiment Eleven of the present disclosure;

DETAILED DESCRIPTION

Figure 1:
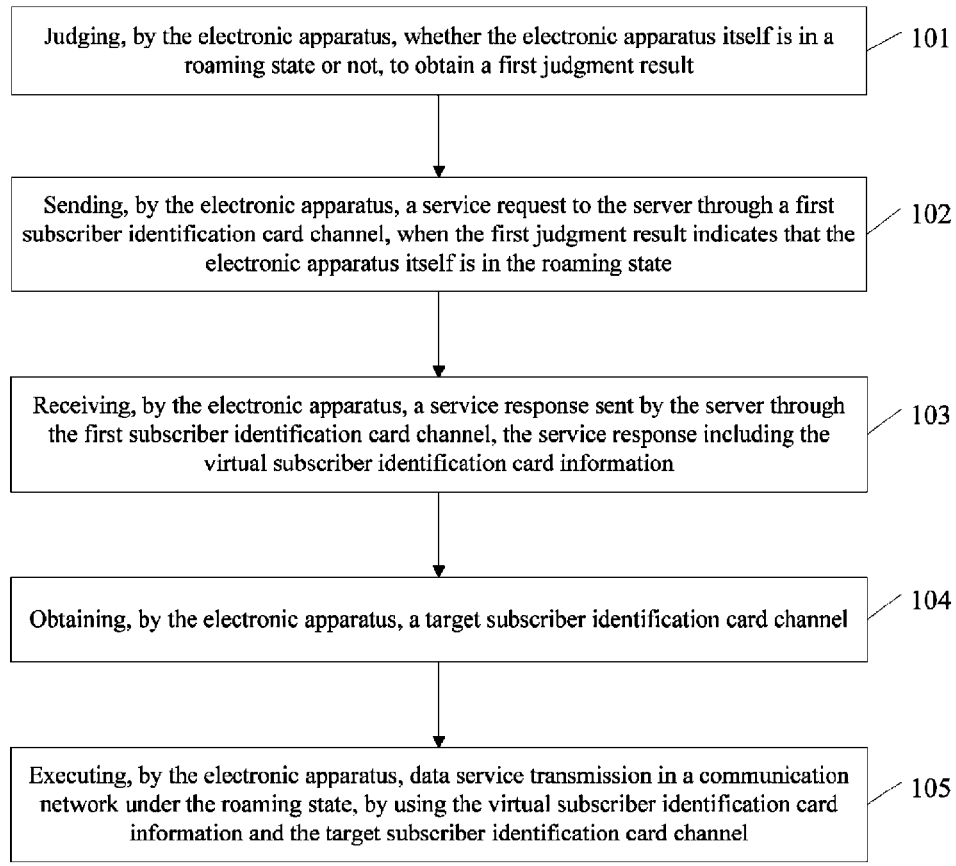
FIG. 1 is an implementation flow schematic diagram of an information processing method according to Embodiment One of the present disclosure.

The electronic apparatus involved in the respective embodiments of the present disclosure below refers to a kind of multi-card multi-standby mobile terminal capable of supporting a plurality of subscriber identification cards. The expression "multi" means two or more, and the mobile terminal mainly refers to a mobile phone as a typical representative. The electronic apparatus applicable to the embodiments of the present disclosure may be such a kind of mobile terminal, the mobile terminal refers to a subscriber apparatus itself having card slots for two or more subscriber identification cards, and the aforesaid card slot for the subscriber identification card is a mechanical structure capable of accommodating the subscriber identification card. As can be seen from the above description, the mobile terminal is actually a set-card separated mobile phone terminal. The set-card separated mobile phone terminal implements functional modules corresponding to network authentication account information and authentication algorithms by using a dedicated card and the card is referred to as a Subscriber Identifier Module (SIM) card, which can be connected with the mobile terminal via a card slot for accommodating the subscriber identification card. Since the set-card separated mobile phone terminal separates the network authentication account information from the mobile terminal, a same SIM card can be easily used on different types of mobile terminals. After the mobile terminal is replaced, the SIM card information is directly available for a new mobile terminal, which is very convenient. The set-card separated mobile phone terminal is a main structure pattern of the mobile terminal at present.

In fact, the electronic apparatus according to the embodiments of the present disclosure may also be such a type of integrated mobile phone terminal. Although the integrated mobile phone terminal itself does not have the card slots for two or more subscriber identification cards, the integrated mobile phone terminal can support two or more types of subscriber identification cards, which is embodied in that: the integrated mobile phone terminal does not physically have the card slots for two or more subscriber identification cards, yet the functional modules corresponding to the network authentication account information and the authentication algorithms which belong to the subscriber identification cards are fabricated together with the mobile phone terminal, and cannot be separated.

In combination with the aforesaid set-card separated mobile phone terminal and the integrated mobile phone terminal, the electronic apparatus according to the embodiments of the present disclosure may also be such a type of mobile terminal that the mobile terminal itself has a card slot for one subscriber identification card, but on the mobile terminal, the functional modules corresponding to the network authentication account information and the authentication algorithms which belong to other subscriber identification cards are fabricated together with the mobile terminal, and cannot be separated. Thus, the mobile terminal can support a plurality of subscriber identification cards.

Hereinafter, the technical solutions of the present disclosure will be further elaborated in conjunction with the accompanying drawings and the specific embodiments.

Embodiment One

The embodiment of the present disclosure provides an information processing method, applied to an electronic apparatus capable of supporting two or more subscriber identification cards. A function implemented by the information processing method can be achieved through calling a program code by a processor in the electronic apparatus. Of course, the program code may be stored in a computer storage medium. It can be seen that, the electronic apparatus includes at least the processor and the storage medium. FIG. 1 is an implementation flow schematic diagram of the information processing method according to Embodiment One of the present disclosure. As shown in FIG. 1, the information processing method comprises steps 101-105.

Step 101: judging, by the electronic apparatus, whether the electronic apparatus itself is in a roaming state or not, to obtain a first judgment result.

Here, the roaming state refers to that the electronic apparatus is located in a country or a region or a province other than where the subscriber identification card on the electronic apparatus belongs to. For example, when an electronic apparatus A1 supports two subscriber identification cards A2 and A3. A subscriber home place of the subscriber identification card A2 belongs to Beijing, and a subscriber home place of the subscriber identification card A3 belongs to Shanghai, then, when the subscriber carries the electronic apparatus A1 in Hong Kong, the electronic apparatus A1 is in the roaming state. For another example, when the subscriber carrying the electronic apparatus A1 returns to Beijing, since the subscriber home place of the subscriber identification card A2 belongs to Beijing, the electronic apparatus A1 is not in the roaming state; likewise, when the subscriber carries the electronic apparatus A1 in Shanghai, the electronic apparatus A1 is not in the roaming state, either.

Step 102: sending, by the electronic apparatus, a service request to the server through a first subscriber identification card channel, when the first judgment result indicates that the electronic apparatus itself is in the roaming state.

Here, the service request is used for requesting the server to allocate virtual subscriber identification card information to the electronic apparatus, and a virtual subscriber identification card is virtual and belongs to a current place where the electronic apparatus is located;

Step 103: receiving, by the electronic apparatus, a service response sent by the server through the first subscriber identification card channel, the service response including the virtual subscriber identification card information.

Here, when the electronic apparatus is an integrated mobile phone terminal, the first subscriber identification card corresponding to the first subscriber identification card channel may be a subscriber identification card configured on the electronic apparatus and not belonging to a roaming place. For the integrated mobile phone terminal, the first subscriber identification card is a type of card that may not really exist in form. In other words, in a process of specific implementation, the subscriber identification card of the integrated mobile phone terminal may also be a type of subscriber identification card information (network authentication account information and authentication algorithms) pre-stored on the electronic apparatus. When the electronic apparatus is a set-card separated mobile phone terminal, the first subscriber identification card on the first subscriber identification card channel may be a subscriber identification card installed in a card slot of the electronic apparatus and not belonging to the roaming place.

Step 104: obtaining, by the electronic apparatus, a target subscriber identification card channel.

Step 105: executing, by the electronic apparatus, data service transmission in a communication network under the roaming state, by using the virtual subscriber identification card information and the target subscriber identification card channel.

In the embodiment of the present disclosure, the judging, by the electronic apparatus, whether the electronic apparatus itself is in a roaming state or not includes: receiving, by the electronic apparatus, network stay information sent by a network side, and determining that the electronic apparatus itself is in the roaming state, when a circuit-switched network in the network stay information is changed into international roaming; or, receiving, by the electronic apparatus, cell location information sent by a base station, and determining that the electronic apparatus itself is in the roaming state, when the cell location information is international roaming.

In the embodiment of the present disclosure, the method may further comprise: making a phone call, by the electronic apparatus, by using a local subscriber identification card, and/or, obtaining, by the electronic apparatus, data traffic by using the local subscriber identification card, when the first judgment result indicates that the electronic apparatus is not in the roaming state.

Here, the local subscriber identification card is a subscriber identification card belonging to a local place. For example, the electronic apparatus A1 supports two subscriber identification cards A2 and A3. A subscriber home place of the subscriber identification card A2 belongs to Beijing, and a subscriber home place of the subscriber identification card A3 belongs to Shanghai. Then, when the subscriber carries the electronic apparatus A1 in Shanghai, the electronic apparatus A1 is not in the roaming state, because the subscriber identification card A3 is just the local subscriber identification card; then the subscriber makes a phone call by using the subscriber identification card A3, and obtains data traffic by using the subscriber identification card A3 when surfing the net. For another example, when the subscriber carrying the electronic apparatus A1 returns to Beijing, since the subscriber home place of the subscriber identification card A2 is just Beijing, the electronic apparatus A1 is not in the roaming state. Then, the subscriber makes a phone call by using the subscriber identification card A2, and obtains data traffic by using the subscriber identification card A2 when surfing the net.

In the embodiment of the present disclosure, the electronic apparatus sends the service request to the server through the first subscriber identification card channel, when the electronic apparatus itself is in the roaming state; the electronic apparatus receives a service response sent by the server through the first subscriber identification card channel, the service response including the virtual subscriber identification card information; the electronic apparatus obtains a target subscriber identification card channel; and the electronic apparatus executes data service transmission in a communication network under the roaming state, by using the virtual subscriber identification card information and the target subscriber identification card channel. Thus, the electronic apparatus, when roaming occurs, can apply for the virtual subscriber identification card from the server, to use the network provided by the local operator, so as to avoid the expensive roaming fees.

Embodiment Two

Hereinafter, the subscriber identification card according to Embodiment One of the present disclosure will be introduced in detail, which includes a real subscriber identification card and a virtual subscriber identification card. The real subscriber identification card includes subscriber identification cards applicable to second-generation (2G) mobile communication, third-generation (3G) mobile communication, and fourth-generation and above (4G and 5G) mobile communication, etc. The subscriber identification card of the 2G mobile communication is generally referred to as a Subscriber Identity Module (SIM) card and the subscriber identification card for the 3G mobile communication is generally referred to as a Universal Subscriber Identity Module (USIM) card.

For a set-card separated mobile phone terminal, the real subscriber identification card refers to a tangible subscriber identification card independent of the mobile terminal, containing a separate integrated circuit chip and programs running thereon, and is plugged in a card slot of the mobile terminal based on a certain interface standard. For the integrated mobile phone terminal, the real subscriber identification card may be the subscriber identification card information (network authentication account information and authentication algorithms) pre-stored on the electronic apparatus.

The virtual subscriber identification card refers to an intangible subscriber identification card, which implements functions of the real subscriber identification card by a processing function of the mobile terminal and a processing function of the server. The function implemented by the mobile terminal refers to that the mobile terminal obtains some information (which is referred to as virtual subscriber identification card information) from the server, the information being similar to the information on the real subscriber identification card, and including the network authentication account information and the authentication algorithms stored on the real subscriber identification card.

Here, the virtual subscriber identification card differs from the subscriber identification card on the integrated mobile phone terminal in that: the virtual subscriber identification card information is obtained by temporarily applying to the server, which is sent by the server to the electronic apparatus, so that the electronic apparatus uses the communication network to which the virtual subscriber identification card belongs. However, the subscriber identification card information on the integrated mobile phone terminal is the subscriber identification card information fixed on the integrated mobile phone terminal by the network operator when the subscriber purchases the integrated mobile phone terminal or initializes the integrated mobile phone terminal. It should be illustrated that the word "temporarily" for the virtual subscriber identification card means that the subscriber can apply for the virtual subscriber identification card from the server according to his/her own requirement at any time (when the electronic apparatus is in the roaming state), for use when roaming. Naturally, when the subscriber feels that the virtual subscriber identification card is not needed, he/she can also apply for uninstalling to the server. And the word "fixed" for the integrated mobile phone terminal means that the subscriber identification card information on the mobile phone terminal cannot be changed randomly by the subscriber.

The target subscriber identification card channel according to Embodiment One is just a channel of a subscriber identification card on the electronic apparatus. Hereinafter, with the electronic apparatus according to the embodiment of the present disclosure represented by a double-card double-standby mobile phone as an example, the above-described subscriber identification card channel will be introduced. The double-card double-standby mobile phone generally includes two cases, of which a first case is that: the mobile phone has two sets of subscriber identification card channels, including two sets of radio frequency (RF) processing units, two sets of modem units, two sets of base band processing units and two sets of separate protocol stacks. The radio frequency processing unit includes a radio frequency link. Of course, the radio frequency link includes antennas for receiving and transmitting data. For the first case, each subscriber identification card uses a set of subscriber identification card channel separately to accomplish data transmitting and receiving. At this time, it is equivalent to that the virtual subscriber identification card uses one set of the subscriber identification card channel therein. The second case is that the two sets of subscriber identification card channels owned by the mobile phone only include one set of radio frequency processing unit, one set of base band processing unit, two sets of modem units and one set of protocol stacks mutually cooperated or two sets of separate protocol stacks. When used specifically, the two sets of subscriber identification card channels cannot really run in parallel, but are only allocated to one subscriber identification card in the mobile phone in a specific physical time slot. For the second case, the subscriber identification card channels include one set of modem unit, a shared radio frequency processing unit, a shared base band processing unit, and shared protocol stacks mutually cooperated or one set of separate protocol stacks.

Figures 1, 2:
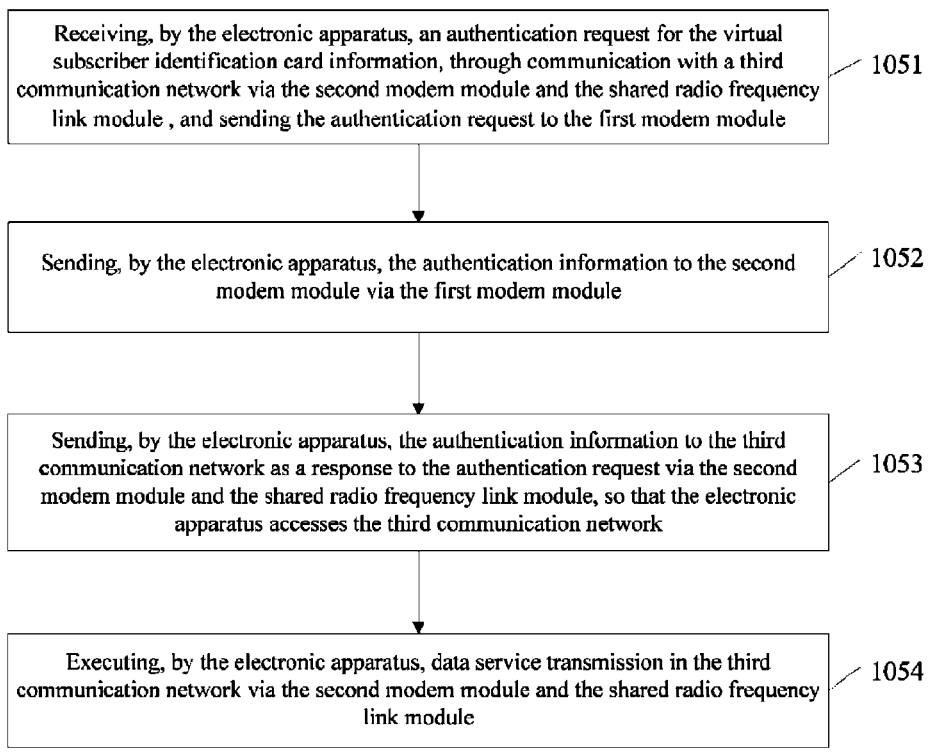
Figure 2:
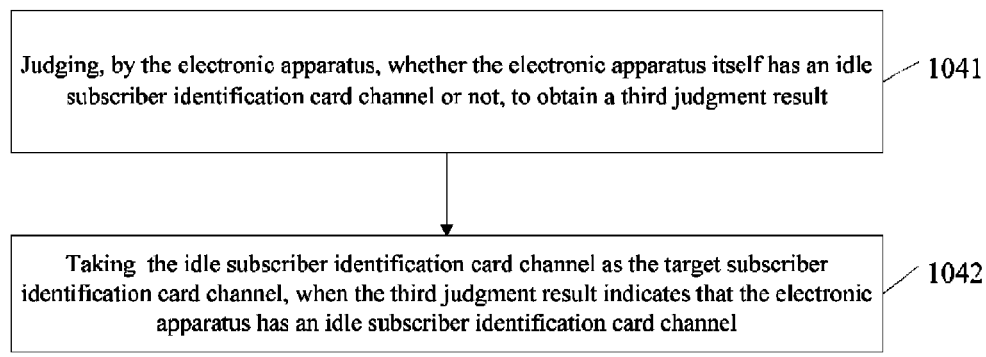

Hereinafter, with the electronic apparatus including two subscriber identification card channels as an example, the subscriber identification card channel according to the embodiment of the present disclosure is illustrated. The two subscriber identification card channels include the first subscriber identification card channel and a second subscriber identification card channel which is used as a target subscriber identification card channel. The first subscriber identification card channel and the second subscriber identification card channel include a first modem module, a second modem module, and a shared radio frequency link module. The first subscriber identification card channel is capable of executing data service transmission in a first communication network via the first modem module and the shared radio frequency link module, and the second subscriber identification card channel is capable of executing data service transmission in a second communication network via the second modem module and the shared radio frequency link module. Correspondingly, as shown in FIG. 2-1, the step 105: executing, by the electronic apparatus, data service transmission in a communication network under the roaming state, by using the virtual subscriber identification card information and the target subscriber identification card channel, includes steps 1051 to 1054.

Step 1051: receiving, by the electronic apparatus, an authentication request for the virtual subscriber identification card information, through communication with a third communication network via the second modem module and the shared radio frequency link module, and sending the authentication request to the first modem module.

Step 1052: obtaining, by the electronic apparatus, authentication information, through communication with the server via the first modem module and the radio frequency link module, and sending the authentication information to the second modem module.

Step 1053: sending, by the electronic apparatus, the authentication information to the third communication network as a response to the authentication request, via the second modem module and the shared radio frequency link module, so that the electronic apparatus accesses the third communication network.

Step 1054: executing, by the electronic apparatus, data service transmission in the third communication network, via the second modem module and the shared radio frequency link module.

Here, in the step 1054, the electronic apparatus makes a phone call and/or, obtains data traffic, in the third communication network, via the second modem module and the shared radio frequency link module.

Several manners for implementing the above-described step 104 are introduced below.

A first manner: as shown in FIG. 2-2, the obtaining, by the electronic apparatus, a target subscriber identification card channel includes steps 1041 and 1042.

Step 1041: judging, by the electronic apparatus, whether the electronic apparatus itself has an idle subscriber identification card channel or not, to obtain a third judgment result.

Step 1042: taking, when the third judgment result indicates that the electronic apparatus has an idle subscriber identification card channel, the idle subscriber identification card channel as the target subscriber identification card channel.

For example, an electronic apparatus A1 supports two subscriber identification cards A2 and A4, wherein the electronic apparatus only has one subscriber identification card plugged in, i.e., the subscriber identification card A2. A subscriber home place of the subscriber identification card A2 belongs to Beijing, then the electronic apparatus still has the an idle subscriber identification card channel, i.e., a channel of the subscriber identification card A4. At this time, the electronic apparatus A1 takes the channel of the subscriber identification card A4 as the target subscriber identification card channel.

Figures 2, 3:
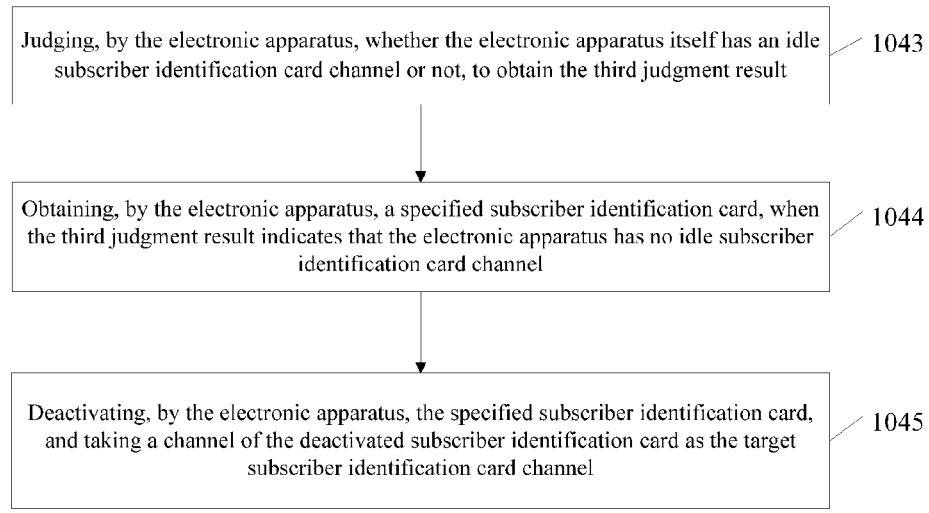

A second manner: as shown in FIG. 2-3, the obtaining, by the electronic apparatus, a target subscriber identification card channel includes steps 1043 and 1045.

Step 1043: judging, by the electronic apparatus, whether the electronic apparatus itself has an idle subscriber identification card channel or not, to obtain a third judgment result.

Step 1044: obtaining, by the electronic apparatus, a specified subscriber identification card, when the third judgment result indicates that the electronic apparatus has no idle subscriber identification card channel.

Here, the specified subscriber identification card is a subscriber identification card currently used on the electronic apparatus.

Step 1045: deactivating, by the electronic apparatus, the specified subscriber identification card, and taking a channel of the deactivated subscriber identification card as the target subscriber identification card channel.

For example, the electronic apparatus A1 supports two subscriber identification cards A2 and A3, and the electronic apparatus has two subscriber identification cards plugged in. A subscriber home place of the subscriber identification card A2 belongs to Beijing, and a subscriber home place of the subscriber identification card A3 belongs to Shanghai, then the electronic apparatus has no idle subscriber identification card channel. At this time, the electronic apparatus A1 obtains a specified subscriber identification card. It is assumed that the specified subscriber identification card is A2, then the electronic apparatus A1 deactivates the subscriber identification card A2, and takes the channel of the subscriber identification card A2 as the target subscriber identification card channel.

Two manners for implementing the step 1044 are further provided as below.

Figures 2, 3, 4:
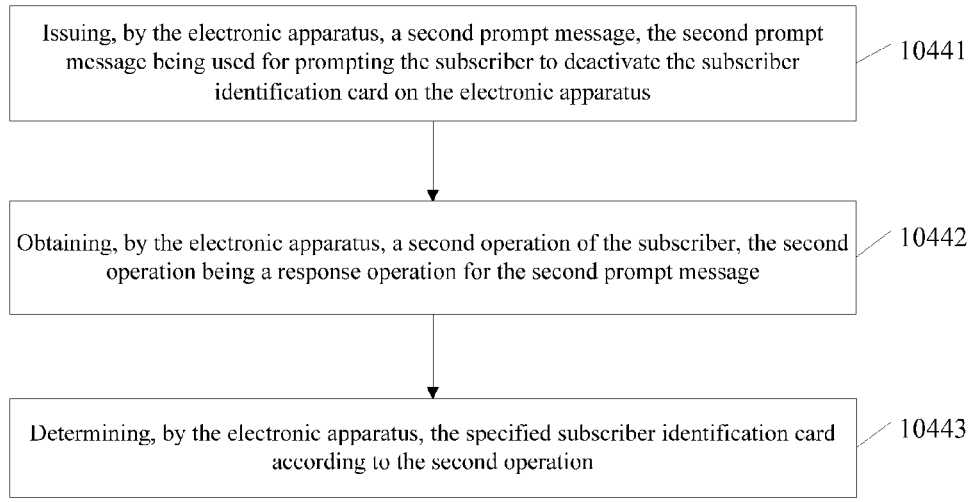
Figure 3:
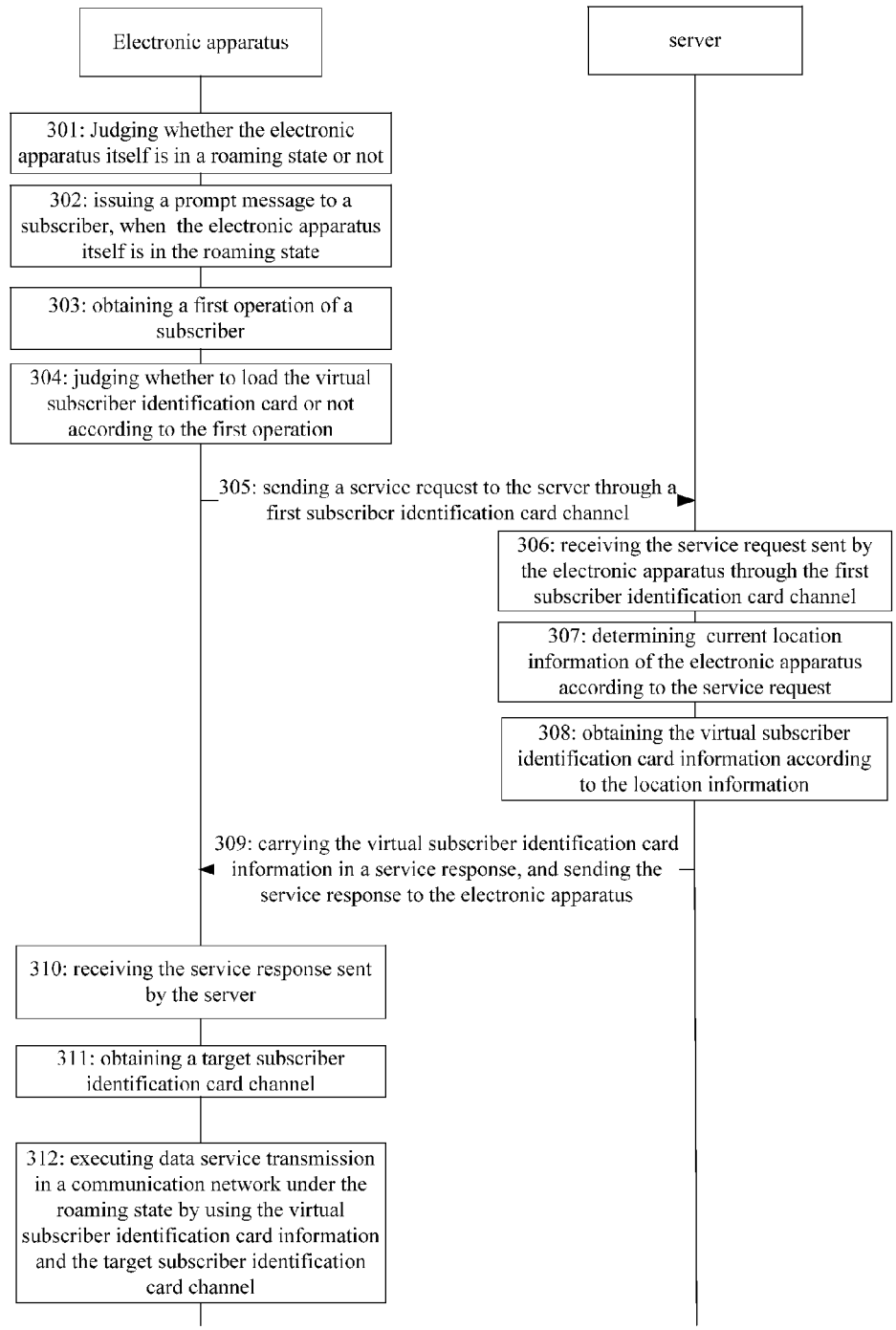
Figures 1, 4:
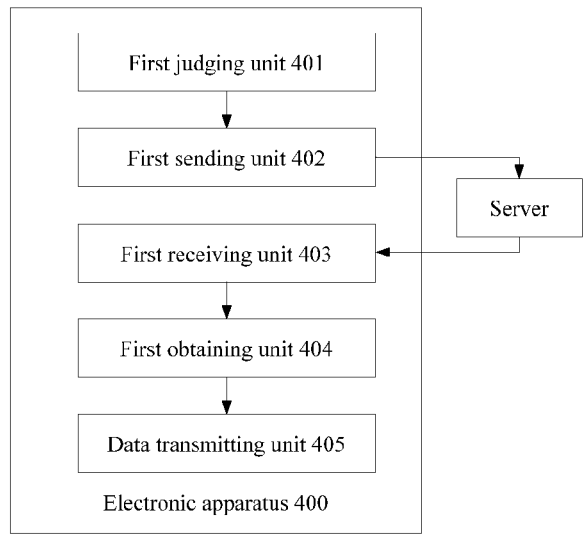
Figures 2, 4:
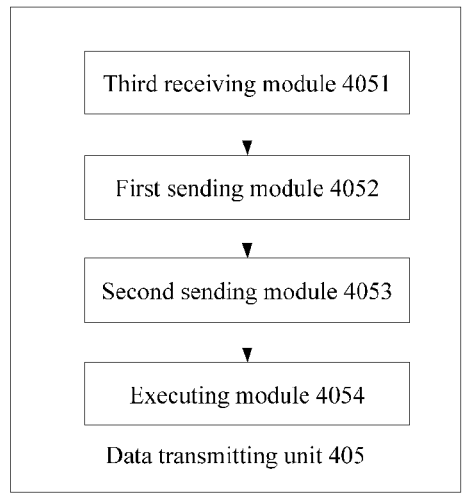
Figures 3, 4:
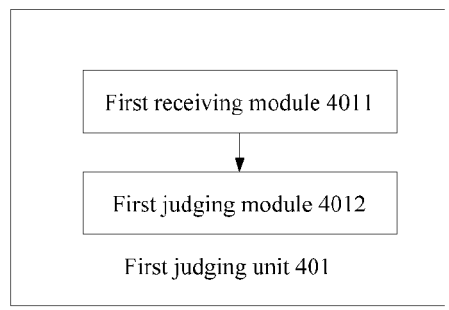
Figure 4:
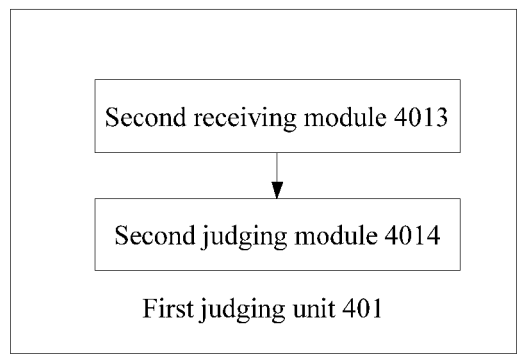

A first manner: as shown in FIG. 2-4, the step 1044: obtaining, by the electronic apparatus, a specified subscriber identification card includes steps 10441 to 10443.

Step 10441: issuing, by the electronic apparatus, a second prompt information, the second prompt information being used for prompting the subscriber to deactivate the subscriber identification card on the electronic apparatus.

Step 10442: obtaining, by the electronic apparatus, a second operation of the subscriber, the second operation being a response operation for the second prompt information.

Step 10443: determining, by the electronic apparatus, the specified subscriber identification card, according to the second operation.

For example, the electronic apparatus A1 supports two subscriber identification cards A2 and A3, and the electronic apparatus has two subscriber identification cards plugged in. A subscriber home place of the subscriber identification card A2 belongs to Beijing. A subscriber home place of the subscriber identification card A3 belongs to Shanghai, then the electronic apparatus has no idle subscriber identification card channel. At this time, the electronic apparatus A1 issues a second prompt information to the subscriber, so as to prompt the subscriber to deactivate either the subscriber identification card A2 or the subscriber identification card A3, the subscriber performs the first operation on the interface displayed by the electronic apparatus A1 according to the second prompt information issued. It is assumed that the subscriber chooses to deactivate the subscriber identification card A2, then the electronic apparatus A1 deactivates the subscriber identification card A2, and takes the channel of the subscriber identification card A2 as the target subscriber identification card channel.

A second manner: the step 1044: obtaining, by the electronic apparatus, a specified subscriber identification card includes: determining, by the electronic apparatus, the specified subscriber identification card according to a preset deactivation rule, the deactivation rule including a system default deactivation rule and a subscriber set deactivation rule.

For example, the electronic apparatus A1 supports two subscriber identification cards A2 and A3, and the electronic apparatus has two subscriber identification cards plugged in. A subscriber home place of the subscriber identification card A2 belongs to Beijing, and a subscriber home place of the subscriber identification card A3 belongs to Shanghai, then the electronic apparatus has no idle subscriber identification card channel. At this time, the electronic apparatus A1 obtains the deactivation rule. It is assumed that the deactivation rule is: the subscriber identification card A3 serves as a first option, and the subscriber identification card A2 serves as a second option. At this time, the electronic apparatus determines the specified subscriber identification card as the subscriber identification card A3 according to the deactivation rule. The electronic apparatus A1 deactivates the subscriber identification card A3, and takes the channel of the subscriber identification card A3 as the target subscriber identification card channel.

It should be illustrated that, in addition to the manners above, those skilled in the art can further implement the obtaining the target subscriber identification card by using various other prior arts, which will not be repeated.

Embodiment Three

Based on the aforesaid embodiments, the embodiment of the present disclosure provides an information processing method, applied to an electronic apparatus capable of supporting two or more subscriber identification cards. A function implemented by the information processing method can be achieved by calling a program code by using a processor in the electronic apparatus. Of course, the program code may be stored in a computer storage medium. It can be seen that, the electronic apparatus includes at least the processor and the storage medium. FIG. 3 is an implementation flow schematic diagram of the information processing method according to Embodiment Three of the present disclosure. As shown in FIG. 3, the information processing method comprises steps 301-312.

Step 301: judging, by the electronic apparatus, whether the electronic apparatus itself is in a roaming state or not, to obtain a first judgment result.

Step 302: issuing, by the electronic apparatus, a prompt information, when the first judgment result indicates that the electronic apparatus itself is in the roaming state, the prompt information being used for prompting the subscriber whether to load the virtual subscriber identification card or not.

Here, when one virtual subscriber identification card needs to be loaded, the one virtual subscriber identification card can be loaded by using one of the subscriber identification card channels on the electronic apparatus. For example, an electronic apparatus A1 supports two subscriber identification cards A2 and A4. A subscriber home place of the subscriber identification card A2 belongs to Beijing, and a subscriber home place of the subscriber identification card A4 also belongs to Beijing. When the subscriber carries the electronic apparatus in Hong Kong, the electronic apparatus A1 is in the roaming state. At this time, when the one virtual subscriber identification card needs to be loaded, the one subscriber identification card can be loaded by using the system of the subscriber identification card A2 or A4 on the electronic apparatus A1. When two virtual subscriber identification cards need to be loaded, the two virtual subscriber identification cards can be loaded by using two subscriber identification card channels on the electronic apparatus.

Step 303: obtaining, by the electronic apparatus, a first operation of the subscriber, the first operation being a response operation for the prompt information.

Step 304: judging, by the electronic apparatus, whether to load the virtual subscriber identification card or not according to the first operation, to obtain a second judgment result.

Step 305: sending, by the electronic apparatus, a service request to the server through a first subscriber identification card channel, when the second judgment result indicates that it is necessary to load the virtual subscriber identification card.

Here, the service request is used for requesting the server to allocate virtual subscriber identification card information to the electronic apparatus, and a virtual subscriber identification card is virtual and belongs to a current place where the electronic apparatus is located;

Here, the service request carries the subscriber identification information and current geographical location information of the electronic apparatus, and the subscriber identification information may be the information of the subscriber identification card being used, or the subscriber's account information and the like.

Step 306: receiving, by the server, the service request sent by the electronic apparatus through the first subscriber identification card channel.

Step 307: determining, by the server, the current location information of the electronic apparatus according to the service request.

Step 308: obtaining, by the server, the virtual subscriber identification card information according to the current location information.

Here, the virtual subscriber identification card information may be pre-stored in a list, a server operator purchases information of a number of (virtual) subscriber identification cards belonging to all parts of the world from network operators around the world. The subscriber identification card information includes network authentication account information and authentication algorithms on the subscriber identification card. In order to facilitate searching, the list may further store the location information, in addition to the virtual subscriber identification card information. Accordingly, the step 308 of obtaining, by the server, the virtual subscriber identification card information according to the location information may specifically include: searching, by the server, a pre-set list according to the location information, to obtain the virtual subscriber identification card information.

Step 309: carrying, by the server, the virtual subscriber identification card information in a service response, and sending the service response to the electronic apparatus.

Step 310: receiving, by the electronic apparatus, the service response sent by the server through the first subscriber identification card channel, the service response including the virtual subscriber identification card information.

Step 311: obtaining, by the electronic apparatus, a target subscriber identification card channel.

Step 312: executing, by the electronic apparatus, data service transmission in a communication network under the roaming state, by using the virtual subscriber identification card information and the target subscriber identification card channel.

Here, the above-described steps 301, 305, and 310 to 312 respectively correspond to steps 101 to 105 in Embodiment One. Those skilled in the art can refer to Embodiment One so as to understand the above-described steps 301, 305, and 310 to 312, which will not be repeated here in order to save space.

Embodiment Four

Based on the aforesaid information processing method, the embodiment of the present disclosure provides an electronic apparatus. A first judging unit, a first sending unit, a first receiving unit, a first obtaining unit and a data transmitting unit, as well as modules respectively included in the respective units in the electronic apparatus can all be implemented by a processor in the electronic apparatus; of course, they can also be implemented by a specific logic circuit. In a process of specific implementation, the processor may be a central processing unit (CPU), a micro processing unit (MPU), a digital signal processor (DSP) or a field programmable gate array (FPGA), and so on.

FIG. 4-1 is a composition structural schematic diagram of the electronic apparatus according to Embodiment Four of the present disclosure. As shown in FIG. 4-1, an electronic apparatus 400 comprises a first judging unit 401, a first sending unit 402, a first receiving unit 403, a first obtaining unit 404 and a data transmitting unit 405.

The first judging unit 401 is used for judging whether the electronic apparatus itself is in a roaming state or not, to obtain a first judgment result.

The first sending unit 402 is used for sending a service request to the server through a first subscriber identification card channel, when the first judgment result indicates that the electronic apparatus itself is in the roaming state. The service request is used for requesting the server to allocate virtual subscriber identification card information to the electronic apparatus. A virtual subscriber identification card is virtual and belongs to a current place where the electronic apparatus is located.

The first receiving unit 403 is used for receiving a service response sent by the server through the first subscriber identification card channel. The service response includes the virtual subscriber identification card information.

The first obtaining unit 404 is used for obtaining a target subscriber identification card channel.

The data transmitting unit 405 is used for executing data service transmission in a communication network under the roaming state by using the virtual subscriber identification card information and the target subscriber identification card channel.

In the embodiment of the present disclosure, the electronic apparatus comprises the first subscriber identification card channel and a second subscriber identification card channel which is used as the target subscriber identification card channel. The first subscriber identification card channel and the second subscriber identification card channel including a first modem module, a second modem module and a shared radio frequency link module. The first subscriber identification card channel is capable of executing the data service transmission in a first communication network via the first modem module and the shared radio frequency link module, and the second subscriber identification card channel is capable of executing the data service transmission in a second communication network via the second modem module and the shared radio frequency link module.

As shown in FIG. 4-2, the data transmitting unit 405 includes a third receiving module 4051, a first sending module 4052, a second sending module 4053 and an executing module 4054.

The third receiving module 4051 receives an authentication request for the virtual subscriber identification card information through communication with the third communication network via the second modem module and the shared radio frequency link module, and sends the authentication request to the first modem module.

The first sending module 4052 obtains the authentication information through interaction with the server via the first modem module and the shared radio frequency link module, and sends the authentication information to the second modem module.

The second sending module 4053 is used for sending the authentication information to the third communication network as a response to the authentication request via the second modem module and the shared radio frequency link module, so that the electronic apparatus accesses the third communication network.

The executing module 4054 is used for executing data service transmission in the third communication network via the second modem module and the shared radio frequency link module.

Here, the executing module 4054 is used for making a phone call and/or, obtaining data traffic in the third communication network via the second modem module and the shared radio frequency link module.

In the embodiment of the present disclosure, as shown in FIG. 4-3, the first judging unit 401 includes a first receiving module 4011 and a first judging module 4012.

The first receiving module 4011 is used for receiving network stay information sent by a network side.

The first judging module 4012 is used for judging whether a circuit-switched network in the network stay information is changed into international roaming or not, to obtain a first judgment result.

Correspondingly, it is determined that the electronic apparatus itself is in the roaming state, when the first judgment result indicates that the circuit-switched network in the network stay information is changed into international roaming.

In the embodiment of the present disclosure, as shown in FIG. 4-4, the first judging unit 401 includes a second receiving module 4013 and a second judging module 4014. The second receiving module 4013 is used for receiving cell location information sent by a base station. The second judging module 4014 is used for judging whether the cell location information is international roaming or not, to obtain a first judgment result. Correspondingly, it is determined that the electronic apparatus itself is in the roaming state, when the first judgment result indicates that the cell location information is international roaming.

Embodiment Five

Based on the aforesaid Embodiment Four, the embodiment of the present disclosure provides an information processing system comprising an electronic apparatus and a server. A first judging unit, a first sending unit, a first receiving unit, a first obtaining unit, and a data transmitting unit, as well as modules respectively included in the respective units in the electronic apparatus can all be implemented by a processor in the electronic apparatus. A second receiving unit, a determining unit, a third obtaining unit and a second sending unit in the server can all be implemented by a processor in the electronic apparatus. Of course, the aforesaid functions implemented by the processor can also be implemented by a specific logic circuit. In a process of specific implementation, the processor may be a central processing unit, a micro processing unit, a digital signal processor or a field programmable gate array, and so on.

Figure 5:
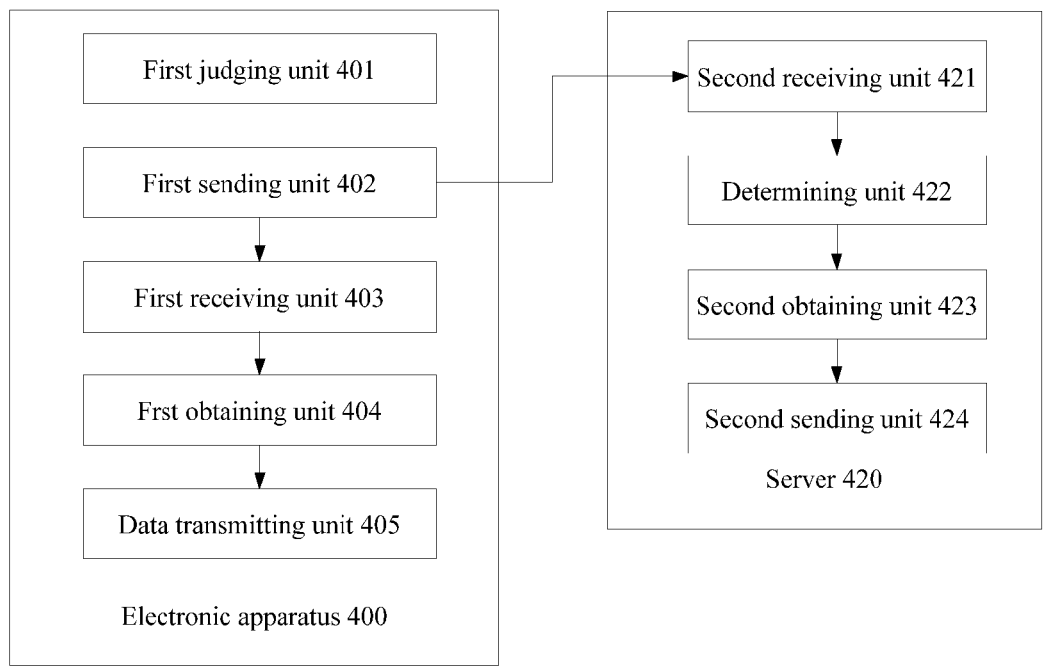
FIG. 5 is a composition structural schematic diagram of an information processing system according to Embodiment Five of the present disclosure.

FIG. 5 is a composition structural schematic diagram of the information processing system according to Embodiment Five of the present disclosure. As shown in FIG. 5, the information processing system includes an electronic apparatus 400 and a server 500. The electronic apparatus 400 comprises a first judging unit 401, a first sending unit 402, a first receiving unit 403, a first obtaining unit 404 and a data transmitting unit 405, and the server 420 comprises a second receiving unit 421, a determining unit 422, a third obtaining unit 423 and a second sending unit 424.

The first judging unit 401 is used for judging whether the electronic apparatus itself is in a roaming state or not, to obtain a first judgment result.

The first sending unit 402 is used for sending a service request to the server through a first subscriber identification card channel, when the first judgment result indicates that the electronic apparatus itself is in the roaming state. The service request is used for requesting the server to allocate virtual subscriber identification card information to the electronic apparatus, and a virtual subscriber identification card is virtual and belongs to a current place where the electronic apparatus is located.

The second receiving unit 421 is used for receiving the service request sent by an electronic apparatus through the first subscriber identification card channel.

The determining unit 422 is used for determining current location information of the electronic apparatus according to the service request.

The third obtaining unit 423 is used for obtaining the virtual subscriber identification card information according to the current location information.

The second sending unit 424 is used for carrying the virtual subscriber identification card information in a service response, and sending the service response to the electronic apparatus.

The first receiving unit 403 is used for receiving the service response sent by the server through the first subscriber identification card channel, the service response including the virtual subscriber identification card information.

The first obtaining unit 404 is used for obtaining a target subscriber identification card channel.

The data transmitting unit 405 is used for executing data service transmission in a communication network under the roaming state, by using the virtual subscriber identification card information and the target subscriber identification card channel.

In the embodiment of the present disclosure, the electronic apparatus comprises the first subscriber identification card channel and a second subscriber identification card channel which is used as the target subscriber identification card channel. The first subscriber identification card channel and the second subscriber identification card channel includes a first modem module, a second modem module and a shared radio frequency link module. The first subscriber identification card channel is capable of executing data service transmission in a first communication network via the first modem module and the shared radio frequency link module, and the second subscriber identification card channel being capable of executing the data service transmission in a second communication network via the second modem module and the shared radio frequency link module. The data transmitting unit includes a third receiving module, a first sending module, a second sending module and an executing module.

The third receiving module receives an authentication request for the virtual subscriber identification card information, through communication with the third communication network via the second modem module and the shared radio frequency link module, and sends the authentication request to the first modem module.

The first sending module is used for obtaining authentication information, through communication with the server via the first modem module and the shared radio frequency link module, and sending the authentication information to the second modem module.

The second sending module is used for sending the authentication information to the third communication network as a response to the authentication request, via the second modem module and the shared radio frequency link module, so that the electronic apparatus accesses the third communication network.

The executing module is used for executing data service transmission in the third communication network via the second modem module and the shared radio frequency link module.

Here, the executing module is used for making a phone call and/or, obtaining data traffic, in the third communication network, via the second modem module and the shared radio frequency link module.

In the embodiment of the present disclosure, the first judging unit includes a first receiving module and a first judging module. The first receiving module is used for receiving network stay information sent by a network side. The first judging module is used for judging whether a circuit-switched network in the network stay information is changed into international roaming or not, to obtain a first judgment result. Correspondingly, it is determined that the electronic apparatus itself is in the roaming state, when the first judgment result indicates that the circuit-switched network in the network stay information is changed into international roaming.

Alternatively, the first judging unit includes a second receiving module and a second judging module. The second receiving module is used for receiving cell location information sent by a base station. The second judging module is used for judging whether the cell location information is international roaming or not, to obtain a first judgment result. Correspondingly, it is determined that the electronic apparatus itself is in the roaming state, when the first judgment result indicates that the cell location information is international roaming.

Embodiment Six

Based on the aforesaid embodiments, the embodiment of the present disclosure provides an information processing system which comprises an electronic apparatus and a server. A first judging unit, a first sending unit, a first receiving unit, a first obtaining unit, a data transmitting unit, an issuing unit, a second obtaining unit and a second judging unit, as well as modules respectively included in the respective units in the electronic apparatus can all be implemented by a processor in the electronic apparatus. A second receiving unit, a determining unit, a third obtaining unit and a second sending unit of the server can all be implemented by a processor in the server. Of course, the aforesaid functions implemented by the processor can also be implemented by a specific logic circuit. In a process of specific implementation, the processor may be a central processing unit, a micro processing unit, a digital signal processor or a field programmable gate array, and so on.

Figure 6:
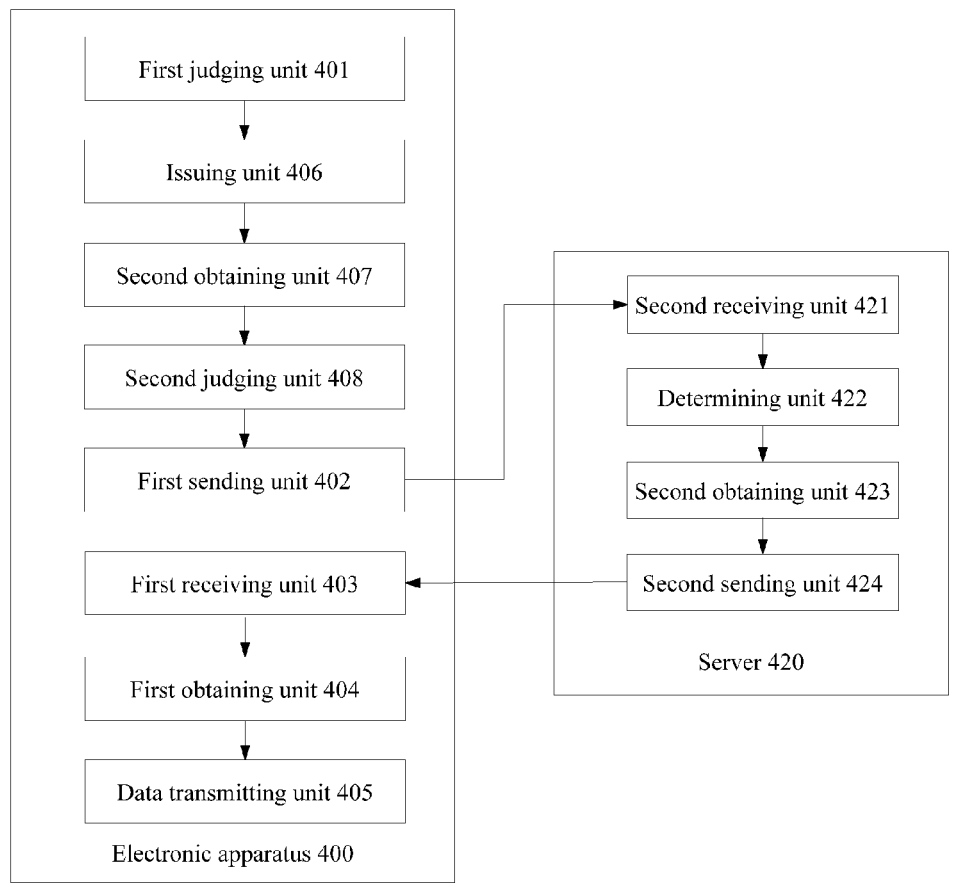
FIG. 6 is a composition structural schematic diagram of an information processing system according to Embodiment Six of the present disclosure.

FIG. 6 is a composition structural schematic diagram of the information processing system according to Embodiment Six of the present disclosure. As shown in FIG. 6, the information processing system includes an electronic apparatus 400 and the server 420. The electronic apparatus 400 comprises a first judging unit 401, an issuing unit 406, a second obtaining unit 407, a second judging unit, 408, a first sending unit 402, a first receiving unit 403, a first obtaining unit 404, and a data transmitting unit 405. The server 420 comprises a second receiving unit 421, a determining unit 422, a third obtaining unit 423 and a second sending unit 424.

The first judging unit 401 is used for judging whether the electronic apparatus itself is in a roaming state or not, to obtain a first judgment result.

The issuing unit 406 is used for issuing a prompt information, when the first judgment result indicates that the electronic apparatus itself is in the roaming state. The prompt information is used for prompting the subscriber whether to load the virtual subscriber identification card or not.

The second obtaining unit 407 is used for obtaining a first operation of the subscriber, the first operation being a response operation for the prompt information.

The second judging unit 408 is used for judging whether to load the virtual subscriber identification card or not according to the first operation, to obtain a second judgment result; and triggering the first sending unit, when the second judgment result indicates that it is necessary to load the virtual subscriber identification card.

The first sending unit 402 is used for sending a service request to the server through a first subscriber identification card channel. The service request is used for requesting the server to allocate virtual subscriber identification card information to the electronic apparatus. A virtual subscriber identification card is virtual and belongs to a current place where the electronic apparatus is located.

The second receiving unit 421 is used for receiving the service request sent by the electronic apparatus through the first subscriber identification card channel.

The determining unit 422 is used for determining current location information of the electronic apparatus according to the service request.

The third obtaining unit 423 is used for obtaining the virtual subscriber identification card information according to the current location information.

The second sending unit 424 is used for carrying the virtual subscriber identification card information in a service response, and sending the service response to the electronic apparatus.

The first receiving unit 403 is used for receiving the service response sent by the server through the first subscriber identification card channel, the service response including the virtual subscriber identification card information.

The first obtaining unit 404 is used for obtaining a target subscriber identification card channel.

The data transmitting unit 405 is used for executing data service transmission in a communication network under a roaming state via the virtual subscriber identification card information and the target subscriber identification card channel.

In the embodiment of the present disclosure, the electronic apparatus comprises the first subscriber identification card channel and a second subscriber identification card channel which is used as the target subscriber identification card channel. The first subscriber identification card channel and the second subscriber identification card channel includes a first modem module, a second modem module and a shared radio frequency link module. The first subscriber identification card channel is capable of executing data service transmission in a first communication network via the first modem module and the shared radio frequency link module, and the second subscriber identification card channel is capable of executing data service transmission in a second communication network via the second modem module and the shared radio frequency link module. The data transmitting unit includes a third receiving module, a first sending module, a second sending module and an executing module.

The third receiving module is used for receiving an authentication request for the virtual subscriber identification card information, through communication with the third communication network via the second modem module and the shared radio frequency link module, and sending the authentication request to the first modem module.

The first sending module is used for obtaining the authentication information, through interaction with the server via the first modem module and the radio frequency link module, and sending the authentication information to the second modem module.

The second sending module is used for sending the authentication information to the third communication network as a response to the authentication request via the second modem module and the shared radio frequency link module, so that the electronic apparatus accesses the third communication network.

The executing module is used for executing data service transmission in the third communication network, via the second modem module and the shared radio frequency link module.

Here, the executing module is used for making a phone call and/or, obtaining data traffic in the third communication network via the second modem module and the shared radio frequency link module.

In the embodiment of the present disclosure, the first judging unit includes a first receiving module and a first judging module. The first receiving module is used for receiving network stay information sent by a network side. The first judging module is used for judging whether a circuit-switched network in the network stay information is changed into international roaming or not, to obtain a first judgment result. Correspondingly, it is determined that the electronic apparatus itself is in the roaming state, when the first judgment result indicates that the circuit-switched network in the network stay information is changed into international roaming.

Alternatively, the first judging unit includes a second receiving module and a second judging module. The second receiving module receives cell location information sent by a base station. The second judging module judges whether the cell location information is international roaming or not, to obtain a first judgment result. Correspondingly, it is determined that the electronic apparatus itself is in the roaming state, when the first judgment result indicates that the cell location information is international roaming.

Here, it should be pointed out that: the above description of the embodiments of the electronic apparatus and the embodiments of the information processing system is similar to the description of the above-described information processing method, and the embodiments of the electronic apparatus and the embodiments of the information processing system have the same advantageous effects as the embodiments of the information processing method, which thus will not be repeated. For details that are not disclosed in the embodiments of the electronic apparatus and the embodiments of the information processing system, those skilled in the art may refer to the description of the embodiments of the information processing method of the present disclosure for understanding, which will not be repeated here in order to save space.

Embodiment Seven

Figure 7:
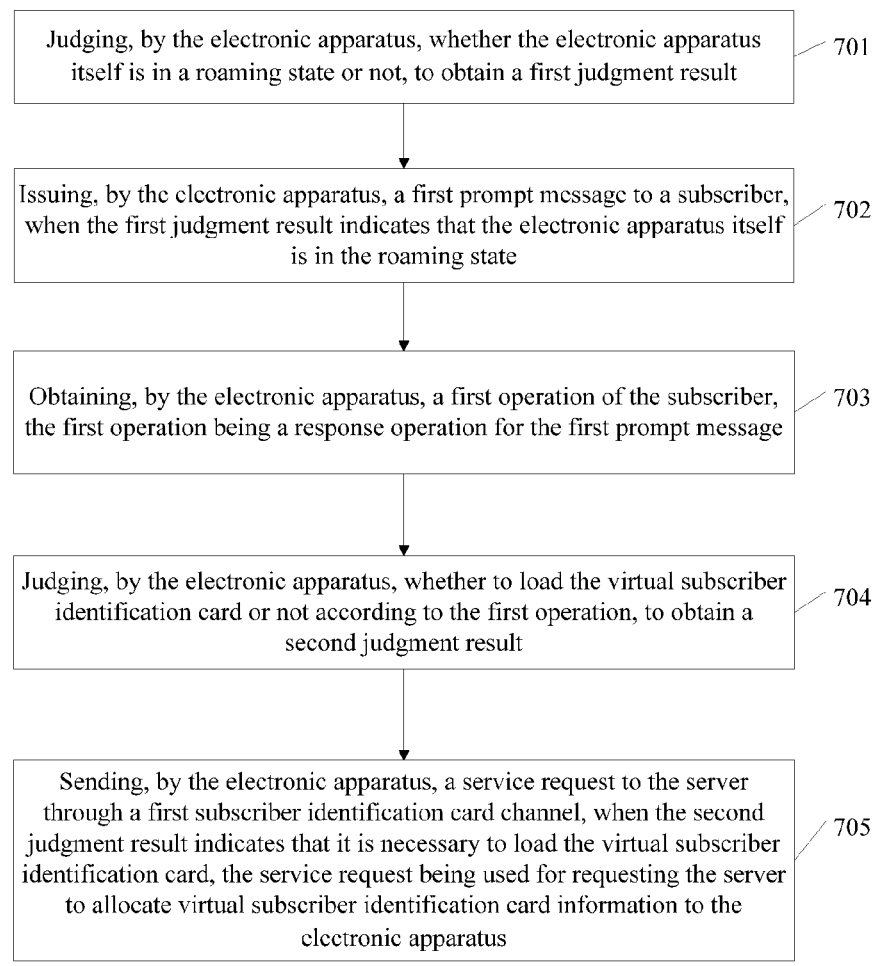
FIG. 7 is an implementation flow schematic diagram of an information processing method according to Embodiment Seven of the present disclosure.

The embodiment of the present disclosure provides an information processing method, applied to an electronic apparatus capable of supporting two or more subscriber identification cards. A function implemented by the information processing method can be achieved by calling a program code by using a processor in the electronic apparatus. Of course the program code may be stored in a computer storage medium. It can be seen that the electronic apparatus includes at least the processor and the storage medium. FIG. 7 is an implementation flow schematic diagram of the information processing method according to Embodiment Seven of the present disclosure. As shown in FIG. 7, the information processing method comprises steps 701 to 705.

Step 701: judging, by the electronic apparatus, whether the electronic apparatus itself is in a roaming state or not, to obtain a first judgment result.

Here, the roaming state refers to that the electronic apparatus is located in a country or a region or a province other than where the subscriber identification card on the electronic apparatus belongs to. For example, when an electronic apparatus A1 supports two subscriber identification cards A2 and A3. A subscriber home place of the subscriber identification card A2 belongs to Beijing, and a subscriber home place of the subscriber identification card A3 belongs to Shanghai. When the subscriber carries the electronic apparatus A1 in Hong Kong, the electronic apparatus A1 is in the roaming state. For another example, when the subscriber carrying the electronic apparatus A1 returns to Beijing, since the subscriber home place of the subscriber identification card A2 belongs to Beijing, the electronic apparatus A1 is not in the roaming state; likewise, when the subscriber carries the electronic apparatus A1 in Shanghai, the electronic apparatus A1 is not in the roaming state, either.

Step 702: issuing, by the electronic apparatus, a first prompt information to a subscriber, when the first judgment result indicates that the electronic apparatus itself is in the roaming state.

Here, the first prompt information is used for prompting the subscriber whether to load a virtual subscriber identification card by using the subscriber identification card channel on the electronic apparatus or not, the virtual subscriber identification card being virtual and belonging to a current place where the electronic apparatus is located.

Here, when one virtual subscriber identification card needs to be loaded, the one virtual subscriber identification card can be loaded by using one of the subscriber identification card channels on the electronic apparatus. For example, the electronic apparatus A1 supports two subscriber identification cards A2 and A4. A subscriber home place of the subscriber identification card A2 belongs to Beijing, and a subscriber home place of the subscriber identification card A4 also belongs to Beijing; when the subscriber carries the electronic apparatus in Hong Kong, the electronic apparatus A1 is in the roaming state. At this time, when one virtual subscriber identification card needs to be loaded, the one subscriber identification card can be loaded by using a system of the subscriber identification card A2 or A4 on the electronic apparatus A1. When two virtual subscriber identification cards need to be loaded, the two virtual subscriber identification cards can be loaded by using two subscriber identification card channels on the electronic apparatus.

Step 703: obtaining, by the electronic apparatus, a first operation of the subscriber, the first operation being a response operation for the first prompt information.

Step 704: judging, by the electronic apparatus, whether to load the virtual subscriber identification card or not according to the first operation, to obtain a second judgment result.

Step 705: sending, by the electronic apparatus, a service request to the server through a first subscriber identification card channel, when the second judgment result indicates that it is necessary to load the virtual subscriber identification card. The service request is used for requesting the server to allocate virtual subscriber identification card information to the electronic apparatus.

Here, when the electronic apparatus is an integrated mobile phone terminal, the first subscriber identification card corresponding to the first subscriber identification card channel may be a subscriber identification card configured on the electronic apparatus and not belonging to a roaming place. For the integrated mobile phone terminal, the first subscriber identification card is a type of card that may not really exist in form. In other words, in a process of specific implementation, the subscriber identification card of the integrated mobile phone terminal may also be a type of subscriber identification card information (network authentication account information and authentication algorithms) pre-stored in the electronic apparatus. When the electronic apparatus is a set-card separated mobile phone terminal, the first subscriber identification card on the first subscriber identification card channel may be a subscriber identification card installed in a card slot of the electronic apparatus and not belonging to the roaming place.

In the embodiment of the present disclosure, the method may further include: making a phone call, by the electronic apparatus, by using a local subscriber identification card, and/or, obtaining, by the electronic apparatus, data traffic by using the local subscriber identification card, when the first judgment result indicates that the electronic apparatus itself is not in the roaming state.

Here, the local subscriber identification card is a subscriber identification card, belonging to a local place. For example, the electronic apparatus A1 supports two subscriber identification cards A2 and A3. A subscriber home place of the subscriber identification card A2 belongs to Beijing, and a subscriber home place of the subscriber identification card A3 belongs to Shanghai. When the subscriber carries the electronic apparatus A1 in Shanghai, the electronic apparatus A1 is not in the roaming state, because the subscriber identification card A3 is just the local subscriber identification card; then the subscriber makes a phone call by using the subscriber identification card A3, and obtains data traffic by using the subscriber identification card A3 when surfing the net. For another example, when the subscriber carrying the electronic apparatus A1 returns to Beijing, since the subscriber home place of the subscriber identification card A2 is just Beijing, the electronic apparatus A1 is not in the roaming state, at this time, the subscriber identification card A2 is just the local subscriber identification card, and the subscriber makes a phone call by using the subscriber identification card A2, and obtains data traffic by using the subscriber identification card A2 when surfing the net.

In the embodiment of the present disclosure and respective embodiments below, the subscriber identification card includes a real subscriber identification card and a virtual subscriber identification card. The real subscriber identification card includes subscriber identification cards applicable to second-generation (2G) mobile communication, third-generation (3G) mobile communication, and fourth-generation and above (4G and 5G) mobile communication, etc. The subscriber identification card for the 2G mobile communication is generally referred to as a Subscriber Identity Module (SIM) card and the subscriber identification card for the 3G mobile communication is generally referred to as a Universal Subscriber Identity Module (USIM) card.

For a set-card separated mobile phone terminal, the real subscriber identification card refers to a tangible subscriber identification card independent of the mobile terminal, contains a separate integrated circuit chip and programs running thereon, and is plugged in a card slot of the mobile terminal based on a certain interface standard. For the integrated mobile phone terminal, the real subscriber identification card may be the subscriber identification card information (the network authentication account information and the authentication algorithms) pre-stored on the electronic apparatus.

The virtual subscriber identification card refers to an intangible subscriber identification card, which implements functions of the real subscriber identification card by a processing function of the mobile terminal and a processing function of the server. The function implemented by the mobile terminal refers to that the mobile terminal obtains some information (which is referred to as virtual subscriber identification card information) from the server. The information is similar to the information on the real subscriber identification card, and includes the network authentication account information and the authentication algorithms stored on the real subscriber identification card.

Here, the virtual subscriber identification card differs from the subscriber identification card on the integrated mobile phone terminal in that: the virtual subscriber identification card information is obtained by temporarily applying to the server, which is sent by the server to the electronic apparatus, so that the electronic apparatus uses the communication network to which the virtual subscriber identification card belongs. However, the subscriber identification card information on the integrated mobile phone terminal is the subscriber identification card information fixed on the integrated mobile phone terminal by the network operator when the subscriber purchases the integrated mobile phone terminal or initializes the integrated mobile phone terminal. It should be illustrated that the word "temporarily" for the virtual subscriber identification card means that the subscriber can apply for the virtual subscriber identification card from the server according to his/her own need at any time (when the electronic apparatus is in the roaming state), for use when roaming. Naturally, when the subscriber feels that the virtual subscriber identification card is not needed, he/she can also apply for uninstalling to the server. And the word "fixed" for the integrated mobile phone terminal means that the subscriber identification card information on the mobile phone terminal cannot be changed randomly by the subscriber.

In the embodiment of the present disclosure, the judging, by the electronic apparatus, whether the electronic apparatus itself is in a roaming state or not includes: receiving, by the electronic apparatus, network stay information sent by a network side, and determining that the electronic apparatus itself is in the roaming state, when a circuit-switched network in the network stay information is changed into international roaming; or receiving, by the electronic apparatus, cell location information sent by a base station, and determining that the electronic apparatus itself is in the roaming state, when the cell location information is international roaming.

In the embodiment of the present disclosure, the electronic apparatus issues a first prompt information to the subscriber, when the electronic apparatus itself is in the roaming state. The first prompt information is used for prompting the subscriber whether to load the virtual subscriber identification card by using the subscriber identification card channel on the electronic apparatus or not. The virtual subscriber identification card is virtual and belongs to the current place where the electronic apparatus is located. The electronic apparatus obtains a first operation of the subscriber. The electronic apparatus judges whether to load the virtual subscriber identification card or not according to the first operation, to obtain a second judgment result. The electronic apparatus sends a service request to the server through the first subscriber identification card channel, when the second judgment result indicates that it is necessary to load the virtual subscriber identification card. The service request is used for requesting the server to allocate the virtual subscriber identification card information to the electronic apparatus. Thus, the electronic apparatus, when roaming occurs, can apply for the virtual subscriber identification card from the server, to use the network provided by the local operator, so as to avoid the expensive roaming fees.

Embodiment Eight

Figure 8:
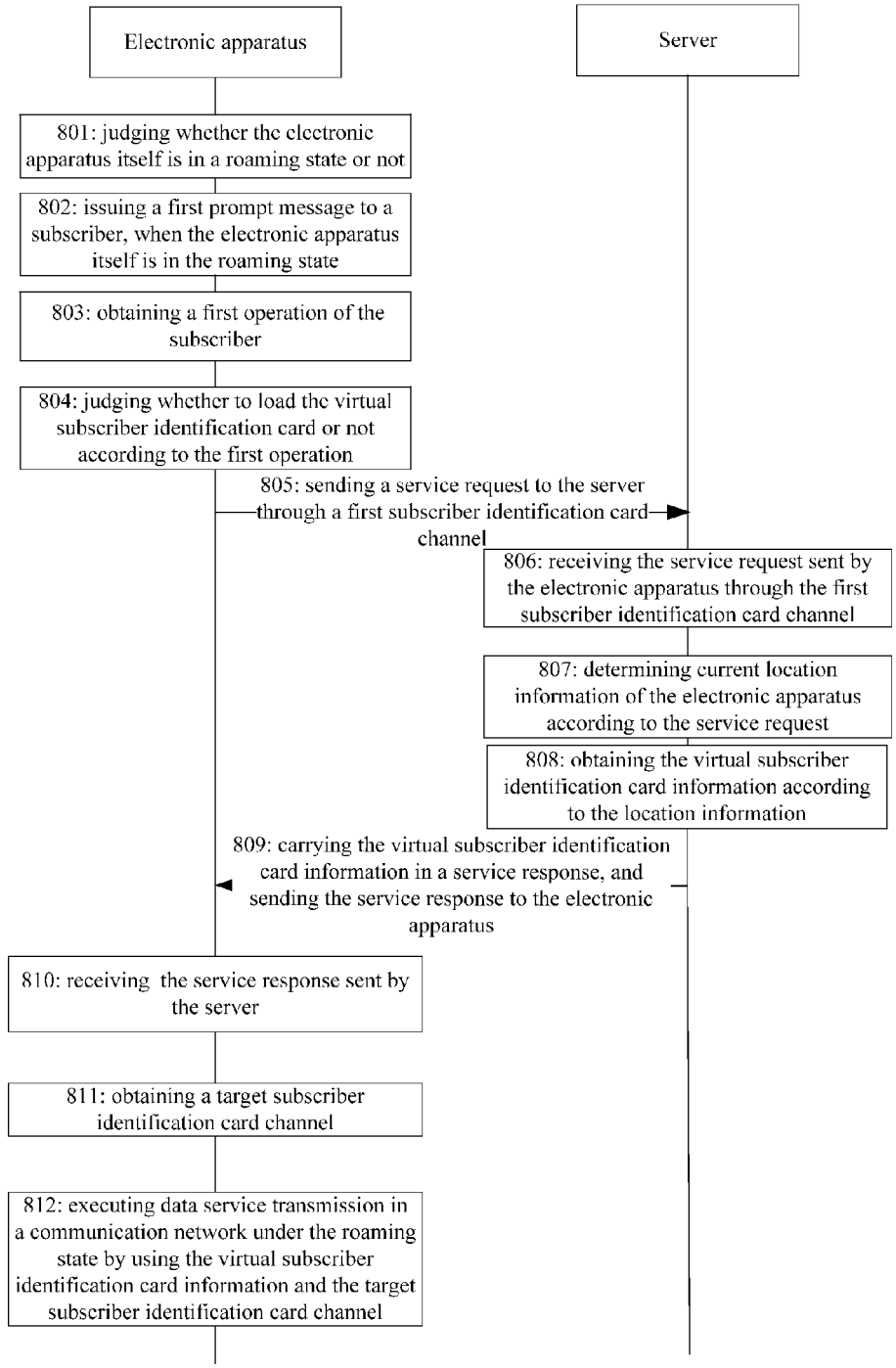
FIG. 8 is an implementation flow schematic diagram of an information processing method according to Embodiment Eight of the present disclosure.

Based on the aforesaid Embodiment Seven, the Embodiment Eight of the present disclosure provides an information processing method which is applied to an electronic apparatus capable of supporting two or more subscriber identification cards. A function implemented by the information processing method can be achieved by calling a program code by using a processor in the electronic apparatus. Of course, the program code may be stored in a computer storage medium. It can be seen that, the electronic apparatus includes at least the processor and the storage medium. FIG. 8 is an implementation flow schematic diagram of the information processing method according to Embodiment Eight of the present disclosure. As shown in FIG. 8, the information processing method comprises steps 801 to 812.

Step 801: judging, by the electronic apparatus, whether the electronic apparatus itself is in a roaming state or not, to obtain a first judgment result.

Step 802: issuing, by the electronic apparatus, a first prompt information to a subscriber, when the first judgment result indicates that the electronic apparatus itself is in the roaming state.

Here, the first prompt information is used for prompting the subscriber whether to load a virtual subscriber identification card by using the subscriber identification card channel on the electronic apparatus or not, the virtual subscriber identification card being virtual and belonging to a current place where the electronic apparatus is located.

Step 803: obtaining, by the electronic apparatus, a first operation of the subscriber, the first operation being a response operation for the first prompt information.

Step 804: judging, by the electronic apparatus, whether to load the virtual subscriber identification card or not according to the first operation, to obtain a second judgment result.

Step 805: sending, by the electronic apparatus, a service request to the server through a first subscriber identification card channel, when the second judgment result indicates that it is necessary to load the virtual subscriber identification card. The service request is used for requesting the server to allocate virtual subscriber identification card information to the electronic apparatus.

Here, the above-described steps 801 to 805 respectively correspond to steps 701 to 705 in Embodiment Seven, and thus those skilled in the art can refer to Embodiment Seven so as to understand the above-described steps 801 to 805, which will not be repeated here in order to save space.

Step 806: receiving, by the server, the service request sent by the electronic apparatus through the first subscriber identification card channel.

Here, the service request carries the subscriber identification information and current geographical location information of the electronic apparatus, and the subscriber identification information may be the information of the subscriber identification card being used, or the subscriber's account information and the like.

Step 807: determining, by the server, the current location information of the electronic apparatus according to the service request.

Step 808: obtaining, by the server, the virtual subscriber identification card information according to the location information.

Here, the virtual subscriber identification card information may be pre-stored in a list, a server operator purchases information of a number of (virtual) subscriber identification cards belonging to all parts of the world from network operators around the world. The subscriber identification card information includes network authentication account information and authentication algorithms on the subscriber identification card. In order to facilitate searching, the list may further store the location information, in addition to the virtual subscriber identification card information. The step 808 of obtaining, by the server, the virtual subscriber identification card information according to the location information may specifically include: searching, by the server, a pre-set list according to the location information, to obtain the virtual subscriber identification card information.

Step 809: carrying, by the server, the virtual subscriber identification card information in a service response, and sending the service response to the electronic apparatus.

Step 810: receiving, by the electronic apparatus, the service response sent by the server through the first subscriber identification card channel, the service response including the virtual subscriber identification card information.

Step 811: obtaining, by the electronic apparatus, a target subscriber identification card channel.

Step 812: executing, by the electronic apparatus, data service transmission in a communication network under the roaming state by using the virtual subscriber identification card information and the target subscriber identification card channel.

Here, the target subscriber identification card channel is just a channel of a subscriber identification card on the electronic apparatus. Hereinafter, with the electronic apparatus according to the embodiment of the present disclosure represented by a double-card double-standby mobile phone as an example, the above-described subscriber identification card channel will be introduced. The double-card double-standby mobile phone generally includes two cases as below. A first case is that: the mobile phone has two sets of subscriber identification card channels, including two sets of radio frequency (RF) processing units, two sets of modem units, two sets of base band processing unit and two sets of separate protocol stacks, wherein the radio frequency processing unit includes a radio frequency link. Of course, the radio frequency link includes antennas for receiving and transmitting data. For the first case, each subscriber identification card uses a set of subscriber identification card channel separately to accomplish data transmitting and receiving. At this time, it is equivalent to that the virtual subscriber identification card uses one set of the subscriber identification card channel therein. The second case is that the two sets of subscriber identification card channels included by the mobile phone only include one set of radio frequency processing unit, one set of base band processing unit, two sets of modem units and one set of protocol stacks mutually cooperated or two sets of separate protocol stacks. When used specifically, the two sets of subscriber identification card channels cannot really run in parallel, but are only allocated to one subscriber identification card in the mobile phone in a specific physical time slot. For the second case, the subscriber identification card channels include one set of modem unit, a shared radio frequency processing unit, a shared base band processing unit, and shared protocol stacks mutually cooperated or one set of separate protocol stacks.

Hereinafter, with the electronic apparatus including two subscriber identification card channels as an example, the subscriber identification card channel according to the embodiment of the present disclosure is illustrated. The two subscriber identification card channels include the first subscriber identification card channel and a second subscriber identification card channel which is used as the target subscriber identification card channel. The first subscriber identification card channel and the second subscriber identification card channel including a first modem module, a second modem module, and a shared radio frequency link module. The first subscriber identification card channel is capable of executing data service transmission in a first communication network via the first modem module and the shared radio frequency link module, and the second subscriber identification card channel is capable of executing data service transmission in a second communication network via the second modem module and the shared radio frequency link module. Correspondingly, the step 812 of executing, by the electronic apparatus, data service transmission in a communication network under the roaming state, by using the virtual subscriber identification card information and the target subscriber identification card channel includes: receiving, by the electronic apparatus, an authentication request for the virtual subscriber identification card information, through communication with a third communication network via the second modem module and the shared radio frequency link module, and sending the authentication request to the first modem module; obtaining, by the electronic apparatus, authentication information, through communication with the server via the first modem module and the shared radio frequency link module, and sending the authentication information to the second modem module; sending, by the electronic apparatus, the authentication information to the third communication network as a response to the authentication request, via the second modem module and the shared radio frequency link module, so that the electronic apparatus accesses the third communication network; and executing, by the electronic apparatus, data service transmission in the third communication network, via the second modem module and the shared radio frequency link module.

Several manners for implementing the above-described step 811 are introduced below.

A first manner: the obtaining, by the electronic apparatus, a target subscriber identification card channel includes: judging, by the electronic apparatus, whether the electronic apparatus itself has an idle subscriber identification card channel or not, to obtain a third judgment result; taking, when the third judgment result indicates that the electronic apparatus has an idle subscriber identification card channel, the idle subscriber identification card channel as the target subscriber identification card channel.

For example, an electronic apparatus A1 supports two subscriber identification cards A2 and A4. The electronic apparatus only has one subscriber identification card plugged in, i.e., the subscriber identification card A2. A subscriber home place of the subscriber identification card A2 belongs to Beijing. Then, the electronic apparatus still has an idle subscriber identification card channel, i.e., a channel of the subscriber identification card A4. At this time, the electronic apparatus A1 takes the channel of the subscriber identification card A4 as the target subscriber identification card channel.

A second manner: the obtaining, by the electronic apparatus, a target subscriber identification card channel includes: judging, by the electronic apparatus, whether the electronic apparatus itself has an idle subscriber identification card channel or not, to obtain a third judgment result; obtaining, by the electronic apparatus, a specified subscriber identification card, when the third judgment result indicates that the electronic apparatus has no idle subscriber identification card channel. The specified subscriber identification card is a subscriber identification card currently used on the electronic apparatus; and deactivating, by the electronic apparatus, the specified subscriber identification card, and taking a channel of the deactivated subscriber identification card as the target subscriber identification card channel.

For example, the electronic apparatus A1 supports two subscriber identification cards A2 and A3, and the electronic apparatus has two subscriber identification cards plugged in. A subscriber home place of the subscriber identification card A2 belongs to Beijing, and a subscriber home place of the subscriber identification card A3 belongs to Shanghai, then the electronic apparatus has no idle subscriber identification card channel. At this time, the electronic apparatus A1 obtains a specified subscriber identification card. It is assumed that the specified subscriber identification card is A2, then the electronic apparatus A1 deactivates the subscriber identification card A2, and takes the channel of the subscriber identification card A2 as the target subscriber identification card channel.

Two manners for implementing the obtaining the specified subscriber identification card are further provided below:

A first manner: the obtaining, by the electronic apparatus, a specified subscriber identification card includes: issuing, by the electronic apparatus, a second prompt information, the second prompt information being used for prompting the subscriber to deactivate the subscriber identification card on the electronic apparatus; obtaining, by the electronic apparatus, a second operation of the subscriber, the second operation being a response operation for the second prompt information; and determining, by the electronic apparatus, the specified subscriber identification card, according to the second operation.

For example, the electronic apparatus A1 supports two subscriber identification cards A2 and A3. The electronic apparatus has two subscriber identification cards plugged in. A subscriber home place of the subscriber identification card A2 belongs to Beijing, and a subscriber home place of the subscriber identification card A3 belongs to Shanghai. The electronic apparatus has no idle subscriber identification card channel. At this time, the electronic apparatus A1 issues a second prompt information to the subscriber, so as to prompt the subscriber to deactivate either the subscriber identification card A2 or the subscriber identification card A3, the subscriber performs the first operation on the interface displayed by the electronic apparatus A1, according to the second prompt information issued. It is assumed that the subscriber chooses to deactivate the subscriber identification card A2, then the electronic apparatus A1 deactivates the subscriber identification card A2, and takes the channel of the subscriber identification card A2 as the target subscriber identification card channel.

A second manner: the obtaining, by the electronic apparatus, a specified subscriber identification card, includes: determining, by the electronic apparatus, the specified subscriber identification card, according to a preset deactivation rule, the deactivation rule including a system default deactivation rule and a subscriber deactivation rule.

For example, the electronic apparatus A1 supports two subscriber identification cards A2 and A3, and the electronic apparatus has two subscriber identification cards plugged in, wherein, a subscriber home place of the subscriber identification card A2 belongs to Beijing, and a subscriber home place of the subscriber identification card A3 belongs to Shanghai, then the electronic apparatus has no idle subscriber identification card channel. At this time, the electronic apparatus A1 obtains the deactivation rule. It is assumed that the deactivation rule is: the subscriber identification card A3 serves as a first option, and the subscriber identification card A2 serves as a second option. At this time, the electronic apparatus determines the specified subscriber identification card as the subscriber identification card A3 according to the deactivation rule, and then the electronic apparatus A1 deactivates the subscriber identification card A3, and takes the channel of the subscriber identification card A3 as the target subscriber identification card channel.

It should be illustrated that, in addition to the modes above, those skilled in the art can further implement the obtaining the target subscriber identification card by using various other technical means, which will not be repeated.

Embodiment Nine

Figure 9:
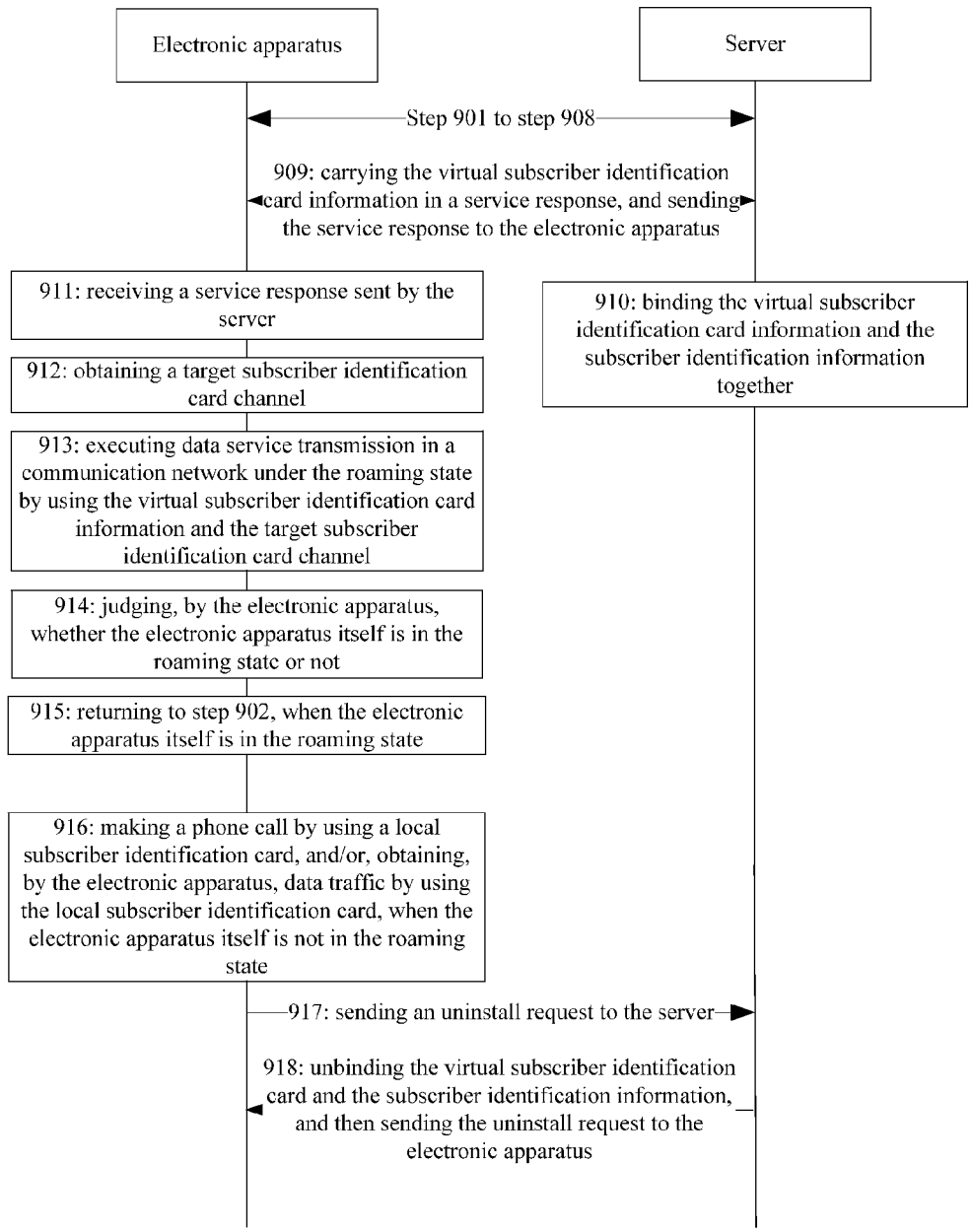
FIG. 9 is an implementation flow schematic diagram of an information processing method according to Embodiment Nine of the present disclosure.

Based on the aforesaid embodiments, the embodiment of the present disclosure provides an information processing method, applied to an electronic apparatus capable of supporting two or more subscriber identification cards. A function implemented by the information processing method can be achieved by calling a program code by using a processor in the electronic apparatus. Of course the program code may be stored in a computer storage medium. It can be seen that, the electronic apparatus includes at least the processor and the storage medium. FIG. 9 is an implementation flow schematic diagram of the information processing method according to Embodiment Nine of the present disclosure. As shown in FIG. 9, the information processing method comprises steps 901-919.

Step 901: judging, by the electronic apparatus, whether the electronic apparatus itself is in a roaming state or not, to obtain a first judgment result.

Step 902: issuing, by the electronic apparatus, a first prompt information to a subscriber, when the first judgment result indicates that the electronic apparatus itself is in the roaming state.

Here, the first prompt information is used for prompting the subscriber whether to load the virtual subscriber identification card by using a subscriber identification card channel on the electronic apparatus or not. The virtual subscriber identification card is virtual and belongs to a current place where the electronic apparatus is located.

Step 903: obtaining, by the electronic apparatus, a first operation of the subscriber, the first operation being a response operation for the first prompt information.

Step 904: judging, by the electronic apparatus, whether to load the virtual subscriber identification card or not according to the first operation, to obtain a second judgment result.

Step 905: sending, by the electronic apparatus, a service request to the server through a first subscriber identification card channel, when the second judgment result indicates that it is necessary to load the virtual subscriber identification card. The service request is used for requesting the server to allocate virtual subscriber identification card information to the electronic apparatus.

Step 906: receiving, by the server, the service request sent by the electronic apparatus through the first subscriber identification card channel.

Here, the service request carries the subscriber identification information and current geographical location information of the electronic apparatus, and the subscriber identification information may be the information of the subscriber identification card being used, or the subscriber's account information and the like.

Step 907: determining, by the server, the current geographical location information of the electronic apparatus according to the service request.

Step 908: obtaining, by the server, the virtual subscriber identification card information according to the location information.

Here, the above-described steps 901 to 908 respectively correspond to steps 801 to 808 in Embodiment Eight, and thus those skilled in the art can refer to Embodiment Eight so as to understand the above-described steps 901 to 908, which will not be repeated here in order to save space.

Step 909: carrying, by the server, the virtual subscriber identification card information in a service response, and sending the service response to the electronic apparatus.

Step 910: binding, by the server, the virtual subscriber identification card information and the subscriber identification information together.

Here, there is no strict sequential order for step 909 and step 910, step 909 may occur before step 910, or step 909 may occur behind step 910.

Step 911: receiving, by the electronic apparatus a service response sent by the server through the first subscriber identification card channel, the service response including the virtual subscriber identification card information.

Step 912: obtaining, by the electronic apparatus, a target subscriber identification card channel.

Step 913: executing, by the electronic apparatus, data service transmission in a communication network under the roaming state, by using the virtual subscriber identification card information and the target subscriber identification card channel.

Step 914: judging, by the electronic apparatus, whether the electronic apparatus itself is in the roaming state or not, to obtain a first judgment result.

Step 915: returning to step 902, when the first judgment result indicates that the electronic apparatus itself is in the roaming state.

Step 916: making a phone call, by the electronic apparatus, by using a local subscriber identification card, and/or, obtaining, by the electronic apparatus, data traffic, by using the local subscriber identification card, when the first judgment result indicates that the electronic apparatus itself is not in the roaming state.

Step 917: sending, by the electronic apparatus, an uninstall request to the server, the uninstall request being used for requesting the server to uninstall the virtual subscriber identification card.

Step 918: unbinding, by the server, the virtual subscriber identification card and the subscriber identification information, and then sending the uninstall request to the electronic apparatus.

Here, the step 918 may further include: calculating, by the server, an expense amount of the virtual subscriber identification card, subtracting the expense amount from the account bound to the subscriber identification information, and then unbinding, by the server, the virtual subscriber identification card and the subscriber identification information. The uninstall request is used for requesting the server to uninstall the virtual subscriber identification card.

Step 919: receiving, by the electronic apparatus, an uninstall response sent by the server, and uninstalling the virtual subscriber identification card by using the uninstall response.

Here, the uninstall response carries an uninstall instruction.

By the technical solution provided by the embodiment of the present disclosure, when the subscriber uses data traffic or makes a phone call in the roaming state during outbound tourism (especially multi-country tourism) or domestic inter-provincial travel, the subscriber surfs the net by using the virtual subscriber identification card, with no worry about expensive roaming fee any longer. Since the virtual subscriber identification card uses the network of a local operator, it has advantages of stability, reliability, flexible charges when surfing the net. When the subscriber returns home, he/she can normally use the local subscriber identification card in the mobile phone, which is just fine both home and abroad. It can be seen that the technical solution provided by the embodiment of the present disclosure achieves an optimal collocation of data charges, and brings real benefit to the subscriber.

Embodiment Ten

Based on the aforesaid embodiments of the information processing method, the embodiment of the present disclosure further provides an information processing system, including an electronic apparatus and a server. A first judging unit, an issuing unit, a first obtaining unit, a second judging unit and a first sending unit included in the electronic apparatus can all be implemented by a processor in the electronic apparatus. A second receiving unit, a determining unit, a third obtaining unit and a second sending unit included in the server can all be implemented by a processor in the server. Of course, the aforesaid functions implemented by the processor can also be implemented by a specific logic circuit. In a process of specific implementation, the processor may be a central processing unit (CPU), a micro processing unit (MPU), a digital signal processor (DSP) or a field programmable gate array (FPGA), and so on.

Figure 10:
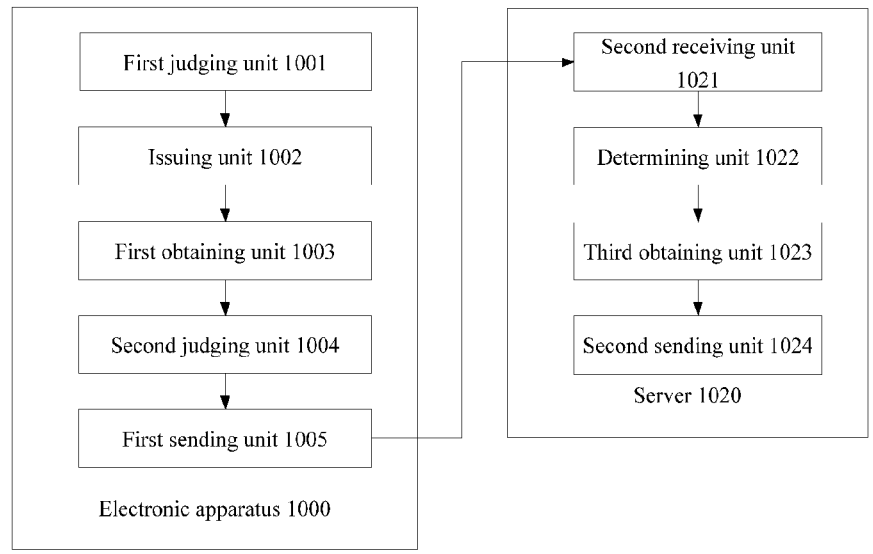
FIG. 10 is a composition schematic diagram of an information processing system according to Embodiment Ten of the present disclosure.

FIG. 10 is a composition schematic diagram of the information processing system according to Embodiment Ten of the present disclosure. As shown in FIG. 10, the information processing system comprises an electronic apparatus 1000 and a server 1020. The electronic apparatus 1000 is capable of supporting two or more subscriber identification cards, and comprises a first judging unit 1001, an issuing unit 1002, a first obtaining unit 1003, a second judging unit 1004 and a first sending unit 1005. The server 1020 comprises a second receiving unit 1021, a determining unit 1022, a third obtaining unit 1023 and a second sending unit 1024.

The first judging unit 1001 judges whether the electronic apparatus itself is in a roaming state or not, to obtain a first judgment result.

The issuing unit 1002 issues a first prompt information to a subscriber, when the first judgment result indicates that the electronic apparatus itself is in the roaming state. The first prompt information is used for prompting the subscriber whether to load the virtual subscriber identification card by using a subscriber identification card channel on the electronic apparatus or not. The virtual subscriber identification card is virtual and belongs to a current place where the electronic apparatus is located.

The first obtaining unit 1003 obtains a first operation of the subscriber, the first operation being a response operation for the first prompt information.

The second judging unit 1004 judges whether to load the virtual subscriber identification card or not according to the first operation, to obtain a second judgment result;

The first sending unit 1005 sends a service request to the server through a first subscriber identification card channel, when the second judgment result indicates that it is necessary to load the virtual subscriber identification card. The service request is used for requesting the server to allocate the virtual subscriber identification card information to the electronic apparatus. The virtual subscriber identification card is virtual and belongs to the subscriber identification card of the current place where the electronic apparatus is located.

The second receiving unit 1021 receives a service request sent by the electronic apparatus through the first subscriber identification card channel.

The determining unit 1022 determines current geographical location information of the electronic apparatus according to the service request.

The third obtaining unit 1023 obtains the virtual subscriber identification card information according to the geographical location information.

The second sending unit 1024 is used for carrying the virtual subscriber identification card information in a service response, and sending the service response to the electronic apparatus.

In the embodiment of the present disclosure, the electronic apparatus further comprises a processing unit, for making a phone call by using a local subscriber identification card, and/or, obtaining data traffic by using the local subscriber identification card, when the first judgment result indicates that the electronic apparatus is not in the roaming state.

In the embodiment of the present disclosure, the first judging unit includes a first receiving module and a first judging module. The first receiving module receives network stay information sent by a network side. The first judging module judges whether a circuit-switched network in the network stay information is changed into international roaming or not, to obtain a first judgment result. Correspondingly, it is determined that the electronic apparatus itself is in the roaming state, when the first judgment result indicates that the circuit-switched network in the network stay information is changed into international roaming.

In the embodiment of the present disclosure, the first judging unit includes a second receiving module and a second judging module. The second receiving module receives cell location information sent by a base station. The second judging module judges whether the cell location information is international roaming or not, to obtain a first judgment result. Correspondingly, it is determined that the electronic apparatus itself is in the roaming state, when the first judgment result indicates that the cell location information is international roaming.

In the embodiment of the present disclosure, the first judging unit judges whether the electronic apparatus itself is in a roaming state or not, to obtain a first judgment result; the issuing unit issues a first prompt information to a subscriber, when the first judgment result indicates that the electronic apparatus itself is in the roaming state; the first obtaining unit obtains a first operation of the subscriber, the first operation being the response operation with respect to the first prompt information; the second judging unit judges whether to load the virtual subscriber identification card or not according to the first operation, to obtain a second judgment result; the first sending unit sends a service request to the server through a first subscriber identification card channel, when the second judgment result indicates that it is necessary to load the virtual subscriber identification card. Therefore, in the technical solution provided by the embodiment of the present disclosure, the electronic apparatus, when roaming occurs, can apply for the virtual subscriber identification card from the server, to use the network provided by the local operator, so as to avoid the expensive roaming fees.

Embodiment Eleven

Based on the aforesaid embodiments of the information processing method, the embodiment of the present disclosure further provides an information processing system, comprising an electronic apparatus and a server. A first judging unit, an issuing unit, a first obtaining unit, a second judging unit and a first sending unit as well as a first receiving unit. A second obtaining unit and a data transmitting unit included in the electronic apparatus can all be implemented by a processor in the electronic apparatus; a second receiving unit, a determining unit, a third obtaining unit and a second sending unit included in the server can all be implemented by a processor in the server. Of course, the aforesaid functions implemented by the processor can also be implemented by a specific logic circuit; and in a process of specific implementation, the processor may be a central processing unit (CPU), a micro processing unit (MPU), a digital signal processor (DSP) or a field programmable gate array (FPGA), and so on.

Figures 1, 11:
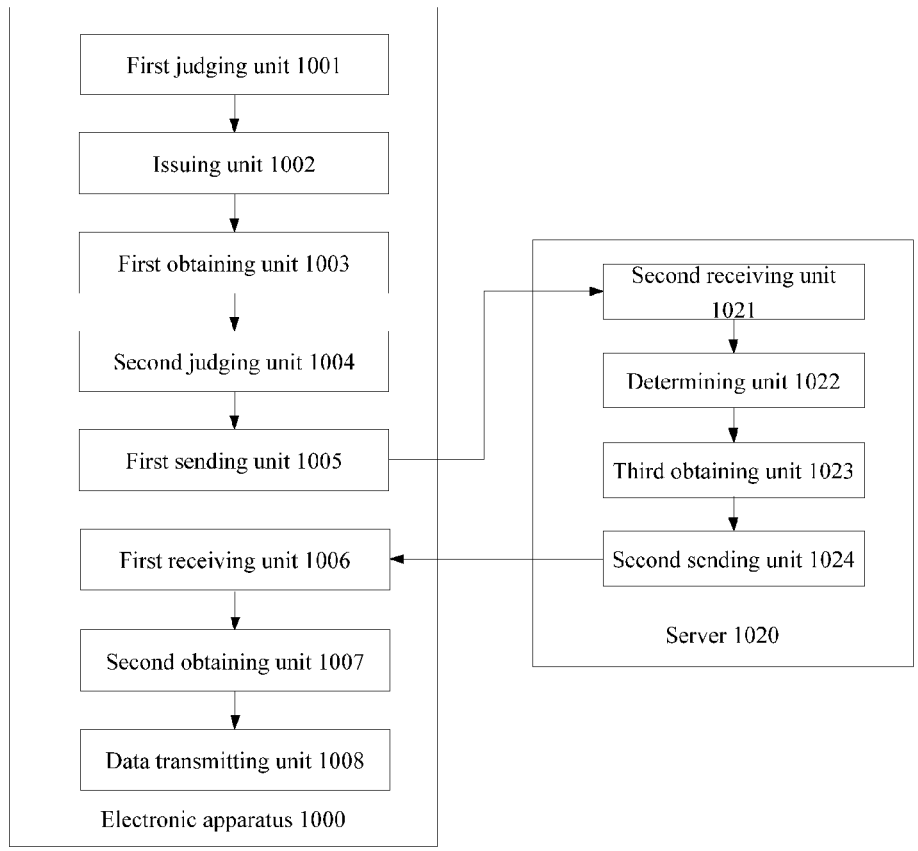
Figures 2, 11:
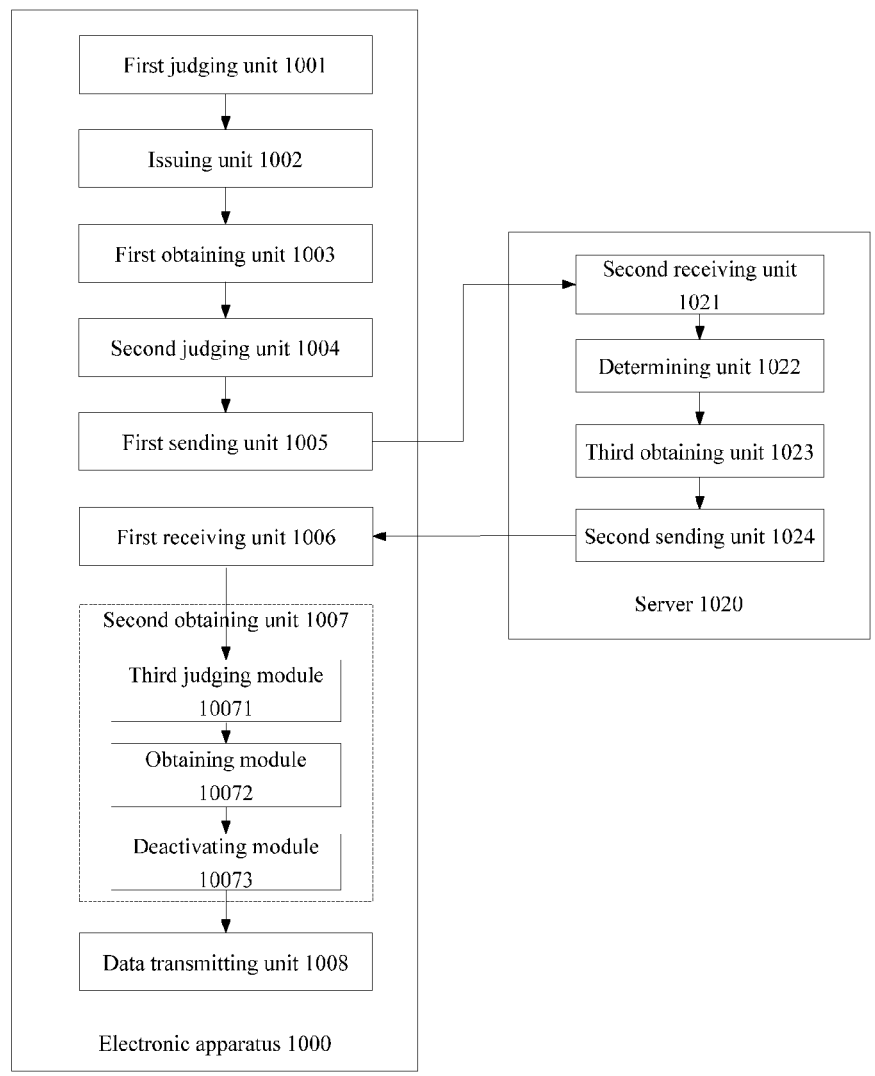
Figures 3, 11:
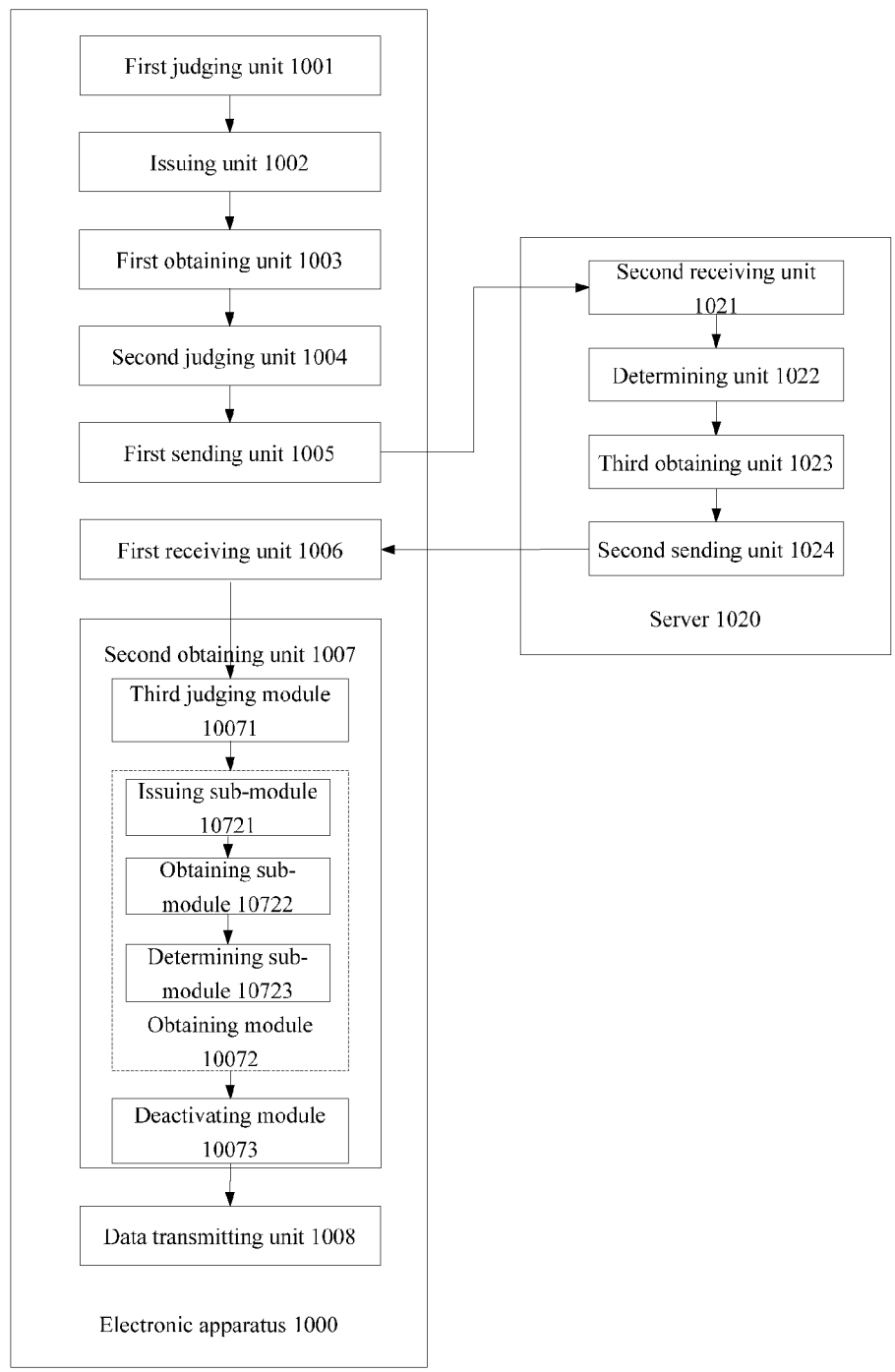

FIG. 11-1 is a composition schematic diagram I of the information processing system according to Embodiment Eleven of the present disclosure. As shown in FIG. 11-1, the information processing system comprises an electronic apparatus 1000 and a server 1020. The electronic apparatus 1000 is capable of supporting two or more subscriber identification cards, and the electronic apparatus 1000 comprises a first judging unit 1001, an issuing unit 1002, a first obtaining unit 1003, a second judging unit 1004, a first sending unit 1005, a first receiving unit 1006, a second obtaining unit 1007 and a data transmitting unit 1008. The server 1020 comprises a second receiving unit 1021, a determining unit 1022, a third obtaining unit 1023 and a second sending unit 1024.

The first judging unit 1001 judges whether the electronic apparatus itself is in a roaming state or not, to obtain a first judgment result.

The issuing unit 1002 issues a first prompt information to a subscriber, when the first judgment result indicates that the electronic apparatus itself is in the roaming state. The first prompt information is used for prompting the subscriber whether to load the virtual subscriber identification card by using a subscriber identification card channel on the electronic apparatus or not. The virtual subscriber identification card is virtual and belongs to a current place where the electronic apparatus is located.

The first obtaining unit 1003 obtains a first operation of the subscriber. The first operation is a response operation for the first prompt information.

The second judging unit 1004 judges whether to load the virtual subscriber identification card or not according to the first operation, to obtain a second judgment result;

The first sending unit 1005 sends a service request to the server through a first subscriber identification card channel, when the second judgment result indicates that it is necessary to load the virtual subscriber identification card. The service request is used for requesting the server to allocate virtual subscriber identification card information to the electronic apparatus, and the virtual subscriber identification card is virtual and belongs to a current place where the electronic apparatus is located.

The second receiving unit 1021 receives a service request sent by the electronic apparatus through the first subscriber identification card channel.

The determining unit 1022 determines current geographical location information of the electronic apparatus according to the service request.

The third obtaining unit 1023 obtains virtual subscriber identification card information according to the geographical location information.

The second sending unit 1024 carries the virtual subscriber identification card information in a service response, and sends the service response to the electronic apparatus.

The first receiving unit 1006 receives a service response sent by the server through the first subscriber identification card channel, the service response including the virtual subscriber identification card information.

The second obtaining unit 1007 obtains a target subscriber identification card channel.

The data transmitting unit 1008 executes data service transmission in a communication network under the roaming state, by using the virtual subscriber identification card information and the target subscriber identification card channel.

Here, the electronic apparatus comprises the first subscriber identification card channel and a second subscriber identification card channel which is used as the target subscriber identification card channel. The first subscriber identification card channel and the second subscriber identification card channel includes a first modem module, a second modem module, and a shared radio frequency link module. The first subscriber identification card channel is capable of executing data service transmission in a first communication network via the first modem module and the shared radio frequency link module, and the second subscriber identification card channel is capable of executing data service transmission in a second communication network via the second modem module and the shared radio frequency link module. The data transmitting unit 1008 may include a third receiving module, a first sending module, a second sending module and an executing module.

The third receiving module receives an authentication request for the virtual subscriber identification card information, through communication with a third communication network via the second modem module and the shared radio frequency link module, and sends the authentication request to the first modem module.

The first sending module obtains the authentication information through communication with the server via the first modem module and the radio frequency link module, and sends the authentication information to the second modem module.

The second sending module sends the authentication information to the third communication network as a response to the authentication request via the second modem module and the shared radio frequency link module, so that the electronic apparatus accesses the third communication network.

The executing module executes data service transmission in the third communication network via the second modem module and the shared radio frequency link module.

In Embodiment Eleven of the present disclosure, the second obtaining unit 1007 judges whether the electronic apparatus itself has an idle subscriber identification card channel or not, to obtain a third judgment result; and takes the idle subscriber identification card channel as the target subscriber identification card channel, when the third judgment result indicates that the electronic apparatus has an idle subscriber identification card channel.

In the embodiment of the present disclosure, as shown in FIG. 11-2, the second obtaining unit 1007 further includes a third judging module 10071, an obtaining module 10072, and a deactivating module 10073. The third judging module 10071 judges whether the electronic apparatus itself has an idle subscriber identification card channel or not, to obtain a third judgment result. The obtaining module 10072 obtains a specified subscriber identification card, when the third judgment result indicates that the electronic apparatus has no idle subscriber identification card channel. The deactivating module 10073 deactivates the specified subscriber identification card, and takes a channel of the specified subscriber identification card deactivated as the target subscriber identification card channel.

In the embodiment of the present disclosure, the obtaining module 10072 determines the target subscriber identification card according to a preset deactivation rule, the deactivation rule includes a system default deactivation rule and a deactivation rule set by a subscriber.

In the embodiment of the present disclosure, as shown in FIG. 11-3, the obtaining module 10072 further includes an issuing sub-module 10721, an obtaining sub-module 10722 and a determining sub-module 10723. The issuing sub-module 10721 issues a second prompt information, the second prompt information being used for prompting the subscriber to deactivate a subscriber identification card on the electronic apparatus. The obtaining sub-module 10722 obtains a second operation of the subscriber. The second operation is a response operation with respect to the second prompt information. The determining sub-module 10723 determines a specified subscriber identification card, according to the second operation.

In the embodiment of the present disclosure, the electronic apparatus may further comprise a processing unit. The processing unit makes a phone call by using a local subscriber identification card, and/or, obtains data traffic by using the local subscriber identification card, when the first judgment result indicates that the electronic apparatus itself is not in the roaming state.

In the embodiment of the present disclosure, the first judging unit includes a first receiving module and a first judging module. The first receiving module receives network stay information sent by a network side. The first judging module judges whether a circuit-switched network in the network stay information is changed into international roaming or not, to obtain a first judgment result. Correspondingly, it is determined that the electronic apparatus itself is in the roaming state, when the first judgment result indicates that the circuit-switched network in the network stay information is changed into international roaming.

In the embodiment of the present disclosure, the first judging unit includes a second receiving module and a second judging module. The second receiving module receives cell location information sent by a base station. The second judging module judges whether the cell location information is international roaming or not, to obtain a first judgment result. Correspondingly, it is determined that the electronic apparatus itself is in the roaming state, when the first judgment result indicates that the cell location information is international roaming.

Embodiment Twelve

Figure 12:
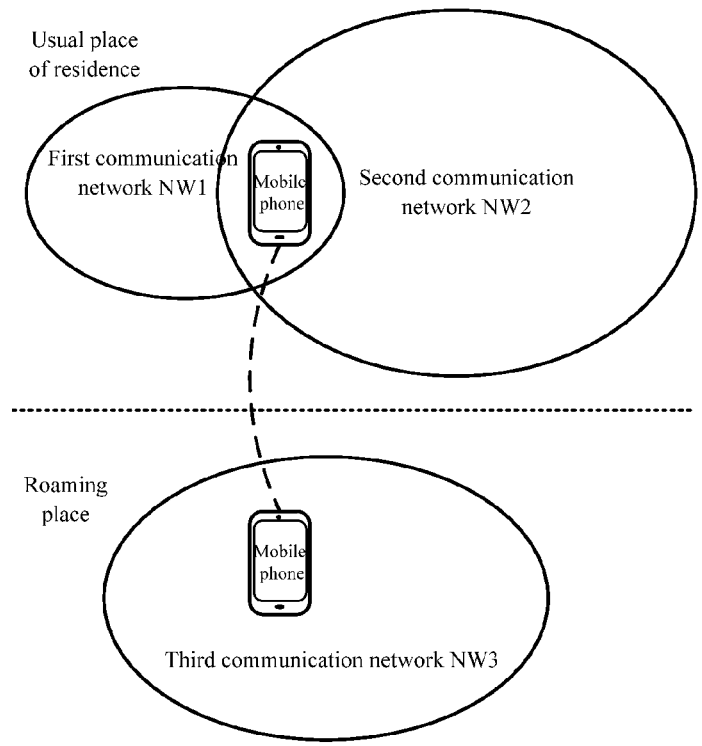
FIG. 12 schematically illustrates an application scenario of a technical solution according to Embodiment Twelve of the present disclosure.

FIG. 12 schematically illustrates a scenario of applying the technical solution according to Embodiment Twelve of the present disclosure. In FIG. 12, it is described with a mobile communication apparatus being a mobile phone as an example. Typically, a mobile phone subscriber is located in a usual place of residence, but may transfer from the usual place of residence to a roaming place due to work, travel and other factors.

In the usual place of residence, the subscriber may have two subscriber identification cards, such as a first SIM card and a second SIM card. Here, the SIM card is only an example, and the subscriber identification card may also be a UIM card. A type of the subscriber identification card may be changed according to a type of a communication network. The mobile phone communicates with a first communication network NM1 via the first SIM card, and communicates with a second communication network NM2 via the second SIM card. Each communication network according to Embodiment Twelve of the present disclosure refers to a communication network corresponding to each subscriber identification card. Correspondingly, the first communication network NM1 is generally different from the second communication network NM2, and is operated by a different operator. For example, the first SIM card may belong to a GSM network operated by China Mobile Communications Corporation, and the second SIM card may belong to a WCDMA network operated by China United Telecommunications Co. Ltd. Of course, the two SIM cards may also be two phone numbers under a same communication network, in which case the first communication network NM1 and the second communication network NM2 are both, for example, GSM networks.

The mobile phone subscriber leaves the usual place of residence to reach the roaming place so as to be in a roaming state. With international roaming as an example, the mobile phone subscriber uses a network of an overseas operator under an international roaming state, international roaming fee standard is determined based on protocols between the operators of two countries or regions, and data service fee of international roaming in most countries or regions is higher than the domestic data service fee. In order to save the fee, a terminal subscriber may need to purchase an SIM card of the roaming place, but it is very inconvenient to deal with relevant procedures in a business hall of the communication network operator at the roaming place, and to purchase a phone card at the roaming place.

In embodiment of the present disclosure, the mobile communication terminal may stop one of the two subscriber identification cards in the usual place of residence, for example, the first SIM card, and obtains card information of the subscriber identification card in the communication network at the roaming place through communication of the other subscriber identification card (for example, the second SIM card), then correlates the card information of the subscriber identification card at the roaming place with the modem module corresponding to the stopped subscriber identification card, and registers the subscriber identification card at the roaming place to a third communication network NM3 at the roaming place. Thus, the mobile phone can execute data service transmission by the subscriber identification card of the third communication network NM3, so as to save roaming data service fee. As can be seen, after the mobile phone subscriber reaches the roaming place, he/she needn't obtain an entity of the subscriber identification card, but only needs to obtain its card information, so that the mobile phone can conveniently execute data service transmission by using the third communication network NM3 at the roaming place.

The card information of the subscriber identification card in the third communication network NM3 at the roaming place may be provided by a specific company specialized in the subscriber identification card at the roaming place. The specific company, for example, obtains a plurality of subscriber identification cards in the third communication network NM3 in advance, and allocates card information of one subscriber identification card to the mobile phone subscriber as determined to reach the roaming place.

Hereinafter, the mobile communication terminal, and a process of obtaining the card information of the subscriber identification card at the roaming place and accessing the third communication network at the roaming place based on the card information according to Embodiment Twelve of the present disclosure will be described.

Figure 13:
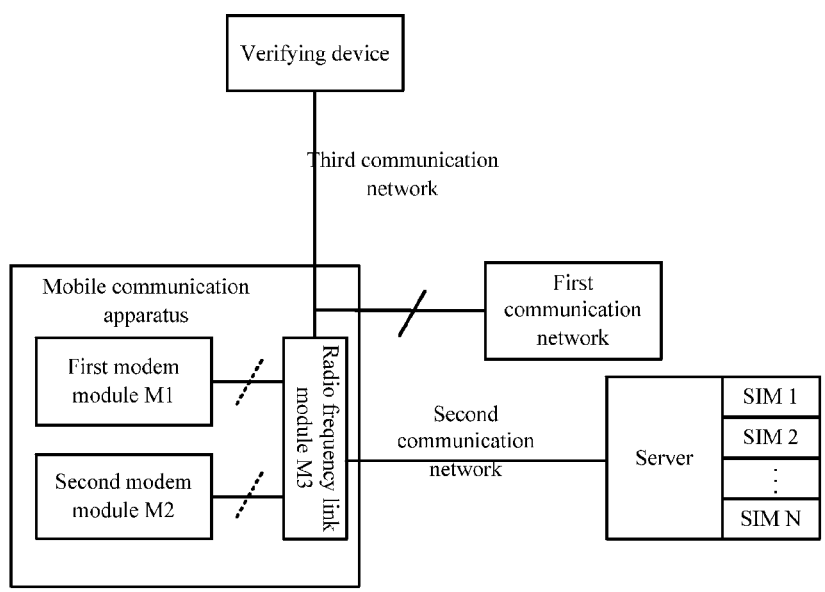
FIG. 13 schematically illustrates a communication environment where a mobile communication terminal is located according to Embodiment Twelve of the present disclosure.

FIG. 13 schematically illustrates the mobile communication terminal and a communication environment thereof according to Embodiment Twelve of the present disclosure. As shown in FIG. 13, the mobile communication terminal is capable of communicating via any one of the first communication network NW1, the second communication network NW2 and the third communication network NW3. The first communication network NW1 and the second communication network NW2 may either be a same communication network, or be different communication networks. The third communication network NW3 may be a communication network at the roaming place, whose type may be either same as or different from one of the first communication network NW1 and the second communication network NW2.

The mobile communication apparatus includes a first modem module M1, a second modem module M2 and a radio frequency link module M3. The first modem module M1 is capable of executing data service transmission in the first communication network NW1. The second modem module M2 is capable of executing data service transmission in the second communication network NW2. As shown in FIG. 13, the second modem module M2 is capable of communicating with a server via the second communication network NW2, so as to download the card information of the subscriber identification card for the third communication network NW3 to the mobile communication apparatus. The server, for example, manages a plurality of subscriber identification cards such as a first SIM card, a second SIM card . . . an N-th SIM card for the third communication network NW3. By using the first modem module M1 and the second modem module M2, the mobile communication apparatus is capable of executing communication and standby via the phone numbers of the two subscriber identification cards. Here, for clarity, the first modem module M1 and the second modem module M2 are shown separately, but the two can be physically located either on a same modem device or on different modem devices.

The first modem module M1, in addition to executing data service transmission in the first communication network NW1, is also capable of executing data service transmission in the third communication network NW3, which may be implemented by adding a communication protocol supported by the first modem module. Of course, the first modem module M1 needs to firstly stop data service transmission in the first communication network NW1, and then it can execute data service transmission in the third communication network NW3. In order to execute data service transmission in the third communication network NW3, the first modem module M1 needs to firstly access the third communication network NW3, and have the subscriber identification card provided by the first modem module M1 verified by the third communication network NW3. Typically, the third communication network has a verifying device, for verifying whether the subscriber identification card provided by the first modem module M1 is legitimate or not. The first modem module M1, after stopping data service transmission in the third communication network NW3, may re-access the first communication network NW1, and execute data service transmission in the first communication network NW1.

The radio frequency link module M3 includes a radio frequency link. The radio frequency link is a part for transmitting a radio frequency signal in the mobile communication apparatus, and typically includes a radio frequency signal transmitter, an antenna, and a radio frequency signal receiver. In various implementations, the radio frequency link may also include other components, for example, a filter, a coupling adapter, a radio frequency switch, and so on.

In the respective embodiments of the present disclosure, the first modem module M1 and the second modem module M2 transmit the radio frequency signal by using one and the same radio frequency link in the radio frequency link module M3. Thus, the mobile communication apparatus may have a baseband chip, a radio frequency chip and a memory, etc., corresponding to the one radio frequency link, so as to save hardware cost and reduce design complexity of the mobile communication apparatus.

Figure 14:
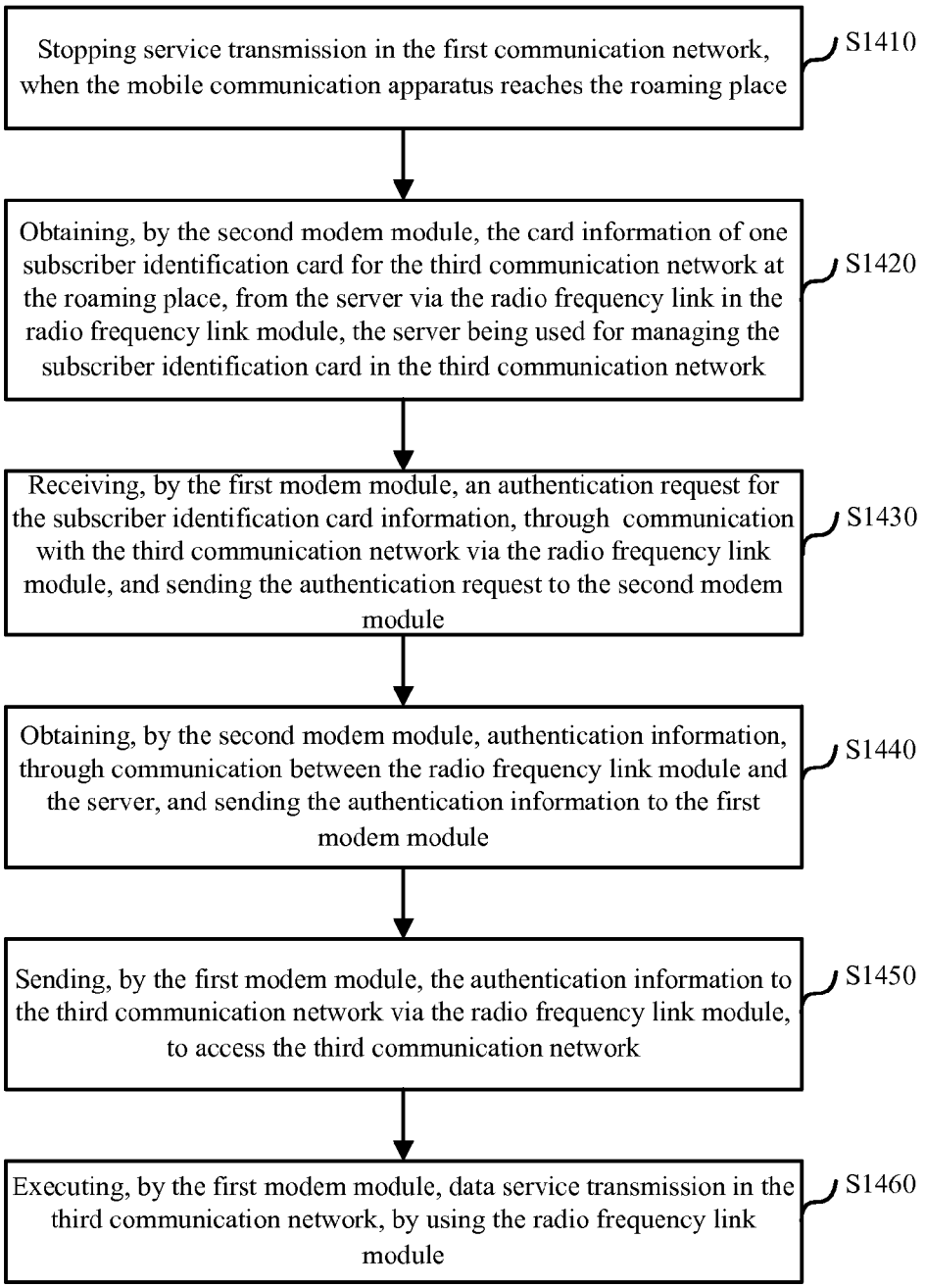
FIG. 14 schematically illustrates a flow chart of a data service transmission method according to Embodiment Twelve of the present disclosure.

FIG. 14 schematically illustrates a flow chart of a data service transmission method 1400 according to Embodiment Twelve of the present disclosure. The data service transmission method 1400 can be applied to the mobile communication apparatus shown in FIG. 13. The mobile communication apparatus includes a first modem module, a second modem module and a radio frequency link module. The first modem module is capable of executing data service transmission in a first communication network, and the second modem module is capable of executing data service transmission in a second communication network.

As shown in FIG. 14, the data service transmission method 1400 includes: stopping service transmission in the first communication network, when the mobile communication apparatus reaches a roaming place (S1410); obtaining, by the second modem module, card information of a subscriber identification card in a third communication network at the roaming place from the server via a radio frequency link in the radio frequency link module, the server being used for managing the subscriber identification card for the third communication network (S1420); receiving, by the first modem module, an authentication request for the subscriber identification card information through communication with the third communication network via the radio frequency link module, and sending the authentication request to the second modem module (S1430); obtaining, by the second modem module, authentication information through communication with the server via the radio frequency link module, and sending the authentication information to the first modem module (S1440); sending, by the first modem module, the authentication information to the third communication network via the radio frequency link module, to access the third communication network (S1450); executing, by the first modem module, data service transmission in the third communication network via the radio frequency link module (S1460).

In S1410, service transmission in the first communication network is stopped, when the mobile communication apparatus reaches the roaming place. After service transmission in the first communication network is stopped, the first modem module is in a standby state, so that it can be used for supporting a third subscriber identification card for the third communication network at the roaming place. It should be noted that, after service transmission in the first communication network is stopped, it is not necessary to remove the first subscriber identification card for the first communication network from the mobile communication apparatus. This is because in the embodiment of the present disclosure, the mobile communication apparatus only obtains card information of the third subscriber identification card for the third communication network, and completes registration of the third subscriber identification card after the third communication network verifies the card information. In other words, for the mobile communication apparatus, the third subscriber identification card is a virtual subscriber identification card, and the mobile communication apparatus does not obtain a physical entity of the third subscriber identification card at all.

In S1420, the second modem module obtains the card information of the subscriber identification card for the third communication network at the roaming place from the server via the radio frequency link in the radio frequency link module. The server is used for managing the third subscriber identification card for the third communication network. The second modem module may, for example, execute data service transmission in the second communication network via the second subscriber identification card. Thus, the second modem module may obtain the card information of the third subscriber identification card via the second communication network.

The card information of the third subscriber identification card, for example, may include a phone number, an International Mobile Subscriber Identity (IMSI) and the like. The IMSI is a mark for distinguishing a mobile subscriber, and may include, for example, a country code to which the mobile subscriber belongs, a mobile network number, and a mobile subscriber identification code. The subscriber identification card information is generally stored in the subscriber identification card. As described above, the card information of the subscriber identification card for the third communication network NM3 may be provided by a specific company specialized in the subscriber identification card at the roaming place. The specific company may be a product supplier of the mobile communication apparatus, and may also be a service provider licensed by the operator of the third communication network NM3. The specific company, for example, may obtain a plurality of subscriber identification cards under the third communication network NM3 in advance, read the card information from the subscriber identification cards and submit to the server for management. Then, the card information of one subscriber identification card can be allocated to the mobile phone subscriber who is to reach the roaming place.

Figure 15:
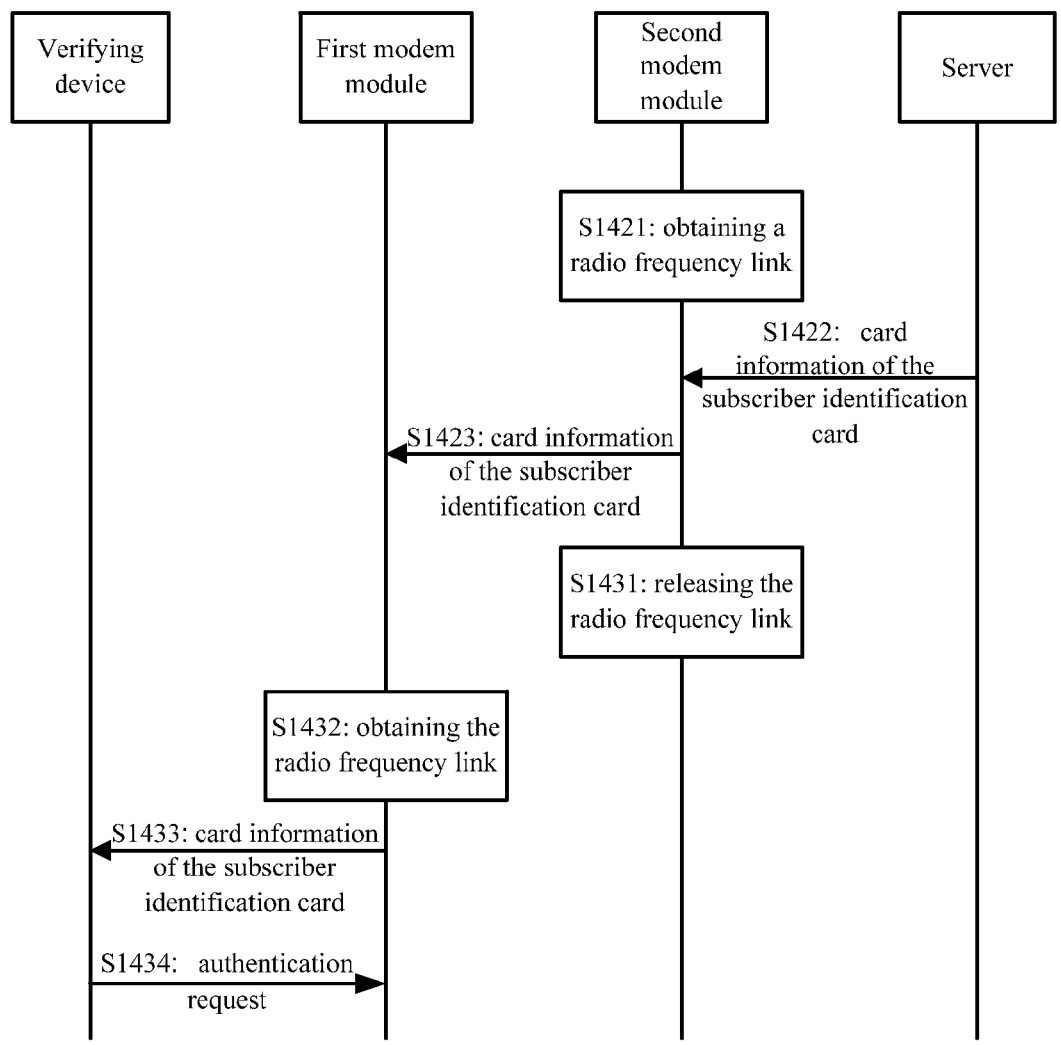
FIG. 15 schematically illustrates a flow chart of a process of obtaining card information and an authentication request in the data service transmission method in FIG. 14.

FIG. 15 schematically illustrates a flow chart of a process of obtaining card information and an authentication request in the data service transmission method in FIG. 14. The card information of the third subscriber identification card for the third communication network at the roaming place is obtained from the server through steps S1421, S1422 and S1423 in FIG. 15. As shown in FIG. 15, allocating the radio frequency link in the radio frequency link module to the second modem module (S1421); the second modem module receiving the card information of the subscriber identification card from the server via the radio frequency link module (S1422); loading the card information of the subscriber identification card to the first modem module (S1423).

The first modem module and the second modem module share a radio frequency link, and the two modem modules will use the radio frequency link module in a time-sharing manner. In specific application, priority or timing may be set for operations of the two modem modules which use the radio frequency link module, and then the radio frequency link module is used in a time-sharing manner according to the priority or the timing set. Before the second modem module obtains the card information of the third subscriber identification card from the server, it must be firstly ensured that the second modem module obtains the radio frequency link (S1421).

After obtaining the radio frequency link, the second modem module may issue a card request to the server via the second communication network. The card request is used for applying for the subscriber identification card for the third communication network. The server allocates the third subscriber identification card according to the request, and sends the card information of the third subscriber identification card to the second modem module (S1422). It should be noted that, the second modem module may need to perform a plurality of times of interactions with the server in order to obtain the card information of the third subscriber identification card allocated. Moreover, in a process of interaction between the second modem module and the server, if the first modem module has an urgent need to use the radio frequency link module, the second modem module can also suspend interaction with the server.

The second modem module, after receiving the card information of the third subscriber identification card, loads the card information of the subscriber identification card to the first modem module (S1423). For example, the subscriber identification card information may be stored in a memory of the first modem module, or the card information is stored in a memory coupled with the first modem module, as long as the first modem module can use the card information of the third subscriber identification card.

FIG. 15 is merely an example of obtaining the card information of the third subscriber identification card. Alternatively, the mobile communication apparatus may also obtain the card information of the third subscriber identification card from the server in advance, before roaming to the roaming place.

After S1420, the first modem module receives an authentication request for the subscriber identification card information through communication with the third communication network via the radio frequency link module, and sends the authentication request to the second modem module (S1430). As an example, the first modem module obtains the radio frequency link module, and sends the card information of the third subscriber identification card to the third communication network. For the sake of safety, the third communication network, after receiving the card information, needs to authenticate right of the mobile communication apparatus to use the third subscriber identification card, and thus will send the authentication request to the first modem module. The role of authentication is to protect the third communication network, to prevent illegal use, and to refuse "invasion" of a fake legitimate customer into the third communication network.

The authentication request may include, for example, a pseudo-random number. For example, the third communication network stores the pseudo-random number, an authentication key of the third subscriber identification card and authentication information obtained based on the pseudo-random number and the authentication key in the verifying device in FIG. 13. The authentication key of the third subscriber identification card may, for example, be strictly protected in a physical entity of the third subscriber identification card, which cannot be illegally obtained by a third party, and thus, only a legitimate subscriber of the third subscriber identification card knows the authentication key, and can work out the authentication information after receiving the pseudo-random number. The third communication network, when judging that the authentication information stored thereby is consistent with the authentication information received from the mobile communication apparatus, can determine that the mobile communication apparatus is the legitimate subscriber of the third subscriber identification card.

With further reference to FIG. 15, the authentication request for the card information of the third subscriber identification card is obtained through steps S1431, S1432, S1433 and S1434 in FIG. 15. As shown in FIG. 15, the second modem module is made to release the radio frequency link module (S1431); the radio frequency link module is allocated to the first modem module (S1432); the first modem module sends the card information of the subscriber identification card to the third communication network via the radio frequency link module (S1433); and the first modem module receives the authentication request for the subscriber identification card information from the third communication network via the radio frequency link module (S1434).

As described above, the first modem module and the second modem module share a radio frequency link, and the two modem modules will use the radio frequency link module in a time-sharing manner. In order to obtain the authentication request from the third communication network, it must be firstly ensured that the first modem module obtains the radio frequency link; by the above described S1431 and S1432, the first modem module obtains the radio frequency link, so that it is capable of communicating with the third communication network in order to obtain the authentication request. The first modem module sends the card information of the third subscriber identification card to the third communication network via the radio frequency link module (S1433), to request to access the third communication network. The third communication network sends the authentication request to authenticate use right of the mobile communication apparatus to the third subscriber identification card. The first modem module, after receiving the authentication request, obtains the authentication information via the second modem module.

In S1440, the second modem module obtains the authentication information through communication with the server via the radio frequency link module, and sends the authentication information to the first modem module. As an example, the second modem module obtains the radio frequency link module, encapsulates the authentication request into data transmitted in the protocol of the second communication network, and sends to the server for managing the subscriber identification card for the third communication network via the second communication network. In a case where the authentication request includes a pseudo-random number, the server may, for example, execute a predetermined algorithm for the pseudo-random number and an authentication key Ki of the third subscriber identification card, to work out a response number. The response number is just the authentication information. The second modem module, after receiving the authentication information from the server, sends the authentication information to the first modem module.

Figure 16:
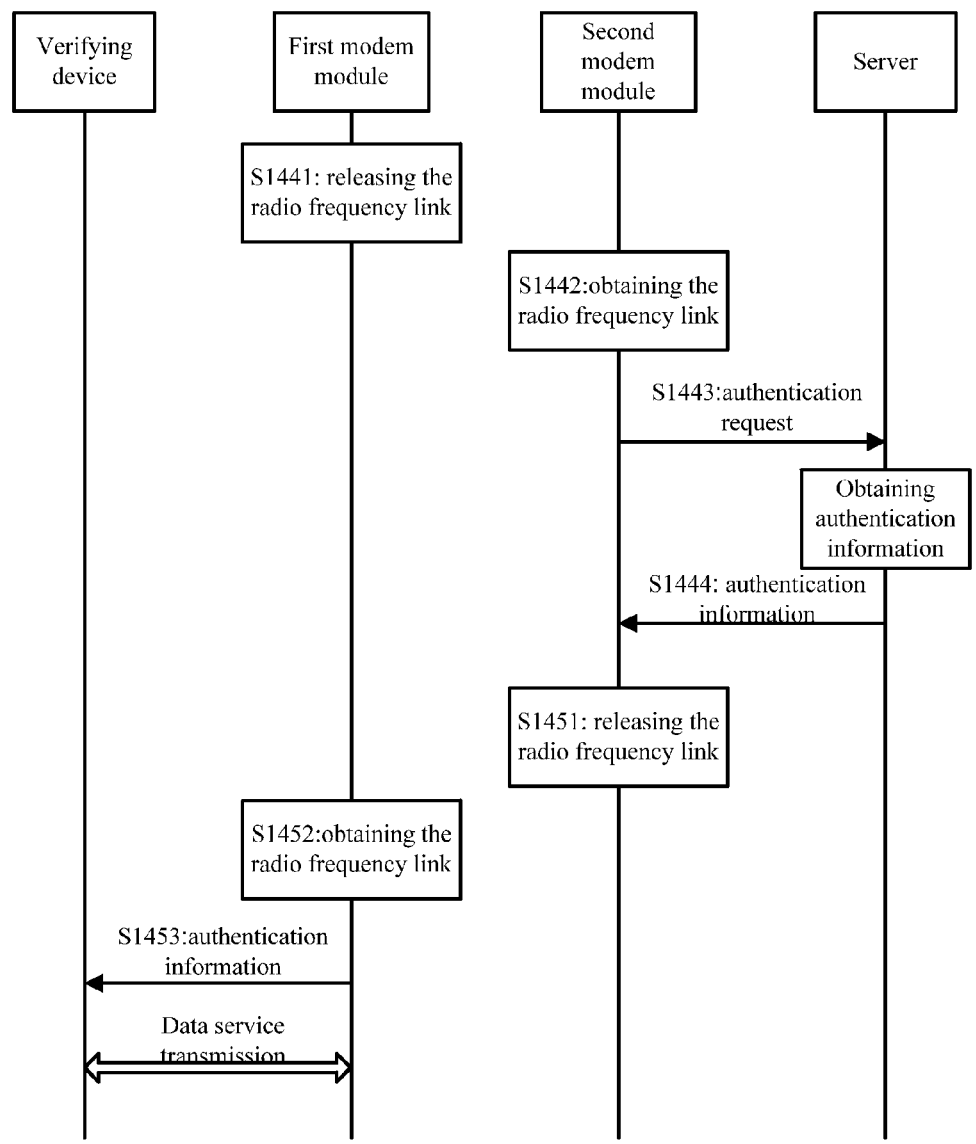
FIG. 16 schematically illustrates a flow chart of a process of completing verification based on the authentication request so as to execute data service transmission in the data service transmission method in FIG. 14.

FIG. 16 schematically illustrates a flow chart of a process of completing verification based on the authentication request so as to execute data service transmission in the data service transmission method in FIG. 14. The authentication information is obtained from the server through steps S1441, S1442, S1443 and S1444 in FIG. 16. As shown in FIG. 16, the first modem module is made to release the radio frequency link module (S1441); the radio frequency link module is allocated to the second modem module (S1442); the second modem module sends the authentication request to the server via the radio frequency link module, the server obtaining the authentication information based on the authentication request (S1443); and the second modem module receives the authentication information from the server via the radio frequency link module (S1444).

Since the first modem module and the second modem module share a radio frequency link, in order that the second modem module obtains the authentication information from the server, it must be firstly ensured that the second modem module obtains the radio frequency link. By the above described S1441 and S1442, the second modem module obtains the radio frequency link, so that it is capable of obtaining the authentication information through communication with the server via the second communication network in S1443 and S1444. In a process of obtaining the authentication information from the server by the second modem module, there may be a case that the first modem module needs to use the radio frequency link, so the second modem module may need to suspend interaction with the server.

In S1450, the first modem module sends the authentication information to the third communication network via the radio frequency link module, to access the third communication network. As an example, the first modem module obtains the radio frequency link module, encapsulates the authentication information into data transmitted in the protocol of the third communication network, and sends to, for example, the verifying device as shown in FIG. 13, so as to verify use right of the third subscriber identification card.

With further reference to FIG. 16, the authentication information is sent to the third communication network through steps S1451, S1452 and S1453 in FIG. 16. As shown in FIG. 16, the second modem module is made to release the radio frequency link module (S1451); the radio frequency link module is allocated to the first modem module (S1452); and the first modem module sends the authentication information to the third communication network by using the radio frequency link module (S1453).

Similarly, since the first modem module and the second modem module share a radio frequency link, in order that the first modem module sends the authentication information to the third communication network, it must be firstly ensured that the first modem module obtains the radio frequency link. By the above described S1451 and S1452, the first modem module obtains the radio frequency link, so that it is capable of communicating with the third communication network by using the radio frequency link, in order to send the authentication information in S1453.

The verifying device in the third communication network, after receiving the authentication information from the first modem module, compares the received authentication information with the authentication information stored therein. If the two are the same, the verifying device confirms validity of the third subscriber identification card.

After the validity of the third subscriber identification card is determined, the first modem module executes data service transmission in the third communication network by using the radio frequency link module. Since the third subscriber identification card is the subscriber identification card for the third communication network, roaming data service fee is saved.

For a voice service, an amount of data to be transmitted in data service is very large, and the modem module typically runs a high-level protocol stack to execute data service transmission. As can be seen from the above description, in a process of accessing the third communication network by the mobile communication apparatus, the second modem module is mainly used for transmitting a small amount of data such as the authentication request and the authentication information, so the amount of data service transmitted is very small. Thus, the second modem module can support a low-level protocol stack, for example, it can only support the protocol stack for a second-generation communication network. Because the first modem module will execute data service transmission in the third communication network, it can support the high-level protocol stack, for example, it can support the protocol stacks in the second-generation communication network and a third-generation communication network, and even support a protocol stack in a fourth-generation communication network. Thus, hardware cost of the mobile communication apparatus can be saved. Of course, both the first modem module and the second modem module can support the high-level protocol stack.

In the above-described technical solution of data service transmission according to Embodiment Twelve of the present disclosure, the card information of the third subscriber identification card for the third communication network is loaded in the first modem module, and the subscriber identification card is registered to the third communication network, so that the subscriber identification card for the communication network at the roaming place is registered in a case where there is no physical entity of the subscriber identification card. Thus, the mobile communication apparatus can execute data service transmission by using the communication network at the roaming place conveniently, so as to save the roaming data service fee. Since the first modem module and the second modem module share a radio frequency link, requirements on hardware configuration of the mobile communication apparatus are reduced.

Embodiment Thirteen

Figure 17:
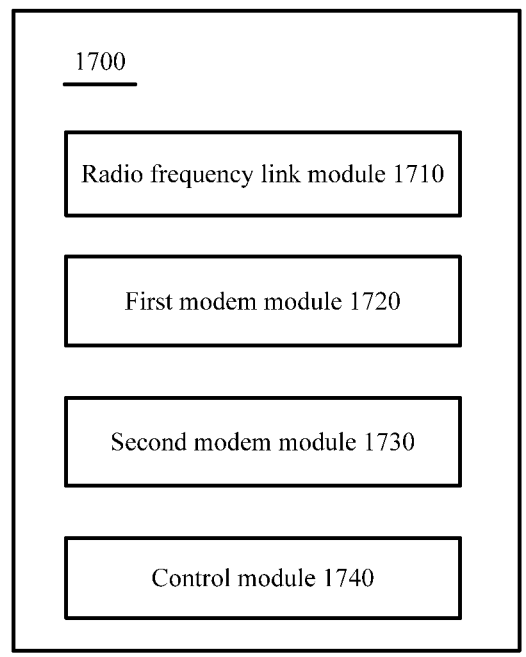
FIG. 17 schematically illustrates a block diagram of a mobile communication apparatus according to Embodiment Thirteen of the present disclosure.

FIG. 17 schematically illustrates a block diagram of a mobile communication apparatus 1700 according to Embodiment Thirteen of the present disclosure. The mobile communication apparatus 1700 may be the mobile phone in FIG. 12, or the mobile communication apparatus in FIG. 13.

As shown in FIG. 17, the mobile communication apparatus 1700 comprises: a radio frequency link module 1710, including a radio frequency link; a first modem module 1720, capable of executing data service transmission in a first communication network and data service transmission in a third communication network at a roaming place via the radio frequency link; a second modem module 1730, connected with the first modem module, and capable of executing data service transmission in a second communication network via the radio frequency link; and a control module 1740, for, after the mobile communication apparatus reaches the roaming place, controlling information transmission between the first modem module and the second modem module, and controlling the first modem module and the second modem module to respectively communicate with the third communication network and the second communication network at different times via the radio frequency link module. The first modem module 1720, under the control of the control module 1740, receives the card information of the subscriber identification card for the third communication network from a server via the second modem module 1730, and registers the subscriber identification card to the third communication network, so as to execute data service transmission in the third communication network via the registered subscriber identification card, the server being used for managing the subscriber identification card for the third communication network.

The radio frequency link module 1710 includes a radio frequency link. The radio frequency link is a part for transmitting a radio frequency signal in the mobile communication apparatus, and typically includes a radio frequency signal transmitter, an antenna, and a radio frequency signal receiver. In various implementations, the radio frequency link may also include other devices, for example, a filter, a coupling adapter, a radio frequency switch, and so on. In the respective embodiments of the present disclosure, the radio frequency link module is shared by the first modem module 1720 and the second modem module 1730. Thus, the mobile communication apparatus may only have a baseband chip, a radio frequency chip and a memory, etc. corresponding to one radio frequency link, so as to save hardware cost and reduce design complexity of the mobile communication apparatus.

The first modem module 1720 is capable of executing data service transmission in the first communication network and data service transmission in the third communication network at the roaming place. For example, in a usual place of residence, the first modem module 1720 executes data service transmission in the first communication network; and when the mobile communication apparatus reaches the roaming place, the first modem module 1720 executes data service transmission in the third communication network. After reaching the roaming place, the first modem module 1720 needs to firstly stop data service transmission in the first communication network, then executes data service transmission in the third communication network. In order to execute data service transmission in the third communication network, the first modem module 1720 needs to firstly access the third communication network, and have the subscriber identification card provided by the first modem module 1720 verified by the third communication network.

Typically, the third communication network has a verifying device, for verifying whether the subscriber identification card provided by the first modem module 1720 is legitimate or not. The first modem module 1720, after stopping data service transmission in the third communication network, may re-access the first communication network, and execute data service transmission in the first communication network.

The second modem module 1730 is capable of executing data service transmission in the second communication network. The second modem module 1730 may receive the card information of the subscriber identification card for the third communication network from the server via the second communication network. The server, for example, manages a plurality of subscriber identification cards such as a first SIM card, a second SIM card . . . an N-th SIM card for the third communication network. The first modem module 1720 and the second modem module 1730 function such that the mobile communication apparatus can communicate and standby via two subscriber identification cards.

Here, for clarity, the first modem module 1720 and the second modem module 1730 are shown separately, but the two can be physically located either on a same modem device or on different modem devices. In addition, the first communication network and the second communication network may either be one and the same communication network, or be different communication networks. The third communication network may be a communication network at the roaming place, whose type may be either same as or different from one of the first communication network and the second communication network.

The control module 1740 controls information transmission between the first modem module and the second modem module. Since the first modem module and the second modem module share a radio frequency link, the control module 1740 controls the first modem module and the second modem module to communicate with the third communication network and the second communication network respectively at different times via the radio frequency link module. The control module 1740 controls the first modem module to receive the card information of the subscriber identification card from a server via the second modem module, and to register the subscriber identification card to the third communication network, so as to execute data service transmission in the third communication network by the registered subscriber identification card.

Hereinafter, examples of operations of the respective modules in the mobile communication apparatus are described. After the mobile communication apparatus 1700 reaches the roaming place, the first modem module 1720 stops service transmission in the first communication network under control of the control module 1740. The second modem module 1730 obtains the card information of the subscriber identification card of the third communication network under the control of the control module 1740, from the server via the radio frequency link in the radio frequency link module 1710, and sends the card information to the first modem module 1720. The first modem module 1720, after receiving the card information of the subscriber identification card, receives an authentication request for the subscriber identification card information under the control of the control module 1740 through communication with the third communication network via the radio frequency link module 1710, and sends the authentication request to the second modem module 1730. After receiving the authentication request, the second modem module 1720 obtains authentication information under the control of the control module 1740 through communication with the server via the radio frequency link module 1710, and sends the authentication information to the first modem module 1720. The first modem module 1720, after receiving the authentication information, sends the authentication information to the third communication network by using the radio frequency link module 1710, so that the mobile communication apparatus 1700 executes data service transmission in the third communication network by using the subscriber identification card. This is just an example. For example, the card information of the third subscriber identification card for the third communication network may also be obtained from the server by using the first communication network, before service transmission in the first communication network is stopped.

After the mobile communication apparatus 1700 reaches the roaming place, the control module 1740 stops a first subscriber identification card in the first communication network, so as to stop service transmission in the first communication network. After service transmission in the first communication network is stopped, the first modem module 1720 is in a standby state, so that it can be used for supporting a third subscriber identification card for the third communication network at the roaming place. After service transmission in the first communication network is stopped, it is not necessary to remove the first subscriber identification card in the first communication network from the mobile communication apparatus 1700. Thereafter, the mobile communication apparatus 1700 only obtains the card information of the third subscriber identification card for the third communication network, and completes registration of the third subscriber identification card after the third communication network verifies the card information. In other words, for the mobile communication apparatus 1700, the third subscriber identification card is a virtual subscriber identification card, and the mobile communication apparatus 1700 does not obtain a physical entity of the third subscriber identification card at all.

In order to obtain the card information of the subscriber identification card for the third communication network at the roaming place, the second modem module 1730 may execute data service transmission in the second communication network via the subscriber identification card of the second communication network. The card information of the subscriber identification card of the third communication network, for example, may include a phone number, an International Mobile Subscriber Identity (IMSI) and the like. The IMSI is a mark for distinguishing a mobile subscriber, and, for example, may include a country code to which the mobile subscriber belongs, a mobile network number and a mobile subscriber identification code. The subscriber identification card information is typically stored in the subscriber identification card. As described above, the card information of the subscriber identification card for the third communication network may be provided by a specific company specialized in the subscriber identification card at the roaming place. The specific company, for example, may obtain a plurality of subscriber identification cards in the third communication network in advance, read the card information from the subscriber identification cards and submit to the server for management. Then, the card information of one subscriber identification card can be allocated to the mobile phone subscriber who is to reach the roaming place.

The second modem module 1730 may obtain the card information of the subscriber identification card for the third communication network by operation as follows: obtaining the radio frequency link according to a first link instruction of the control module 1740, receiving the card information of the subscriber identification card from the server based on the radio frequency link, and loading the card information of the subscriber identification card to the first modem module according to a card loading instruction of the control module 1740. In specific application, the control module 1740 may set priority or timing for operations of the two modem modules which use the radio frequency link module, and then control the two modem modules to use the radio frequency link module in a time-sharing manner according to the priority or the timing set. After the second modem module 1730 obtains the radio frequency link according to the first link instruction of the control module 1740, the second modem module 1730 may issue a card request to the server via the second communication network, the card request being used for applying for the subscriber identification card for the third communication network. The server allocates the third subscriber identification card according to the request, and sends the card information of the third subscriber identification card to the second modem module. In a process of interaction between the second modem module 1730 and the server, if the first modem module 1720 has an urgent need to use the radio frequency link module, the control module 1740 may control the second modem module 1730 to suspend the interaction with the server. The second modem module 1730, after receiving the card information of the third subscriber identification card, stores the card information of the subscriber identification card in a memory of the first modem module 1720, or stores the card information in a memory coupled with the first modem module 1720, as long as the first modem module 1720 is capable of using the card information of the third subscriber identification card.

After the second modem module 1730 receives the card information of the subscriber identification card, the respective modules in the mobile communication apparatus perform operation as follows, so as to receive an authentication request for the subscriber identification card information from the third communication network. The control module 1740 controls the second modem module 1730 to release the radio frequency link module, and sends a second link instruction to the first modem module 1720. Since the first modem module 1720 and the second modem module 1730 share a radio frequency link, in order to obtain the authentication request from the third communication network, it must be firstly ensured that the first modem module obtains the radio frequency link. Thus, the first modem module 1720 obtains the radio frequency link under the control of the control module 1740. The first modem module 1720 obtains the radio frequency link module according to the second link instruction, and sends the card information of the subscriber identification card to the third communication network via the radio frequency link. For the sake of safety, the third communication network, after receiving the card information, needs to authenticate right of the mobile communication apparatus to use the third subscriber identification card, and thus will send the authentication request to the first modem module. The role of authentication is to protect the third communication network, to prevent illegal use, and to refuse "invasion" of a fake legitimate customer into the third communication network. Therefore, the first modem module 1720, after sending the subscriber identification card information to the third communication network, also receives the authentication request for the subscriber identification card information from the third communication network via the radio frequency link module, so as to implement authentication.

The authentication request may include, for example, a pseudo-random number. The third communication network stores the pseudo-random number, an authentication key of the third subscriber identification card and authentication information obtained based on the pseudo-random number and the authentication key in, for example, the verifying device thereof. The authentication key of the third subscriber identification card may, for example, be strictly protected in a physical entity of the third subscriber identification card, which cannot be illegally obtained by a third party. Only a legitimate subscriber of the third subscriber identification card knows the authentication key, and can work out the authentication information after receiving the pseudo-random number. The third communication network, when judging that the authentication information stored thereby is consistent with the authentication information received from the mobile communication apparatus, can determine that the mobile communication apparatus is the legitimate subscriber of the third subscriber identification card.

The first modem module 1720, after receiving the authentication request for the subscriber identification card information, sends the authentication request to the second modem module 1730, so as to obtain the authentication information via the second modem module 1730. The respective modules in the mobile communication apparatus perform operation as follows so as to obtain the authentication information from the server. The control module 1740 controls the first modem module 1720 to release the radio frequency link module, and sends a third link instruction to the second modem module 1730. Since the first modem module and the second modem module share a radio frequency link, the control module 1740 sends the third link instruction so that the second modem module obtains the radio frequency link. The second modem module 1730 obtains the radio frequency link module according to the third link instruction, sends the authentication request to the server via the radio frequency link module, and receives the authentication information from the server via the radio frequency link module. The server obtains the authentication information based on the authentication request. For example, the second modem module 1730 may encapsulate the authentication request into data transmitted in the protocol of the second communication network, and sends to the server for managing the subscriber identification card for the third communication network via the second communication network. In a case where the authentication request includes a pseudo-random number, the server, for example, may execute a predetermined algorithm for the pseudo-random number and the authentication key of the third subscriber identification card, to work out a response number, and the response number is just the authentication information. The second modem module 1730, after receiving the authentication information from the server, sends the authentication information to the first modem module 1720. In a process of obtaining the authentication information from the server by the second modem module 1730, there may be a case that the first modem module 1720 needs to use the radio frequency link, and the second modem module 1730 may need to suspend interaction with the server.

After receiving the authentication information, the respective modules in the mobile communication apparatus perform operation as follows to send the authentication information to the third communication network, so as to register to the third communication network. The control module 1740 controls the second modem module 1730 to release the radio frequency link module, and sends a fourth link instruction to the first modem module 1720. Since the first modem module and the second modem module share a radio frequency link, the control module 1740 executes control operation, so that the first modem module 1720 obtains the radio frequency link. The first modem module 1720 obtains the radio frequency link module according to the fourth link instruction, and sends the authentication information to the third communication network via the radio frequency link module. For example, the first modem module 1720 obtains the radio frequency link module, encapsulates the authentication information into data transmitted in the protocol of the third communication network, and sends to the verifying device in the third communication network. The verifying device in the third communication network, after receiving the authentication information from the first modem module, compares the received authentication information with the authentication information stored thereby. If the two are the same, the verifying device confirms validity of the third subscriber identification card.

After the validity of the third subscriber identification card is confirmed, the first modem module 1720 can execute data service transmission in the third communication network via the radio frequency link module. Since data service transmission in the third communication network is executed via the subscriber identification card for the third communication network, roaming data service fee is saved.

As compared with a voice service, an amount of data to be transmitted in data service is very large, and the modem module typically runs a high-level protocol stack to execute data service transmission. As can be seen from the above description, in a process accessing the third communication network by the mobile communication apparatus 1700, the second modem module 1730 is mainly used for transmitting a small amount of data such as the authentication request and the authentication information, so the amount of data service transmitted is very small. Thus, the second modem module 1730 can support a low-level protocol stack, for example, it can only support the protocol stack for a second-generation communication network. Because the first modem module 1720 will execute data service transmission in the third communication network, it can support the high-level protocol stack, for example, it can support the protocol stacks for the second-generation communication network and a third-generation communication network, and even support a protocol stack for a fourth-generation communication network. Thus, hardware cost of the mobile communication apparatus can be saved. Of course, both the first modem module 1720 and the second modem module 1730 can support the high-level protocol stack.

In the above-described technical solution of the mobile communication apparatus according to Embodiment Thirteen of the present disclosure, the card information of the subscriber identification card for the third communication network is loaded in the first modem module 1720, and the subscriber identification card is registered to the third communication network, so that the subscriber identification card for the communication network at the roaming place is registered in a case where there is no physical entity of the subscriber identification card. Thus, the mobile communication apparatus 1700 can execute data service transmission in the communication network at the roaming place conveniently, so as to save the roaming data service fee. Since the first modem module 1720 and the second modem module 1730 share a radio frequency link, requirements on hardware configuration of the mobile communication apparatus are reduced.

Embodiment Fourteen

Figure 18:
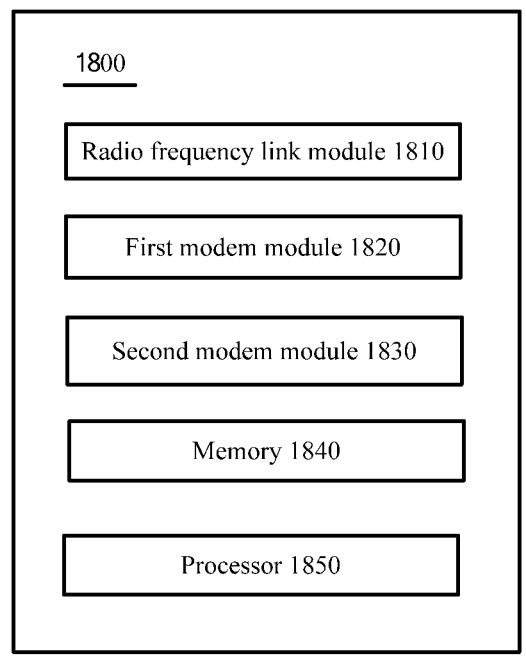
FIG. 18 schematically illustrates a block diagram of a mobile communication apparatus according to Embodiment Fourteen of the present disclosure.

FIG. 18 schematically illustrates a block diagram of a mobile communication apparatus 1800 according to Embodiment Fourteen of the present disclosure. As shown in FIG. 18, the another mobile communication apparatus 1800 includes: a radio frequency link module 1810; a first modem module 1820; a second modem module 1830; a memory 1840 for storing a program code; and a processor 1850, for executing the program code to implement the methods described in conjunction with FIG. 14 to FIG. 16.

The radio frequency link module 1810, the first modem module 1820 and the second modem module 1830 in FIG. 18 are respectively the same as the radio frequency link module 1710, the first modem module 1720 and the second modem module 1730 in FIG. 17. The memory 1840 may include at least one of a read-only memory and a random access memory, and provide instruction and data for the processor 1850. A portion of the memory 1840 may further include a Non-Volatile Random Access Memory (NVRAM).

The processor 1850 may be a general purpose processor, a Digital Signal Processor (DSP), an Application-Specific Integrated Circuit (ASIC), a Field-Programmable Gate Array (FPGA) or any other programmable logic device, a discrete gate or a transistor logic device, and a discrete hardware component. The general purpose processor may be a microprocessor or any conventional processor, etc.

The steps of the method disclosed in conjunction with the embodiment of the present disclosure may be embodied directly as being executed and completed by the processor, or being executed and completed by a combination of hardware and software modules in the processor. The software module may be located in well-known storage mediums in the art such as the random access memory, a flash memory, the read-only memory, a programmable read-only memory or electrically erasable programmable memory, a register, etc. The storage medium is located in the memory 1840; and the processor 1850 reads information in the memory 1840, and completes the steps of the above-described method in combination with the hardware thereof.

Embodiment Fifteen

In Embodiment Fifteen of the present disclosure, a mobile communication terminal includes a first modem module, a second modem module and a third modem module, so that the mobile communication terminal may simultaneously execute data service transmission by using three subscriber identification cards. The mobile communication terminal, after reaching a roaming place, may retain data service transmission in the communication networks corresponding to two subscriber identification cards in the usual place of residence, load a subscriber identification card for a third communication network at the roaming place in the mobile communication terminal, and register the subscriber identification card at the roaming place to the third communication network NM3 at the roaming place. Thus, the mobile communication terminal can execute data service transmission by using the subscriber identification card for the third communication network NM3, so as to save roaming data service fee. Thereby, after a subscriber of the mobile communication apparatus reaches the roaming place, he/she needn't obtain an entity of the subscriber identification card, but only needs to obtain its card information, so that the mobile communication apparatus can conveniently execute data service transmission by using the third communication network NM3 at the roaming place.

Hereinafter, it is assumed that in the usual place of residence, data service transmission in a first communication network and a second communication network are respectively executed via a the first modem module M1 and a second modem module M2, and subscriber identification cards for a first communication network NW1, a second communication network NW2 and the third communication network NW3 are respectively referred to as a first subscriber identification card, a second subscriber identification card, and a third subscriber identification card.

Figure 19:
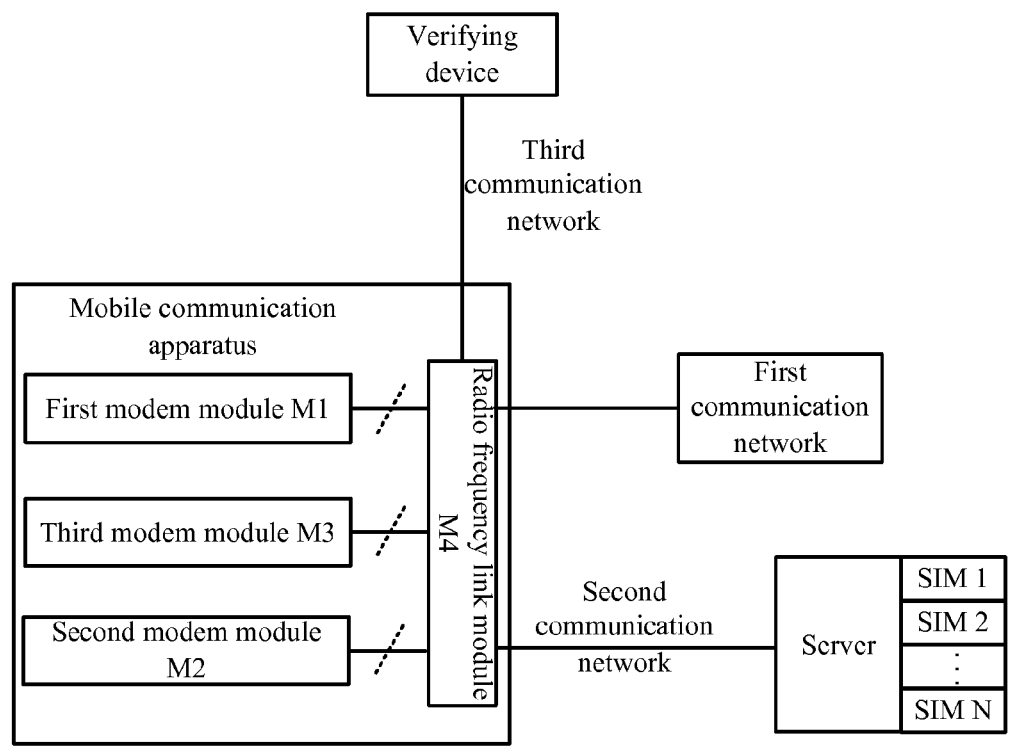
FIG. 19 schematically illustrates a communication environment where a mobile communication terminal is located according to Embodiment Fifteen of the present disclosure.

FIG. 19 schematically illustrates a mobile communication terminal and a communication environment thereof according to Embodiment Fifteen of the present disclosure. As shown in FIG. 19, the mobile communication terminal is capable of communicating via any one of the first communication network NW1, the second communication network NW2 and the third communication network NW3. The first communication network NW1 and the second communication network NW2 may either be a same communication network, or be different communication networks. The third communication network NW3 may be a communication network at the roaming place, whose type may be either same as or different from one of the first communication network NW1 and the second communication network NW2.

The mobile communication apparatus includes a first modem module M1, a second modem module M2, a third modem module M3 and a radio frequency link module M4. The first modem module M1 is capable of executing data service transmission in the first communication network NW1, and is also capable of executing data service transmission in the third communication network NW3 when necessary. The second modem module M2 is capable of executing data service transmission in the second communication network NW2. The first modem module M1 is capable of executing data service transmission under at least one of the first communication network NW1 and the third communication network NW3.

As shown in FIG. 19, the second modem module M2 is capable of communicating with a server via the second communication network NW2, so as to download the card information of the subscriber identification card for the third communication network NW3 to the mobile communication apparatus. The server, for example, manages a plurality of subscriber identification cards such as a first SIM card, a second SIM card . . . an N-th SIM card for the third communication network NW3. By using the first modem module M1, the second modem module M2 and the third modem module M3, the mobile communication apparatus can communicate and standby via the phone numbers of the three subscriber identification cards. Here, for clarity, the first modem module M1, the second modem module M2 and the third modem module M3 are shown separately, but the three modem modules can be physically located either on a same modem device or on different modem devices.

The first modem module M1, in addition to executing data service transmission in the first communication network NW1, is also capable of executing data service transmission in the third communication network NW3 when necessary, which may be implemented by adding a communication protocol supported by the first modem module. Of course, the first modem module M1 needs to firstly stop data service transmission in the first communication network NW1, and then it can execute data service transmission in the third communication network NW3. In order to execute data service transmission in the third communication network NW3, the first modem module M1 needs to firstly access the third communication network NW3, and have the subscriber identification card provided by the first modem module M1 verified by the third communication network NW3. Typically, the third communication network has a verifying device, for verifying whether the subscriber identification card provided by the first modem module M1 is legitimate or not. The first modem module M1, after stopping data service transmission in the third communication network NW3, may re-access the first communication network NW1, and execute data service transmission in the first communication network NW1.

Furthermore, in order to execute data service transmission in the third communication network NW3, the third subscriber identification card for the third communication network NW3 may further be loaded to the third modem module M3, the third modem module M3 communicates with the third communication network NW3 to access the third communication network NW3, and has the subscriber identification card provided by the first modem module M1 verified by the third communication network NW3. At this time, the first modem module M1 does not need to have the capability of executing data service transmission in the third communication network NW3.

The radio frequency link module M4 includes a radio frequency link. The radio frequency link is a part for transmitting a radio frequency signal in the mobile communication apparatus, and typically includes a radio frequency signal transmitter, an antenna and a radio frequency signal receiver. In various implementations, the radio frequency link may also include other components, for example, a filter, a coupling adapter, a radio frequency switch, and so on.

In the respective embodiments of the present disclosure, the first modem module M1, the second modem module M2 and the third modem module M3 transmit the radio frequency signal by using a same radio frequency link in the radio frequency link module M4. Thus, the mobile communication apparatus may have a baseband chip, a radio frequency chip and a memory, etc., corresponding to one radio frequency link, so as to save hardware cost and reduce design complexity of the mobile communication apparatus.

Figure 20:
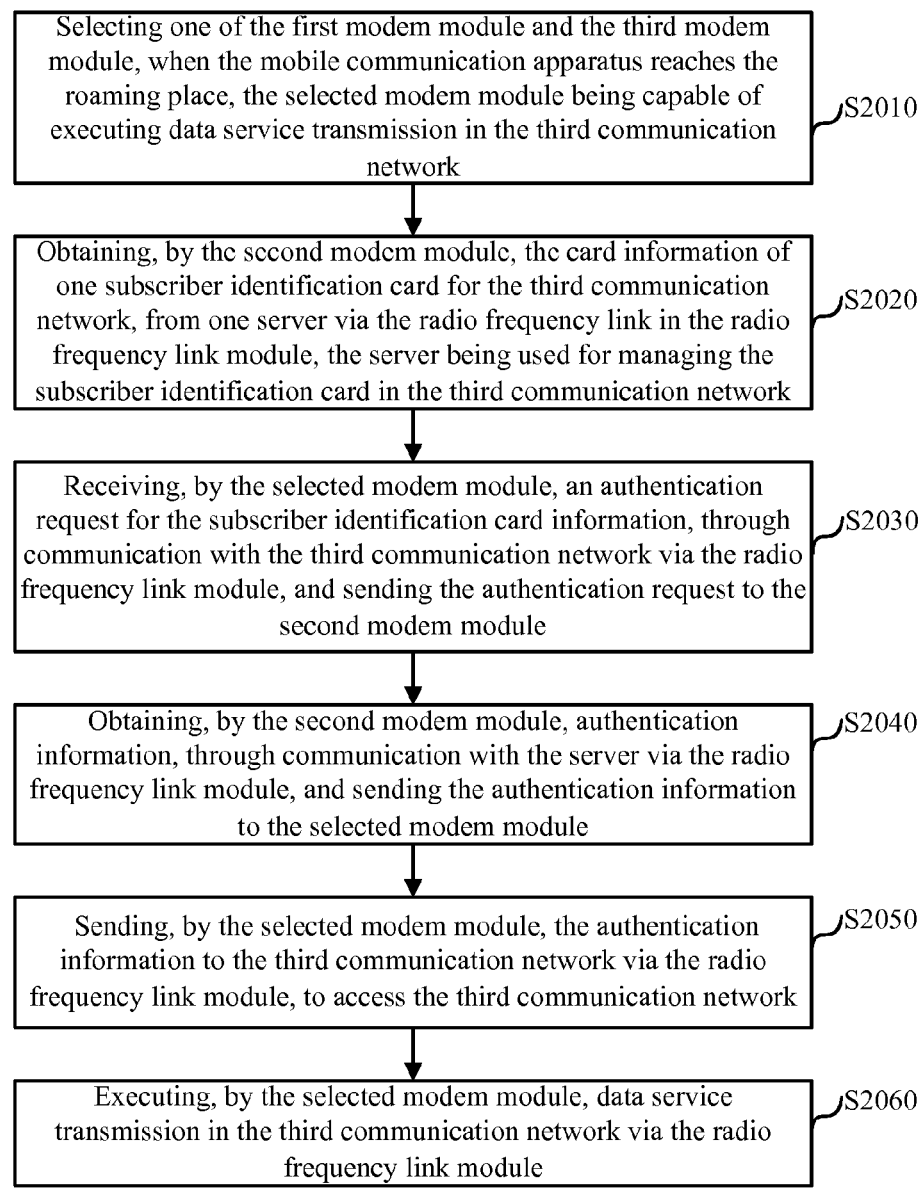
FIG. 20 schematically illustrates a flow chart of a data service transmission method according to Embodiment Fifteen of the present disclosure.

FIG. 20 schematically illustrates a flow chart of a data service transmission method 2000 according to Embodiment Fifteen of the present disclosure. The data service transmission method 2000 can be applied to the mobile communication apparatus shown in FIG. 19. The mobile communication apparatus includes a first modem module, a second modem module, a third modem module and a radio frequency link module. The first modem module is capable of executing data service transmission in a first communication network, and the second modem module is capable of executing data service transmission in a second communication network.

As shown in FIG. 20, the data service transmission method 2000 includes: selecting one of the first modem module and the third modem module, when the mobile communication apparatus reaches the roaming place, the selected modem module being capable of executing data service transmission in the third communication network (S2010); obtaining, by the second modem module, card information of one subscriber identification card for a third communication network from one server via a radio frequency link in the radio frequency link module, the server being used for managing the subscriber identification card for the third communication network (S2020); receiving, by the selected modem module, an authentication request for the subscriber identification card information through communication with the third communication network via the radio frequency link module, and sending the authentication request to the second modem module (S2030); obtaining, by the second modem module, authentication information through communication with the server via the radio frequency link module, and sending the authentication information to the selected modem module (S2040); sending, by the selected modem module, the authentication information to the third communication network via the radio frequency link module, to access the third communication network (S2050); executing, by the selected modem module, data service transmission in the third communication network via the radio frequency link module (S2060).

In S2010, when the mobile communication apparatus reaches the roaming place, one of the first modem module and the third modem module is selected to execute data service transmission in the third communication network. For example, in a case where the first modem module executes data service transmission in the first communication network, the third modem module in a standby state may be selected directly. At the roaming place, the subscriber identification card corresponding to the first communication network is in a roaming state, and thus has higher fee.

Figure 21:
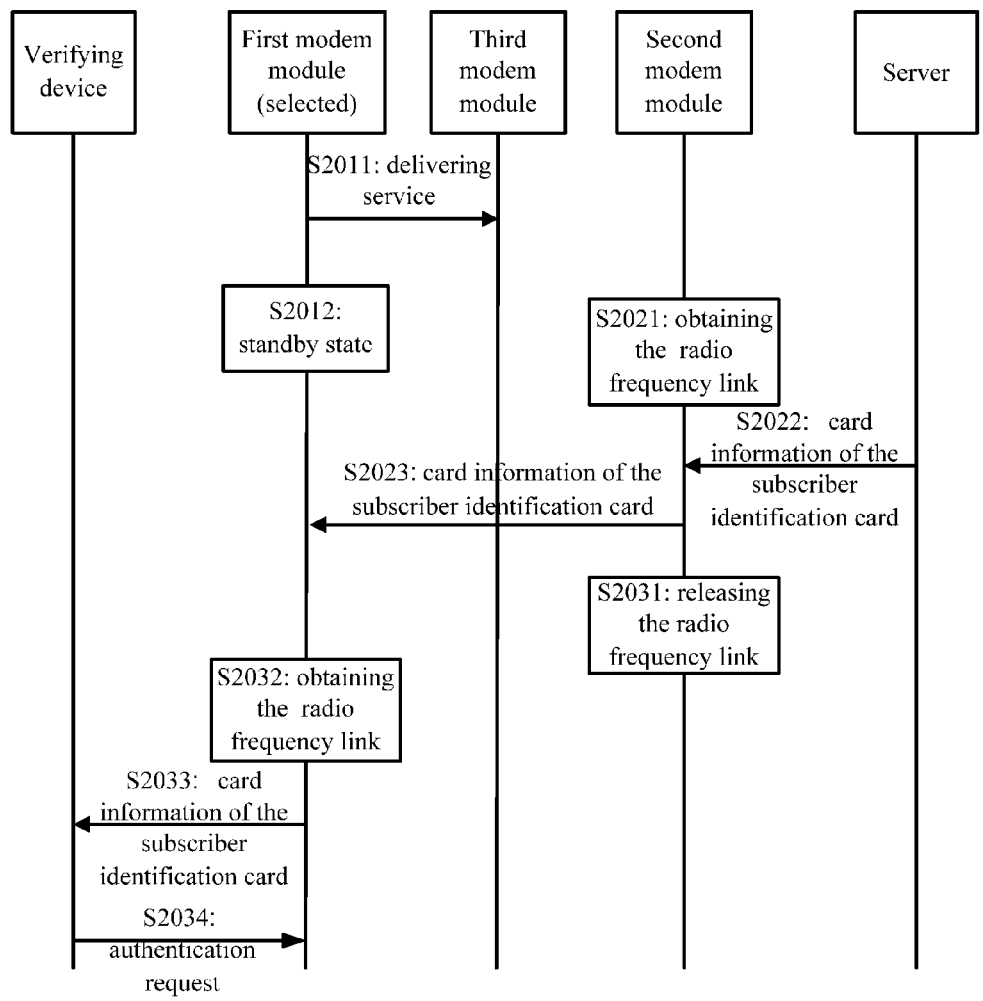
FIG. 21 schematically illustrates a flow chart of a process before the obtaining an authentication request in the data service transmission method in FIG. 20.

Alternatively, data service transmission in the first communication network may be switched from the first modem module to the third modem module, so that correspondingly, the first modem module is in the standby state, so as to be used for supporting the third subscriber identification card for the third communication network at the roaming place. FIG. 21 schematically illustrates a flow chart of a process before the obtaining the authentication request in the data service transmission method in FIG. 20. As shown in FIG. 21, one of the first modem module and the third modem module may be selected to execute data service transmission in the third communication network through S2011 and S2012 therein.

As shown in FIG. 21, service transmission being executed by the first modem module in the first communication network is delivered to the third modem module (S2011); the first modem module is made to be in the standby state, so as to be used for data service transmission in the third communication network (S2012). As compared with a voice service, an amount of data to be transmitted in data service is very large, and the modem module executing data service transmission needs to support a high-level protocol stack. Since in the usual place of residence, data service transmission is executed by the first modem module, and by delivering after reaching the roaming place, data service transmission in the third communication network may also be executed by the first modem module, which may reduce requirements on the protocol stack supported by the third modem module.

In the embodiment of the present disclosure, the mobile communication apparatus only obtains the card information of the third subscriber identification card for the third communication network, and completes registration of the third subscriber identification card after the third communication network verifies the card information. For the mobile communication apparatus, the third subscriber identification card is a virtual subscriber identification card, and the mobile communication apparatus does not obtain a physical entity of the third subscriber identification card at all. Thus, the mobile communication apparatus may provide only two card slots for inserting physical entities of two subscriber identification cards; and in a process of switching data service transmission in the first communication network from the first modem module to the third modem module, a physical position of the subscriber identification card for the first communication network may not be changed.

In S2020, the second modem module obtains card information of one subscriber identification card (for example, the third subscriber identification card) for the third communication network from one server via the radio frequency link in the radio frequency link module. The server is used for managing the subscriber identification card for the third communication network. The second modem module may execute data service transmission in the second communication network via the second subscriber identification card. Thus, the second modem module may obtain the card information of the third subscriber identification card for the third communication network via the second communication network.

The card information of the third subscriber identification card, for example, may include a phone number, an International Mobile Subscriber Identity (IMSI) and the like. The IMSI is a mark for distinguishing a mobile subscriber, and, for example, may include a country code to which the mobile subscriber belongs, a mobile network number and a mobile subscriber identification code. The subscriber identification card information is typically stored in the subscriber identification card. As described above, the card information of the subscriber identification card for the third communication network may be provided by a specific company specialized in the subscriber identification card at the roaming place. The specific company may be a product supplier of the mobile communication apparatus, and may also be a service provider licensed by the operator of the third communication network. The specific company, for example, may obtain a plurality of subscriber identification cards under the third communication network in advance, read the card information from the subscriber identification cards and submit to the server for management. Then, the card information of one subscriber identification card can be allocated to the mobile phone subscriber who is to reach the roaming place.

With further reference to FIG. 21, the card information of the third subscriber identification card for the third communication network at the roaming place is obtained from the server through steps S2021, S2022 and S2023. As shown in FIG. 21, the radio frequency link module is allocated to a second modem module (S2021); the second modem module receives card information of the subscriber identification card from the server for managing the subscriber identification card at the roaming place via the radio frequency link module (S2022); the card information of the subscriber identification card is loaded to the selected modem module (S2023). In FIG. 21, the selected modem module is the first modem module. Alternatively, in a case where the third modem module is selected in S2010, the card information of the subscriber identification card is loaded to the third modem module in S2023.

The three modem modules in the mobile communication apparatus share a radio frequency link, and the respective modem modules will use the radio frequency link module in a time-sharing manner. In specific application, priority or timing may be set for operations of the three modem modules via the radio frequency link module, and then the radio frequency link module is used in a time-sharing manner according to the priority or the timing set. Before the second modem module obtains the card information of the third subscriber identification card from the server, it must be firstly ensured that the second modem module obtains the radio frequency link (S2021).

After obtaining the radio frequency link, the second modem module may issue a card request to the server via the second communication network, the card request being used for applying for the subscriber identification card for the third communication network, the server allocates the third subscriber identification card according to the request, and sends the card information of the third subscriber identification card to the second modem module (S2022). It should be noted that, the second modem module may need to perform a plurality of times of interactions with the server in order to obtain the card information of the third subscriber identification card allocated. Moreover, in a process of interaction between the second modem module and the server, if the first modem module has an urgent need to use the radio frequency link module, the second modem module can also suspend the interaction with the server.

The second modem module, after receiving the card information of the third subscriber identification card, loads the card information of the subscriber identification card to the selected modem module (S2023). For example, the subscriber identification card information may be stored in a memory of the selected modem module, or the card information is stored in a memory coupled with the selected modem module, as long as the selected modem module is capable of using the card information of the third subscriber identification card.

FIG. 21 is merely an example of obtaining the card information of the third subscriber identification card. Alternatively, the mobile communication apparatus may also obtain the card information of the third subscriber identification card from the server in advance before roaming to the roaming place.

After S2020, the selected modem module receives an authentication request for the subscriber identification card information through communication with the third communication network via the radio frequency link module, and sends the authentication request to the second modem module (S2030). As an example, the selected modem module (for example, the first modem module) obtains the radio frequency link module, and sends the card information of the third subscriber identification card to the third communication network. For the sake of safety, the third communication network, after receiving the card information, needs to authenticate right of the mobile communication apparatus to use the third subscriber identification card, and thus will send the authentication request to the selected modem module. The role of authentication is to protect the third communication network, to prevent illegal use, and to refuse "invasion" of a fake legitimate customer into the third communication network.

The authentication request may include, for example, a pseudo-random number. The third communication network stores the pseudo-random number, an authentication key of the third subscriber identification card and authentication information obtained based on the pseudo-random number and the authentication key in, for example, the verifying device in FIG. 19. The authentication key of the third subscriber identification card may, for example, be strictly protected in a physical entity of the third subscriber identification card, which cannot be illegally obtained by a third party, and thus, only a legitimate subscriber of the third subscriber identification card knows the authentication key, and can work out the authentication information after receiving the pseudo-random number. The third communication network, when judging that the authentication information stored thereby is consistent with the authentication information received from the mobile communication apparatus, can determine that the mobile communication apparatus is the legitimate subscriber of the third subscriber identification card.

With further reference to FIG. 21, the authentication request for the card information of the third subscriber identification card is obtained through steps S2031, S2032, S2033 and S2034 in FIG. 21. As shown in FIG. 21, the second modem module is made to release the radio frequency link module (S2031); the radio frequency link module is allocated to the selected modem module (S2032); the selected modem module sends the card information of the subscriber identification card to the third communication network via the radio frequency link module (S2033); and the selected modem module receives the authentication request for the subscriber identification card information from the third communication network via the radio frequency link module (S2034).

As described above, the three modem modules share a radio frequency link. In order to obtain the authentication request from the third communication network, it must be firstly ensured that the selected modem module obtains the radio frequency link. Through the above described S2031 and S2032, the selected modem module obtains the radio frequency link, so that it is capable of communicating with the third communication network in order to obtain the authentication request. The selected modem module sends the card information of the third subscriber identification card to the third communication network via the radio frequency link module (S2033), to request to access the third communication network. The third communication network sends the authentication request to authenticate use right of the mobile communication apparatus to the third subscriber identification card. The selected modem module, after receiving the authentication request, obtains the authentication information via the second modem module.

In S2040, the second modem module obtains the authentication information through communication with the server via the radio frequency link module, and sends the authentication information to the selected modem module. As an example, the second modem module obtains the radio frequency link module, encapsulates the authentication request into data transmitted in the protocol of the second communication network, and sends to the server for managing the subscriber identification card for the third communication network via the second communication network. In a case where the authentication request includes a pseudo-random number, the server may, for example, execute a predetermined algorithm for the pseudo-random number and an authentication key of the third subscriber identification card, to work out a response number, and the response number is just the authentication information. The second modem module, after receiving the authentication information from the server, sends the authentication information to the selected modem module.

Figure 22:
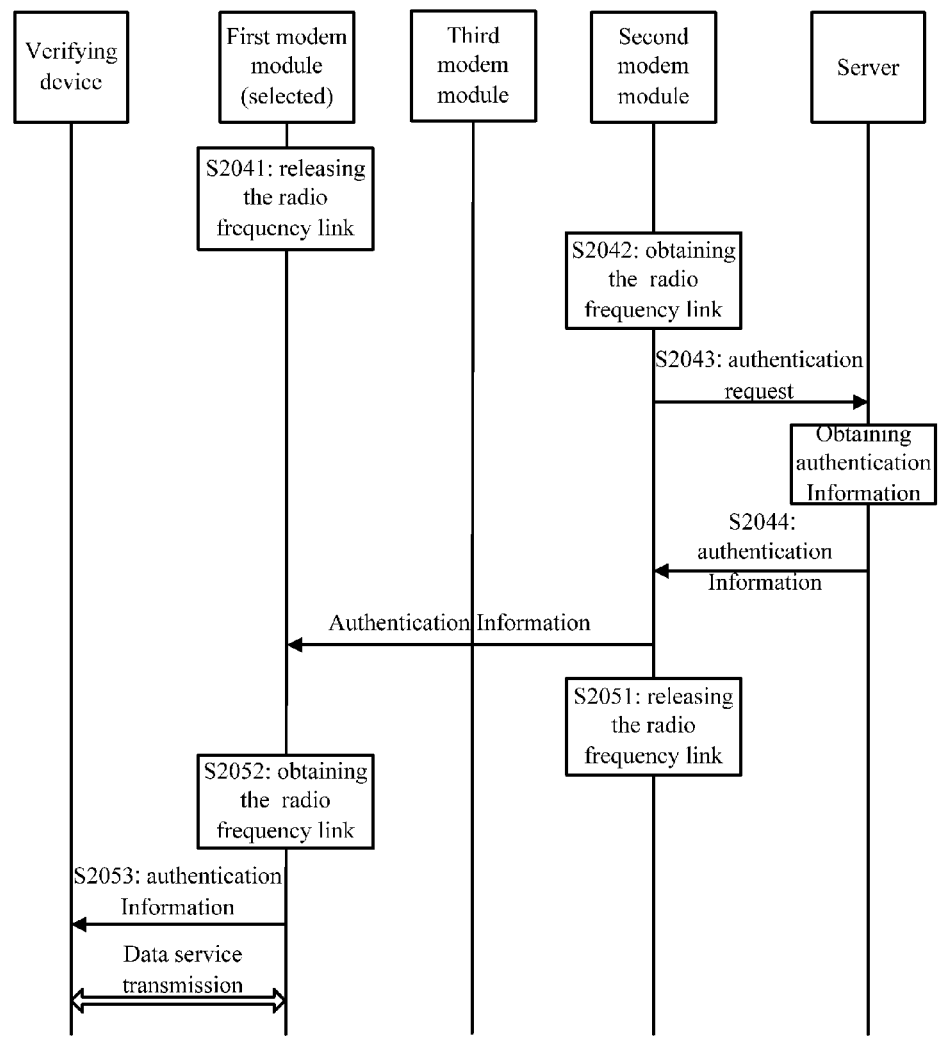
FIG. 22 schematically illustrates a flow chart of a process of completing verification based on the authentication request so as to execute data service transmission in the data service transmission method in FIG. 20.

FIG. 22 schematically illustrates a flow chart of a process of completing verification based on the authentication request so as to execute data service transmission in the data service transmission method in FIG. 20. The authentication information is obtained from the server through steps S2041, S2042, S2043 and S2043 in FIG. 22. As shown in FIG. 22, the selected modem module is made to release the radio frequency link module (S2041); the radio frequency link module is allocated to the second modem module (S2042); the second modem module sends the authentication request to the server via the radio frequency link module, the server obtaining the authentication information based on the authentication request (S2043); and the second modem module receives the authentication information from the server via the radio frequency link module (S2044).

Since the three modem modules share a radio frequency link, in order that the second modem module obtains the authentication information from the server, it must be firstly ensured that the second modem module obtains the radio frequency link. By the above described S2041 and S2042, the second modem module obtains the radio frequency link, so that it is capable of obtaining the authentication information through communication with the server via the second communication network in S2043 and S2044. In a process of obtaining the authentication information from the server by the second modem module, there may be a case that the first modem module needs to use the radio frequency link, so the second modem module may need to suspend interaction with the server.

In S2050, the selected modem module sends the authentication information to the third communication network via the radio frequency link module, to access the third communication network. As an example, the selected modem module obtains the radio frequency link module, encapsulates the authentication information into data transmitted in the protocol of the third communication network, and sends to, for example, the verifying device as shown in FIG. 19, so as to verify use right of the third subscriber identification card.

With further reference to FIG. 22, the authentication information is sent to the third communication network through steps S2051, S2052 and S2053 in FIG. 22. As shown in FIG. 22, the second modem module is made to release the radio frequency link module (S2051); the radio frequency link module is allocated to the selected modem module (S2052); and the selected modem module sends the authentication information to the third communication network via the radio frequency link module (S2053).

Similarly, since the three modem modules share a radio frequency link, in order that the selected modem module sends the authentication information to the third communication network, it must be firstly ensured that the selected modem module obtains the radio frequency link. By the above described S2051 and S2052, the selected modem module obtains the radio frequency link, so that it is capable of communicating with the third communication network via the radio frequency link, in order to send the authentication information in S2053.

The verifying device in the third communication network, after receiving the authentication information from the first modem module, compares the received authentication information with the authentication information stored thereby. If the two are the same, the verifying device confirms validity of the third subscriber identification card.

After the validity of the third subscriber identification card is determined, the selected modem module executes data service transmission in the third communication network via the radio frequency link module. Since the third subscriber identification card is the subscriber identification card for the third communication network, roaming data service fee is saved.

In a case where the third modem module is selected in S2010, the third modem module may serve as the selected modem module as described above to communicate with the second modem module and the third communication network. Alternatively, in the case where the third modem module is selected in S2010, the card information and the authentication information may also be obtained from the server through the first modem module and the first communication network, and the third modem module communicates with the third communication network, so as to register to the third communication network.

For a voice service, an amount of data to be transmitted in data service is very large, and the modem module typically runs a high-level protocol stack to execute data service transmission. As can be seen from the above description, in a process of accessing the third communication network by the mobile communication apparatus, the second modem module is mainly used for transmitting a small amount of data such as the authentication request and the authentication information, so the amount of data service transmitted is very small. Thus, the second modem module can support a low-level protocol stack, for example, it can only support the protocol stack for a second-generation communication network. Because the first modem module or the third modem module will execute data service transmission in the third communication network, it can support the high-level protocol stack, for example, it can support the protocol stacks under the second-generation communication network and a third-generation communication network, and even support a protocol stack for a fourth-generation communication network. Thus, hardware cost of the mobile communication apparatus can be saved. Of course, the first modem module, the second modem module and the third modem module can all support the high-level protocol stack.

In the above-described technical solution of data service transmission according to Embodiment Fifteen of the present disclosure, the card information of the third subscriber identification card for the third communication network is loaded in the mobile communication apparatus, and the subscriber identification card is registered to the third communication network, so that the subscriber identification card for the communication network at the roaming place is registered in a case where there is no physical entity of the subscriber identification card. Thus, the mobile communication apparatus can execute data service transmission in the communication network at the roaming place conveniently, so as to save the roaming data service fee. Since the three modem modules share a radio frequency link, requirements on hardware configuration of the mobile communication apparatus are reduced. In addition, when the subscriber identification card is registered in the third communication network, it is not necessary to stop service transmission of the existing subscriber identification cards in the first communication network and the second communication network.

Embodiment Sixteen

Figure 23:
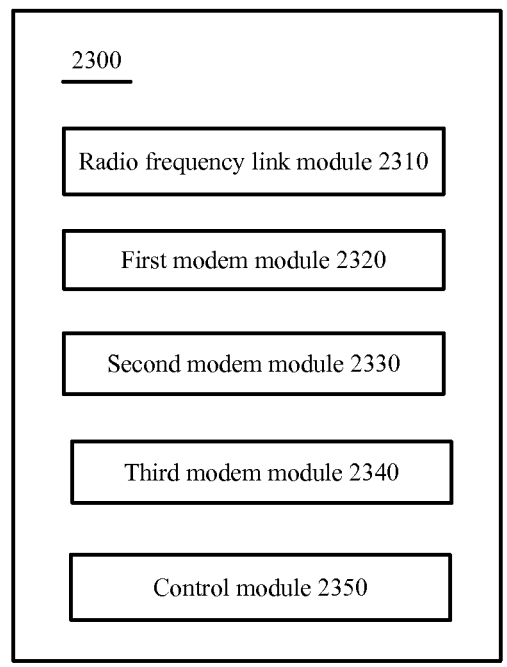
FIG. 23 schematically illustrates a block diagram of a mobile communication apparatus according to Embodiment Sixteen of the present disclosure.

FIG. 23 schematically illustrates a block diagram of a mobile communication apparatus 2300 according to Embodiment Sixteen of the present disclosure. The mobile communication apparatus 2300 may be the mobile phone in FIG. 1, or the mobile communication apparatus FIG. 19.

As shown in FIG. 23, the mobile communication apparatus 2300 comprises: a radio frequency link module 2310, including a radio frequency link; a first modem module 2320, capable of executing data service transmission in a first communication network and data service transmission in a third communication network at a roaming place via the radio frequency link module; a second modem module 2330, capable of executing data service transmission in a second communication network via the radio frequency link; a third modem module 2340, capable of executing data service transmission in the first communication network or the third communication network via the radio frequency link module; and a control module 2350, for, after the mobile communication apparatus reaches the roaming place, selecting one of the first modem module and the third modem module for data service transmission in the third communication network at the roaming place, controlling information transmission between the selected modem module and the second modem module, and controlling the selected modem module and the second modem module to respectively communicate with the third communication network and the second communication network at different times via the radio frequency link module. The selected modem module, under the control of the control module 2350, receives the card information of the subscriber identification card for the third communication network, from a server via the second modem module 2330, and registers the subscriber identification card to the third communication network, so as to execute data service transmission in the third communication network via the registered subscriber identification card, the server being used for managing the subscriber identification card for the third communication network.

The radio frequency link module 2310 includes a radio frequency link. The radio frequency link is a part for transmitting a radio frequency signal in the mobile communication apparatus, and typically includes a radio frequency signal transmitter, an antenna, and a radio frequency signal receiver. In various implementations, the radio frequency link may also include other components, for example, a filter, a coupling adapter, a radio frequency switch, and so on. In the respective embodiments of the present disclosure, the radio frequency link module is shared by the first modem module 2320, the second modem module 2330 and the third modem module 2340. Thus, the mobile communication apparatus may only have a baseband chip, a radio frequency chip and a memory, etc., corresponding to one radio frequency link, so as to save hardware cost and reduce design complexity of the mobile communication apparatus.

The first modem module 2320 is capable of executing data service transmission in the first communication network and data service transmission in the third communication network at the roaming place. For example, in a usual place of residence, the first modem module 2320 executes data service transmission in the first communication network. When the mobile communication apparatus reaches the roaming place, if the control module 2350 selects the first modem module 2320 to execute data service transmission in the third communication network, then the first modem module 2320 also needs to be capable of supporting data service transmission in the third communication network, and the third modem module 2340 needs to be capable of supporting data service transmission in the first communication network. When the mobile communication apparatus reaches the roaming place, if the control module 2350 selects the third modem module 2340 to execute data service transmission in the third communication network, then the first modem module 2320 does not need to support data service transmission in the third communication network. In order to execute data service transmission in the third communication network, the selected modem module needs to access the third communication network, and have the subscriber identification card verified by the third communication network. Typically, the third communication network has a verifying device, for verifying whether the subscriber identification card provided by the selected modem module is legitimate or not.

The second modem module 2330 is capable of executing data service transmission in the second communication network. The second modem module 2330 may receive the card information of the subscriber identification card for the third communication network from the server via the second communication network. The server, for example, manages a plurality of subscriber identification cards such as a first SIM card, a second SIM card . . . an N-th SIM card for the third communication network.

The third modem module 2340 is capable of executing data service transmission in the first communication network or in the third communication network via the radio frequency link module. In the usual place of residence, the first modem module 2320 executes data service transmission in the first communication network. When the mobile communication apparatus reaches the roaming place, if the control module 2350 selects the first modem module 2320 to execute data service transmission in the third communication network, the first modem module 2320 delivers transmission service in the first communication network to the third modem module 2340, then the third modem module 2340 needs to be capable of supporting data service transmission in the first communication network. When the mobile communication apparatus reaches the roaming place, if the control module 2350 selects the third modem module 2340 to execute data service transmission in the third communication network, then the third modem module 2340 needs to be capable of supporting data service transmission in the third communication network. The three modem modules enable the mobile communication apparatus to communicate and standby via three subscriber identification cards.

Here, for clarity, the first modem module 2320, the second modem module 2330 and the third modem module 2340 are shown separately, but the three modem modules can be physically located either on a same modem device or on different modem devices. In addition, the first communication network and the second communication network may either be a same communication network, or be different communication networks. The third communication network may be a communication network at the roaming place, whose type may be either same as or different from one of the first communication network and the second communication network.

The control module 2350 controls information transmission between the selected modem module and the second modem module. Since the three modem modules share a radio frequency link, the control module 2350 controls the selected modem module and the second modem module to communicate with the third communication network and the second communication network respectively at different times via the radio frequency link module. The control module 2350 controls the selected modem module to receive the card information of the subscriber identification card from a server via the second modem module, and to register the subscriber identification card to the third communication network, so as to execute data service transmission in the third communication network via the registered subscriber identification card.

Hereinafter, examples of operations of the respective modules in the mobile communication apparatus are described. After the mobile communication apparatus 2300 reaches the roaming place, the control module selects one of the first modem module 2320 and the third modem module 2340 for data service transmission in the third communication network at the roaming place. Under the control of the control module 2350, the second modem module 2330 obtains card information of one subscriber identification card for the third communication network from one server via the radio frequency link in the radio frequency link module 2310, and loads the card information to the selected modem module. The selected modem module, after receiving the card information of the subscriber identification card, receives an authentication request for the subscriber identification card information under the control of the control module 2350 through communication with the third communication network via the radio frequency link module, and sends the authentication request to the second modem module 2330. After receiving the authentication request, the second modem module 2330 obtains authentication information under the control of the control module 2350 through communication with the server via the radio frequency link module, and sends the authentication information to the selected modem module. The selected modem module, after receiving the authentication information, sends the authentication information to the third communication network via the radio frequency link module under the control of the control module 2350, so as to access the third communication network. The selected modem module executes data service transmission in the third communication network via the radio frequency link module. This is just an example, for example, before the mobile communication apparatus reaches the roaming place, the card information of the third subscriber identification card for the third communication network may also be obtained from the server through the first communication network or the second communication network.

After the mobile communication apparatus 2300 reaches the roaming place, the control module 2350 selects one of the first modem module 2320 and the third modem module 2340 to execute data service transmission in the third communication network. For example, in a case where the first modem module 2320 executes data service transmission in the first communication network, the third modem module 2340 in a standby state may be selected directly. At the roaming place, the subscriber identification card corresponding to the first communication network is in a roaming state, and thus has higher fee.

Alternatively, the control module 2350 may switch data service transmission in the first communication network from the first modem module 2320 to the third modem module 2340, so that correspondingly, the first modem module 2320 is in the standby state, so as to be used for supporting the third subscriber identification card for the third communication network at the roaming place. As an example, the control module 2350 delivers service transmission being executed in the first communication network to the third modem module 2340; and makes the first modem module 2320 to be in the standby state, so as to be used in data service transmission in the third communication network. As compared with a voice service, an amount of data to be transmitted in data service is very large, and the modem module executing data service transmission needs to support a high-level protocol stack. Since in the usual place of residence, data service transmission is executed by the first modem module 2320, and by switching after reaching the roaming place, data service transmission in the third communication network may still be executed by the first modem module 2320, which may reduce requirements on the protocol stack supported by the third modem module 2340.

In the embodiment of the present disclosure, the mobile communication apparatus 2300 only obtains the card information of the third subscriber identification card for the third communication network, and completes registration of the third subscriber identification card after the third communication network verifies the card information. For the mobile communication apparatus 2300, the third subscriber identification card is a virtual subscriber identification card, and the mobile communication apparatus 2300 does not obtain a physical entity of the third subscriber identification card at all. Thus, the mobile communication apparatus 2300 may provide only two card slots for inserting physical entities of two subscriber identification cards, and in a process of switching data service transmission in the first communication network from the first modem module 2320 to the third modem module 2340, a physical position of the subscriber identification card for the first communication network may not be changed.

In order to obtain the card information of the subscriber identification card for the third communication network at the roaming place, the second modem module 2330 may execute data service transmission in the third communication network via the subscriber identification card for the second communication network. The card information of the subscriber identification card for the third communication network, for example, may include a phone number, an International Mobile Subscriber Identity (IMSI) and the like. The IMSI is a mark for distinguishing a mobile subscriber, and, for example, may include a country code to which the mobile subscriber belongs, a mobile network number and a mobile subscriber identification code. The subscriber identification card information is typically stored in the subscriber identification card. As described above, the card information of the subscriber identification card for the third communication network may be provided by a specific company specialized in the subscriber identification card at the roaming place. The specific company may be a product supplier of the mobile communication apparatus, and may also be a service provider licensed by the operator of the third communication network. The specific company, for example, may obtain a plurality of subscriber identification cards for the third communication network in advance, read the card information from the subscriber identification cards and submit to the server for management. Then, the card information of one subscriber identification card can be allocated to the mobile phone subscriber who is to reach the roaming place.

The second modem module 2330 may obtain the card information of the subscriber identification card for the third communication network by operation as follows: obtaining the radio frequency link according to a first link instruction of the control module 2350, receiving the card information of the subscriber identification card from the server via the radio frequency link, and loading the card information of the subscriber identification card to the selected modem module according to a card loading instruction of the control module 2350. In specific application, the control module 2350 may set priority or timing for operations of the respective modem modules which use the radio frequency link module, and then control the respective modem modules to use the radio frequency link module in a time-sharing manner according to the priority or the timing set. After the second modem module 2330 obtains the radio frequency link according to the first link instruction of the control module 2350, the second modem module 2330 may issue a card request to the server via the second communication network, the card request being used for applying for the subscriber identification card for the third communication network. The server allocates the third subscriber identification card according to the request, and sends the card information of the third subscriber identification card to the second modem module 2330.

In a process of interaction between the second modem module 2330 and the server, if the modem module selected by the control module 2350 has an urgent need to use the radio frequency link module, the control module 2350 may control the second modem module 2330 to suspend the interaction with the server. The second modem module 2330, after receiving the card information of the third subscriber identification card, stores the subscriber identification card information in a memory of the selected modem module, or stores the card information in a memory coupled with the selected modem module, as long as the selected modem module is capable of using the card information of the third subscriber identification card.

After the second modem module 2330 receives the card information of the subscriber identification card, the respective modules in the mobile communication apparatus perform operation as follows, so as to receive an authentication request for the subscriber identification card information from the third communication network. The control module 2350 controls the second modem module 2330 to release the radio frequency link module, and sends a second link instruction to the selected modem module. Since the selected modem module and the second modem module 2330 share a radio frequency link, in order to obtain the authentication request from the third communication network, it must be firstly ensured that the selected modem module obtains the radio frequency link. Thus, the selected modem module obtains the radio frequency link under the control of the control module 2350. The selected modem module obtains the radio frequency link module according to the second link instruction, and sends the card information of the subscriber identification card to the third communication network via the radio frequency link. For the sake of safety, the third communication network, after receiving the card information, needs to authenticate right of the mobile communication apparatus to use the third subscriber identification card, and thus will send the authentication request to the first modem module. Therefore, the selected modem module, after sending the subscriber identification card information to the third communication network, also receives the authentication request for the subscriber identification card information from the third communication network via the radio frequency link module, so as to implement authentication.

The authentication request may include, for example, a pseudo-random number. The third communication network stores the pseudo-random number, an authentication key of the third subscriber identification card and authentication information obtained based on the pseudo-random number and the authentication key in, for example, the verifying device thereof. The authentication key of the third subscriber identification card may, for example, be strictly protected in a physical entity of the third subscriber identification card, which cannot be illegally obtained by a third party. Thus, only a legitimate subscriber of the third subscriber identification card knows the authentication key, and can work out the authentication information after receiving the pseudo-random number. The third communication network, when judging that the authentication information stored thereby is consistent with the authentication information received from the mobile communication apparatus, can judge that the mobile communication apparatus is the legitimate subscriber of the third subscriber identification card.

The selected modem module, after receiving the authentication request for the subscriber identification card information, sends the authentication request to the second modem module 2330, so as to obtain the authentication information via the second modem module 2330. The respective modules in the mobile communication apparatus perform operation as follows so as to obtain the authentication information from the server. The control module 2350 controls the selected modem module to release the radio frequency link module, and sends a third link instruction to the second modem module 2330. Since the respective modem modules share a radio frequency link, the control module 2350 sends the third link instruction so that the second modem module obtains the radio frequency link. The second modem module 2330 obtains the radio frequency link module according to the third link instruction, and sends the authentication request to the server via the radio frequency link module, and receives the authentication information from the server via the radio frequency link module, the server obtaining the authentication information based on the authentication request. For example, the second modem module 2330 may encapsulate the authentication request into data transmitted in the protocol of the second communication network, and sends to the server for managing the subscriber identification card for the third communication network via the second communication network. In a case where the authentication request includes the pseudo-random number, the server, for example, may execute a predetermined algorithm for the pseudo-random number and the authentication key of the third subscriber identification card, to work out a response number, and the response number is just the authentication information. The second modem module 2330, after receiving the authentication information from the server, sends the authentication information to the selected modem module. In a process that the second modem module 2330 obtains the authentication information from the server, a case may occur that the selected modem module needs to use the radio frequency link, and the second modem module 2330 may need to suspend the interaction with the server.

After receiving the authentication information, the respective modules in the mobile communication apparatus perform operation as follows to send the authentication information to the third communication network, so as to register to the third communication network. The control module 2350 controls the second modem module 2330 to release the radio frequency link module, and sends a fourth link instruction to the selected modem module. The selected modem module obtains the radio frequency link module according to the fourth link instruction, and sends the authentication information to the third communication network via the radio frequency link module. For example, the selected modem module obtains the radio frequency link module, encapsulates the authentication information into the data transmitted in the protocol of the third communication network, and sends to the verifying device in the third communication network. The verifying device in the third communication network, after receiving the authentication information from the selected modem module, compares the received authentication information with the authentication information stored thereby. If the two are the same, the verifying device confirms validity of the third subscriber identification card.

After the validity of the third subscriber identification card is determined, the selected modem module can execute data service transmission in the third communication network via the radio frequency link module. Since data service transmission in the third communication network is executed via the subscriber identification card for the third communication network, roaming data service fee is saved.

Relative to a voice service, an amount of data to be transmitted in data service is large, and the modem module typically runs a high-level protocol stack to execute data service transmission. As can be seen from the above description, in a process that the mobile communication apparatus 2300 accesses the third communication network, the second modem module 2330 is mainly used for transmitting a small amount of data such as the authentication request and the authentication information, so the amount of data service transmitted is small. Thus, the second modem module 2330 can support a low-level protocol stack, for example, it can only support the protocol stack for a second-generation communication network. Because the selected modem module will execute data service transmission in the third communication network, it can support the high-level protocol stack, for example, it can support the protocol stacks in the second-generation communication network or a third-generation communication network, and even support a protocol stack for a fourth-generation communication network. Thus, hardware cost of the mobile communication apparatus can be saved. When the first modem module is selected for executing data service transmission in the third communication network, the third modem module can also support the low-level protocol stack. Of course, all the three modem modules can support the high-level protocol stack.

In the above-described technical solution of the mobile communication apparatus according to Embodiment Sixteen of the present disclosure, the card information of the third subscriber identification card for the third communication network is loaded in the selected modem module, and the subscriber identification card is registered into the third communication network, so that the subscriber identification card for the communication network at the roaming place is registered in case where there is no physical entity of the subscriber identification card. Thus, the mobile communication apparatus 2300 can execute data service transmission by using the communication network at the roaming place conveniently, so as to save the roaming data service fee. Since the selected modem module and the second modem module 2330 share a radio frequency link, requirements on hardware configuration of the mobile communication apparatus are reduced. Since the selected modem module and the second modem module 2330 share a radio frequency link, requirements on hardware configuration of the mobile communication apparatus are reduced. In addition, when the subscriber identification card in registered in the third communication network, it is not necessary to stop service transmission of the existing subscriber identification cards for the first communication network and the second communication network.

Embodiment Seventeen

Figure 24:
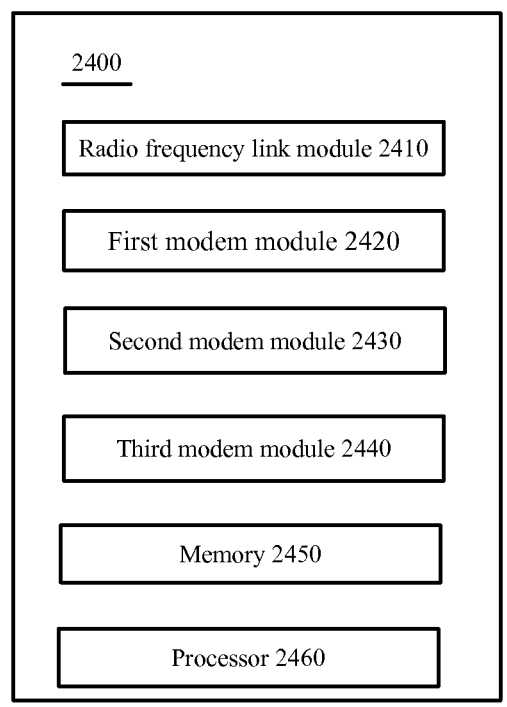
FIG. 24 schematically illustrates a block diagram of another mobile communication apparatus according to Embodiment Seventeen of the present disclosure.

FIG. 24 schematically illustrates a block diagram of another mobile communication apparatus 2400 according to Embodiment Seventeen of the present disclosure. As shown in FIG. 24, the another mobile communication apparatus 2400 includes: a radio frequency link module 2410; a first modem module 2420; a second modem module 2430; a third modem module 2440, a memory 2450 for storing a program code; and a processor 2460, for executing the program code to implement the methods described in conjunction with FIG. 20 to FIG. 22.

The radio frequency link module 2410, the first modem module 2420, the second modem module 2430 and the third modem module 2440 in FIG. 24 are respectively the same as the radio frequency link module 2310, the selected modem module, the second modem module 2330 and the third modem module 2440 in FIG. 23. The memory 2450 may include at least one of a read-only memory and a random access memory, and provide instruction and data for the processor 2460. A portion of the memory 2450 may further include a non-volatile random access memory (NVRAM).

The processor 2460 may be a general purpose processor, a digital signal processor (DSP), an application-specific integrated circuit (ASIC), a field-programmable gate array (FPGA) or other programmable logic devices, discrete gates or transistor logic devices, and discrete hardware components. The general purpose processor may be a microprocessor or any conventional processor, etc.

The steps disclosed in conjunction with Embodiment Seventeen of the present disclosure may be embodied directly as being executed and completed by the processor, or being executed and completed by combination of hardware and software modules in the processor. The software module may be located in storage mediums well-known in the art such as the random access memory, a flash memory, the read-only memory, a programmable read-only memory or electrically erasable programmable memory, a register, etc. The storage medium is located in the memory 2450; and the processor 2460 reads information in the memory 2450, and completes the steps of the above-described method in combination with the hardware thereof.

Although the respective embodiments of the present disclosure are described relatively independently, yet in practice, features of the above-described respective embodiments may be used in combination. Examples are given below for reference.

For example, the step S105 in Embodiment One described in combination with FIG. 1 can be implemented by using the steps S1430, S1440, S1450 and S1460 in Embodiment Twelve described in combination with FIG. 14. That is to say, the step S105 in FIG. 1 may include the steps S1430, S1440, S1450 and S1460 in Embodiment Twelve. Similarly, the data transmitting unit 405 of the electronic apparatus in Embodiment Four described in combination with FIG. 4-1 can be implemented by using the control module 1740 in Embodiment Thirteen described in combination with FIG. 17, or the data transmitting unit 405 can be implemented by using the memory 1840 and the processor 1850 in Embodiment Fourteen described in combination with FIG. 18.

As another example, the step S811 of obtaining a target subscriber identification card channel in Embodiment Eight described in combination with FIG. 8 may be applied to step S104 in Embodiment One described in combination with FIG. 1, and may also be applied to the step S2010 of selecting the modem module in Embodiment Fifteen described in combination with FIG. 20. Similarly, the second obtaining unit 1007 described in combination with Embodiment Eleven may correspond to the first obtaining unit 404 in Embodiment Four described in combination with FIG. 4-1, and may also correspond to the first obtaining unit 404 in Embodiment Five described in combination with FIG. 5, and the first obtaining unit 404 in Embodiment Six described in combination with FIG. 6. Correspondingly, all the description on the second obtaining unit 1007 is applicable to the first obtaining unit 404 according to Embodiment Four to Embodiment Six.

It should be understood that, throughout the description, reference to the term "one embodiment", or "an embodiment" means that a particular feature, structure, or characteristic associated with the embodiment is included in at least one embodiment of the present disclosure. Thus, the expression "in one embodiment" or "in an embodiment" throughout the description does not necessarily refer to one and the same embodiment. Furthermore, these particular features, structures, or characteristics may be combined in one or more embodiments in a suitable manner. It should be understood that, in various embodiments of the present disclosure, the size of the serial number of the various procedures as described above does not mean the order of executing, the order of executing the respective procedures should be determined by their functions and internal logic, but should not limit the implementation process of the embodiments of the present disclosure.

In the several embodiments provided by the present disclosure, it shall be appreciated that the disclosed apparatus and method can be implemented in other modes. The above-described apparatus embodiments are only exemplary, for example, the division of the units is only a logical functional division, and there may be other modes of division when they are actually implemented. For example, a plurality of units or components may be combined or may be integrated into another system, or some features may be omitted or not executed. In addition, coupling between the respective components shown or discussed, either direct coupling or communication connection may be implemented by some interfaces, and indirect coupling or communicating connection between the devices or the units may be electrical, mechanical, or in other forms.

The above units described as separate components may be or may not be physically separated, and the components displayed as units may be or may not be physical units, i.e., which may be located in one place, or may be distributed in a plurality of network units; and the purpose of this embodiment may be achieved by selecting some or all of the units therein as actually required.

Moreover, the individual functional units in various embodiments of the present disclosure can be integrated into one processing unit, or each unit may exist physically and separately, or two or more units may be integrated into one unit; the above-described integrated units may be implemented in a form of hardware, or may be implemented in a form of a hardware-plus-software functional unit.

Those ordinarily skilled in the art can understand that all or part of the process steps to implement the above method embodiment can be performed by program instruction-related hardware. The aforesaid program can be stored in computer readable storage media, upon execution, the program executes the steps of the above method embodiment, and the aforementioned storage media include all kinds mediums capable of storing program codes, such as Read-Only Memory (ROM), magnetic disk or optical disk, etc.

Alternatively, if the above-described integrated units of the present disclosure are implemented by software function modules as sold or used as independent products, they can also be stored in a computer-readable storage medium. Based on such understanding, the technical solutions of the embodiments of present disclosure may be embodied in the form of a software product, which can be stored in a storage medium, including instructions to enable a computer device (which may be a personal computer, a server or a network device) to execute part of or all of the method according to the embodiments of the present disclosure. The above-described storage medium includes the removable storage device, the ROM, the magnetic disk or the optical disk, and various mediums that can store the program code.

The above are only specific embodiments of the present disclosure, but the scope of the present disclosure is not limited thereto. Those skilled in the art, within the technical scope disclosed by the present disclosure, can easily think of variations or replacements, which should be covered within the protection scope of the present disclosure. Therefore, the scope of the present disclosure should be the scope of the following claims.

The invention claimed is:

1. An information processing method applied to an electronic apparatus, comprising:

judging, by the electronic apparatus, whether the electronic apparatus itself is in a roaming state or not, to obtain a first judgment result;

sending, by the electronic apparatus, a service request to a server through a first subscriber identification card channel that is associated with a first subscriber identification card, when the first judgment result indicates that the electronic apparatus itself is in the roaming state, the service request being used for requesting the server to allocate virtual subscriber identification card information to the electronic apparatus, and a virtual subscriber identification card being virtual and belonging to a current place where the electronic apparatus is located;

receiving a service response sent by the server through the first subscriber identification card channel associated with the first subscriber identification card, the service response including the virtual subscriber identification card information;

obtaining a target subscriber identification card channel, the target subscriber identification card channel being an idle subscriber identification card channel or a second subscriber identification card channel associated with a second subscriber identification card; and executing data service transmission in a communication network under the roaming state by using the virtual subscriber identification card information and the target subscriber identification card channel, wherein, the obtaining a target subscriber identification card channel includes:

judging whether the electronic apparatus has an idle subscriber identification card channel or not, to obtain a third judgment result;

obtaining, by the electronic apparatus, a specified subscriber identification card, when the third judgment result indicates that the electronic apparatus has no idle subscriber identification card channel, the specified subscriber identification card being the second subscriber identification card; and, deactivating, by the electronic apparatus, the specified subscriber identification card, and taking a channel of the deactivated subscriber identification card as the target subscriber identification card channel.

2. The method according to claim 1, wherein, the electronic apparatus comprises the first subscriber identification card channel and the second subscriber identification card channel which is used as the target subscriber identification card channel, the first subscriber identification card channel and the second subscriber identification card channel including a first modem module, a second modem module, and a shared radio frequency link module, the first subscriber identification card channel being capable of executing data service transmission in a first communication network via the first modem module and the shared radio frequency link module, and the second subscriber identification card channel being capable of executing data service transmission in a second communication network via the second modem module and the shared radio frequency link module.

3. The method according to claim 2, wherein, the executing, by the electronic apparatus, data service transmission in a communication network under the roaming state by using the virtual subscriber identification card information and the target subscriber identification card channel includes:

receiving, by the second modem module, an authentication request for the subscriber identification card information through communication with a third communication network via the radio frequency link module, and sending the authentication request to the first modem module;

obtaining, by the first modem module, authentication information through communication with the server via the radio frequency link module, and sending the authentication information to the second modem module;

sending, by the second modem module, the authentication information to the third communication network via the radio frequency link module to access the third communication network;

executing, by the second modem module, data service transmission in the third communication network via the radio frequency link module.

4. The method according to claim 3, wherein, the receiving, by the second modem module, an authentication request for the subscriber identification card information through communication with a third communication network via the radio frequency link module, includes:

enabling the first modem module to release the radio frequency link module;

allocating the radio frequency link module to the second modem module;

sending, by the second modem module, the subscriber identification card information to the third communication network via the radio frequency link module;

receiving, by the second modem module, the authentication request for the card information from the third communication network via the radio frequency link module.

5. The method according to claim 3, wherein, the obtaining, by the first modem module, authentication information through communication with the server via the radio frequency link module includes:

enabling the second modem module to release the radio frequency link module;

allocating the radio frequency link module to the first modem module;

sending, by the first modem module, the authentication request to the server via the radio frequency link module, the server obtaining the authentication information based on the authentication request;

receiving, by the first modem module, the authentication information from the server via the radio frequency link module.

6. The method according to claim 3, wherein, the sending, by the second modem module, the authentication information to the third communication network via the radio frequency link module to access the third communication network includes:

enabling the first modem module to release the radio frequency link module;

allocating the radio frequency link module to the second modem module;

sending, by the second modem module, the authentication information to the third communication network via the radio frequency link module.

7. The method according to claim 1, wherein, the method further comprises:

issuing, by the electronic apparatus, a prompt information, when the first judgment result indicates that the electronic apparatus itself is in the roaming state, the prompt information being used for prompting the subscriber whether to load the virtual subscriber identification card or not;

obtaining, by the electronic apparatus, a first operation of a subscriber, the first operation being a response operation for the prompt information;

judging, by the electronic apparatus, whether to load the virtual subscriber identification card or not according to the first operation, to obtain a second judgment result;

sending, by the electronic apparatus, a service request to the server through the first subscriber identification card channel, when the second judgment result indicates that the virtual subscriber identification card needs to be loaded.

8. The method according to claim 1, wherein, the obtaining, by the electronic apparatus, a specified subscriber identification card includes:

issuing, by the electronic apparatus, a second prompt information, the second prompt information being used for prompting the subscriber to deactivate a subscriber identification card on the electronic apparatus;

obtaining, by the electronic apparatus, a second operation of the subscriber, the second operation being a response operation for the second prompt information;

determining, by the electronic apparatus, the specified subscriber identification card according to the second operation.

9. The method according to claim 1, wherein, the electronic apparatus comprises the first subscriber identification card channel, the second subscriber identification card channel and the idle subscriber identification card channel; the first subscriber identification card channel, the second subscriber identification card channel and the idle subscriber identification card channel include a first modem module, a second modem module, a third modem module and a shared radio frequency link module, the first subscriber identification card channel being capable of executing data service transmission in a first communication network via the first modem module and the shared radio frequency link module, and the second subscriber identification card channel being capable of executing the data service transmission in a second communication network via the second modem module and the shared radio frequency link module;

the judging whether the electronic apparatus has an idle subscriber identification card channel or not includes: judging whether the electronic apparatus has an idle subscriber identification card channel formed based on the third modem module and the radio frequency link module;

the obtaining a target subscriber identification card channel further includes: selecting one of the idle subscriber identification card channel and the second subscriber identification card channel as the target subscriber identification card channel, when the third judgment result indicates that the electronic apparatus has an idle subscriber identification card channel.

10. The method according to claim 2, wherein, a modem module corresponding to the target subscriber identification card channel supports a high-level protocol stack and the first modem module supports a low-level protocol stack.

11. An electronic apparatus, comprising a first judging unit, a first sending unit, a first receiving unit, a first obtaining unit, a data transmitting unit, and a first subscriber identification card channel, wherein, the first judging unit is used for judging whether the electronic apparatus itself is in a roaming state or not, to obtain a first judgment result;

the first sending unit is used for sending a service request to a server through a first subscriber identification card channel that is associated with a first subscriber identification card, when the first judgment result indicates that the electronic apparatus itself is in the roaming state, the service request being used for requesting the server to allocate virtual subscriber identification card information to the electronic apparatus, and a virtual subscriber identification card being virtual and belonging to a current place where the electronic apparatus is located;

the first receiving unit is used for receiving a service response sent by the server through the first subscriber identification card channel associated with the first subscriber identification card, the service response including the virtual subscriber identification card information;

the first obtaining unit is used for obtaining a target subscriber identification card channel, the target subscriber identification card channel being an idle subscriber identification card channel or a second subscriber identification card channel associated with a second subscriber identification card; and the data transmitting unit is used for executing data service transmission in a communication network under the roaming state by using the virtual subscriber identification card information and the target subscriber identification card channel;

the electronic apparatus further comprises an issuing unit, a second obtaining unit and a second judging unit, wherein:

the issuing unit is used for issuing a prompt information when the first judgment result indicates that the electronic apparatus itself is in the roaming state, the prompt information being used for prompting the subscriber whether to load the virtual subscriber identification card or not;

the second obtaining unit is used for obtaining a first operation of a subscriber, the first operation being a response operation for the prompt information; and the second judging unit is used for judging whether to load the virtual subscriber identification card or not according to the first operation, to obtain a second judgment result; and triggering the first sending unit, when the second judgment result indicates that the virtual subscriber identification card need to be loaded; and the second obtaining unit further includes a third judging module, an obtaining module, and a deactivating module, wherein:

the third judging module is used for judging whether the electronic apparatus itself has an idle subscriber identification card channel or not, to obtain a third judgment result;

the obtaining module is used for obtaining a specified subscriber identification card, when the third judgment result indicates that the electronic apparatus has no idle subscriber identification card channel; and the deactivating module is used for deactivating the specified subscriber identification card, and taking a channel of the specified subscriber identification card which is the second subscriber identification card channel as the target subscriber identification card channel.

12. The electronic apparatus according to claim 11, wherein, the electronic apparatus further comprises the second subscriber identification card channel which is used as the target subscriber identification card channel, the first subscriber identification card channel and the second subscriber identification card channel including a first modem module, a second modem module, and a shared radio frequency link module, the first subscriber identification card channel being capable of executing data service transmission in a first communication network via the first modem module and the shared radio frequency link module, and the second subscriber identification card channel being capable of executing data service transmission in a second communication network via the second modem module and the shared radio frequency link module.

13. The electronic apparatus according to claim 12, wherein, the data transmitting unit:
   controls the second modem module to communicate with a third communication network via the radio frequency link module based on the virtual subscriber identification card information, so as to receive an authentication request for the subscriber identification card information, and to send the authentication request to the first modem module;
   controls the first modem module to communicate with the server via the radio frequency link module based on the authentication request, so as to obtain authentication information, and to send the authentication information to the second modem module;
   controls the second modem module to send the authentication information to the third communication network via the radio frequency link module, so that the electronic apparatus executes data service transmission in the third communication network via a subscriber identification card corresponding to the subscriber identification card information.

14. The electronic apparatus according to claim 12, wherein, after the first subscriber identification card channel receives a service response of the subscriber identification card information sent by the server,
   the data transmitting unit controls the first modem module to release the radio frequency link module, and to send a second link instruction to the second modem module;
   the second modem module obtains the radio frequency link module according to the second link instruction, and sends the subscriber identification card information to a third communication network via the radio frequency link module and the first sending unit, and receives the authentication request for the subscriber identification card information from the third communication network via the radio frequency link module and the first receiving unit.

15. The electronic apparatus according to claim 13, wherein, after the second modem module receives the authentication request,
   the data transmitting unit controls the second modem module to release the radio frequency link module, and to send a third link instruction to the first modem module;
   the first modem module obtains the radio frequency link module according to the third link instruction, sends the authentication request to the server via the radio frequency link module and the first sending unit, and receives the authentication information from the server via the radio frequency link module and the first receiving unit, the server obtaining the authentication information based on the authentication request.

16. The electronic apparatus according to claim 13, wherein, after the second modem module receives the authentication information,
   the data transmitting unit controls the first modem module to release the radio frequency link module, and to send a fourth link instruction to the second modem module;
   the second modem module obtains the radio frequency link module according to the fourth link instruction, and sends the authentication information to the third communication network via the radio frequency link module and the first sending unit.

17. The electronic apparatus according to claim 11, wherein, the obtaining module includes an issuing sub-module, an obtaining sub-module, and a determining sub-module, wherein,
   the issuing sub-module is used for issuing a second prompt information, the second prompt information being used for prompting the subscriber to deactivate a subscriber identification card on the electronic apparatus;
   the obtaining sub-module is used for obtaining a second operation of the subscriber, the second operation being a response operation for the second prompt information;
   the determining sub-module is used for determining the specified subscriber identification card according to the second operation.

18. The electronic apparatus according to claim 11, wherein,
   the electronic apparatus further comprises the second subscriber identification card channel and the idle subscriber identification card channel; the first subscriber identification card channel, the second subscriber identification card channel and the idle subscriber identification card channel include a first modem module, a second modem module, a third modem module and a shared radio frequency link module, the first subscriber identification card channel being capable of executing data service transmission in a first communication network via the first modem module and the shared radio frequency link module, and the second subscriber identification card channel being capable of executing data service transmission in a second communication network via the second modem module and the shared radio frequency link module;
   the third judging module judges whether the electronic apparatus has an idle subscriber identification card channel formed based on the third modem module and the radio frequency link module or not;
   the obtaining module selects one of the idle subscriber identification card channel and the second subscriber identification card channel as the target subscriber identification card channel, when the third judgment result indicates that the electronic apparatus has the idle subscriber identification card channel.

19. The electronic apparatus according to claim 12, wherein, a modem module corresponding to the target subscriber identification card channel supports a high-level protocol stack and the first modem module supports a low-level protocol stack.

20. A server comprising a second receiving unit, a determining unit, a third obtaining unit and a second sending unit, wherein,
   the second receiving unit is used for receiving a service request sent by an electronic apparatus through a first subscriber identification card channel that is associated with a first subscriber identification card;
   the determining unit is used for determining current location information of the electronic apparatus according to the service request;

the third obtaining unit is used for obtaining virtual subscriber identification card information according to the current location information, the virtual subscriber identification card information together with a target subscriber identification card channel are used for executing data service transmission in a communication network under a roaming state, with the target subscriber identification card channel being an idle subscriber identification card channel or a second subscriber identification card channel associated with a second subscriber identification card; and the second sending unit is used for carrying the virtual subscriber identification card information in a service response, and sending the service response to the electronic apparatus, wherein the target subscriber identification card channel is obtained further by:

- judging whether the electronic apparatus has the idle subscriber identification card channel or not, to obtain a third judgment result;
- obtaining, by the electronic apparatus, a specified subscriber identification card, when the third judgment result indicates that the electronic apparatus has no idle subscriber identification card channel, the specified subscriber identification card being the second subscriber identification card; and
- deactivating, by the electronic apparatus, the specified subscriber identification card, and taking a channel of the deactivated subscriber identification card which is the second subscriber identification card channel as the target subscriber identification card channel.

* * * * *